(12) United States Patent
Huang et al.

(10) Patent No.: US 12,199,881 B2
(45) Date of Patent: Jan. 14, 2025

(54) DATA TRANSMISSION METHOD AND APPARATUS WITH LINK AGGREGATION

(71) Applicant: HUAWEI TECHNOLOGIES CO., LTD., Guangdong (CN)

(72) Inventors: Guogang Huang, Shenzhen (CN); Roberto Riggio, Trento (IT); Peng Liu, Shenzhen (CN); Yuchen Guo, Shenzhen (CN); Jian Yu, Shenzhen (CN); Weimin Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 17/535,049

(22) Filed: Nov. 24, 2021

(65) Prior Publication Data

US 2022/0086098 A1     Mar. 17, 2022

Related U.S. Application Data

(63) Continuation of application No. PCT/CN2020/080730, filed on Mar. 23, 2020.

(30) Foreign Application Priority Data

May 27, 2019 (CN) .......................... 201910446572.5

(51) Int. Cl.
*H04L 12/28*     (2006.01)
*H04L 45/24*     (2022.01)
(Continued)

(52) U.S. Cl.
CPC ............ *H04L 47/41* (2013.01); *H04L 45/245* (2013.01); *H04L 47/20* (2013.01); *H04L 47/2441* (2013.01)

(58) Field of Classification Search
CPC ..... H04L 47/20; H04L 47/41; H04L 47/2441; H04L 45/245
See application file for complete search history.

(56) References Cited

U.S. PATENT DOCUMENTS

| | | | |
|---|---|---|---|
| 2006/0239213 A1* | 10/2006 | Frederiks | H04L 1/1664 370/278 |
| 2008/0212612 A1* | 9/2008 | Singh | H04L 1/1685 370/310 |

(Continued)

FOREIGN PATENT DOCUMENTS

| | | | |
|---|---|---|---|
| AU | 2005267791 A1 * | 3/2007 | ........... H04L 1/0079 |
| AU | 2008358409 A1 * | 1/2011 | ........... H04L 1/1614 |

(Continued)

OTHER PUBLICATIONS

Broadcom Corporation, "Traffic Steering Options for Cellular—WLAN RAN Interworking with Analysis," 3GPP TSG-RAN WG2 #89bis, R2-151484, Bratislava, Slovakia, Apr. 20-24, 2015, 6 pages.

(Continued)

*Primary Examiner* — Elisabeth Benoit Magloire
(74) *Attorney, Agent, or Firm* — Fish & Richardson P.C.

(57) ABSTRACT

The present disclosure relates to data transmission method and apparatus. One example method includes generating and sending a link aggregation request, where the link aggregation request is used to request to perform transmission of a same type of data stream over a plurality of links, receiving a link aggregation response, where the link aggregation response represents whether the transmission of the same type of data stream over the plurality of links is accepted or not, and performing data transmission based on the link aggregation response.

16 Claims, 14 Drawing Sheets

(51) Int. Cl.
   *H04L 47/20*    (2022.01)
   *H04L 47/2441*  (2022.01)
   *H04L 47/41*    (2022.01)

(56) References Cited

U.S. PATENT DOCUMENTS

| | | | |
|---|---|---|---|
| 2015/0282005 A1* | 10/2015 | Du | H04W 28/065 |
| | | | 370/394 |
| 2018/0054847 A1* | 2/2018 | Cariou | H04W 28/0861 |
| 2018/0206284 A1 | 7/2018 | Zhou et al. | |
| 2019/0082373 A1* | 3/2019 | Patil | H04L 1/1614 |

FOREIGN PATENT DOCUMENTS

| | | |
|---|---|---|
| CN | 104349415 A | 2/2015 |
| CN | 107925520 A | 4/2018 |

OTHER PUBLICATIONS

IEEE Std 802.11ad™-2012, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," Oct. 19, 2012, 628 pages.

IEEE P802.11ax™/D2.2, "Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN," Feb. 2018, 620 pages.

IEEE P802.11ay/D2.0, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 7: Enhanced throughput for operation in license-exempt bands above 45 GHZ," Jul. 2018, 673 pages.

IEEE Std 802.3™-2018, "IEEE Standard for Ethernet," IEEE Computer Society, Jun. 14, 2018, 5600 pages.

IEEE Std 802.1Q-2011, "IEEE Standard for Local and metropolitan area networks—Media Access Control (MAC) Bridges and Virtual Bridge Local Area Networks," IEEE Computer Society, May 6, 2011, 1365 pages.

PCT International Search Report and Written Opinion issued in International Application No. PCT/CN2020/080730 on Jun. 12, 2020, 17 [pages (with English translation).

* cited by examiner

DATA TRANSMISSION METHOD AND APPARATUS WITH LINK AGGREGATION

CROSS-REFERENCE TO RELATED APPLICATIONS

This application is a continuation of International Application No. PCT/CN2020/080730, filed on Mar. 23, 2020, which claims priority to Chinese Patent Application No. 201910446572.5, filed on May 27, 2019. The disclosures of the aforementioned applications are hereby incorporated by reference in their entireties.

TECHNICAL FIELD

This application relates to the field of communication technologies, and in particular, to a data transmission method and apparatus.

BACKGROUND

With development of communication technologies, a wireless local area network (WLAN) continuously evolves. A networking architecture of the WLAN mainly includes an access point AP) and a station (STA). The access point may be considered as a communication medium between a wireless network and a wired network. Each station in coverage of the access point may transmit data to the access point, and the access point transmits the data to the wired network. Correspondingly, a device in the wired network may transmit data to the access point, and the access point transmits the data to the station.

Data transmission between the access point and the station is implemented based on a radio frequency (RF) technology. Specifically, the access point and the station each include a radio frequency module, the radio frequency module can work in a band within a specific range, and the radio frequency module can establish a radio link in the operating band of the radio frequency module. Before data transmission, the access point and the station establish a link in a same operating band by using respective radio frequency modules. In a data transmission process, when the access point receives a data stream, the access point sends the data stream to the station over the link, and the station receives the data stream from the access point over the link.

Bandwidth of a single link is limited. Therefore, when transmission of a data stream is performed over a single link, a data transmission rate is low.

SUMMARY

According to a data transmission method and apparatus provided in embodiments of this application, by exchanging a link aggregation request and a link response, a plurality of links are aggregated, to perform transmission of a same type of data stream. In this way, a data transmission rate can be improved.

According to a first aspect, an embodiment of this application provides a data transmission method, where the method includes:
generating and sending a link aggregation request, where the link aggregation request is used to request to perform transmission of a same type of data stream over a plurality of links;
receiving a link aggregation response, where the link aggregation response represents whether the transmission of the same type of data stream over the plurality of links is accepted or not; and
performing data transmission based on the link aggregation response.

According to the method provided in this embodiment, an interaction procedure for implementing link aggregation is provided. By exchanging the link aggregation request and the link aggregation response, two data transmission apparatuses can perform transmission of the same type of data stream over the plurality of links, so that the transmission of the same type of data stream can be performed over the plurality of links simultaneously. Therefore, total transmission bandwidth of this type of data stream is increased, and a function of aggregating the plurality of links to perform data transmission is implemented, speeding up data transmission, and improving data transmission efficiency.

In a possible implementation, the link aggregation request includes a stream type indication and a member link indication, where the stream type indication is used to indicate a type of a data stream whose transmission is allowed over the plurality of links, and the member link indication is used to indicate each of the plurality of links.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the plurality of links is accepted, and the failure state represents that the transmission of the same type of data stream over the plurality of links is not accepted.

In a possible implementation, the stream type indication is a traffic identifier (TID) indication, and the TID indication is used to indicate a TID of the same type of data stream whose transmission is performed over the plurality of links.

In a possible implementation, the stream type indication is the TID of the data stream.

In a possible implementation, the stream type indication is a stream matching rule, where the stream matching rule is used to perform matching between the data stream and an aggregated link, and the aggregated link is a set of the plurality of links for the transmission of the same type of data stream.

In a possible implementation, the link aggregation request includes an aggregated link identifier, the aggregated link identifier is used to identify an aggregated link, and the aggregated link is a set of the plurality of links for the transmission of the same type of data stream.

In a possible implementation, the link aggregation request further includes a primary link indication, and the primary link indication is used to indicate a primary link in the plurality of links. The primary link may be a link used for transmission of a block acknowledgement request (BAR) or a block acknowledgement (BA) in the plurality of links for the transmission of the same type of data stream.

When the primary link indication is used, for data whose transmission is performed over a secondary link, the transmission of the data is performed over the secondary link, and transmission of a BAR/BA of the data is performed over the primary link, so as to implement a function of performing the transmission of the BAR/BA and the transmission of the data over the different links, that is, separating the BAR/BA from the data.

In a possible implementation, the link aggregation request further includes a transport mode indication, the transport mode indication is used to indicate either of a first transport mode and a second transport mode, the first transport mode is a mode in which transmission of same data is performed over different links in the plurality of links, and the second transport mode is a mode in which transmission of different data is performed over different links in the plurality of links.

When the first transport mode is used, even if data whose transmission is performed over a link is lost, the data in the link can still be received over another link. This improves transmission reliability. When the second transport mode is used, the transmission of the same type of data stream can be performed over the plurality of links simultaneously, to speed up the data transmission and improve the data transmission efficiency.

In a possible implementation, the link aggregation request further includes a management frame indication, and the management frame indication is used to indicate whether to perform transmission of a management frame on the plurality of links.

The management frame indication is carried in a link aggregation request indication, so that the first data transmission apparatus and the second data transmission apparatus can perform transmission of the same type of data stream over the plurality of links specified in the link aggregation request, and perform transmission of the management frame over the link other than the plurality of links. In this way, the transmission of the data stream and the transmission of the management frame can be performed over different links, so that a function of separating a management plane and a data plane from each other is implemented.

In a possible implementation, the link aggregation request further includes a downlink/uplink indication.

The downlink/uplink indication may be used to separate uplink transmission and downlink transmission of the same type of data stream from each other, and the uplink transmission and the downlink transmission are respectively carried on different member links.

In a possible implementation, the link aggregation request further includes a time sensitive networking (TSN) indication, and the time sensitive networking indication is used to indicate whether transmission of time sensitive networking data is allowed over the plurality of links.

The time sensitive networking indication is used to specify whether the transmission of the time sensitive networking data is performed over a plurality of links. In this way, for a time sensitive networking that has a high transmission rate requirement, transmission of time sensitive networking data may be performed over a plurality of links, to speed up the data transmission and reduce a data transmission delay.

In a possible implementation, the link aggregation request further includes an enhanced distributed channel access (EDCA) forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication. The switch-only-data-frame indication is used to indicate to switch a link for transmission of a data frame. When the switch-only-data-frame indication is used, transmission of a data frame and transmission of a control frame are performed over different links. In this way, data transmission on a data plane and data transmission on a control plane are separated from each other.

According to a second aspect, an embodiment of this application provides a data transmission method, where the method includes:

receiving a link aggregation request, where the link aggregation request is used to request to perform transmission of a same type of data stream over a plurality of links;

generating and sending a link aggregation response, where the link aggregation response represents whether the transmission of the same type of data stream over the plurality of links is accepted or not; and performing data transmission based on the link aggregation response.

According to the method provided in this embodiment, an interaction procedure for implementing link aggregation is provided. By exchanging the link aggregation request and the link aggregation response, two data transmission apparatuses can perform transmission of the same type of data stream over the plurality of links, so that the transmission of the same type of data stream can be performed over the plurality of links simultaneously. Therefore, total transmission bandwidth of this type of data stream is increased, and a function of aggregating the plurality of links to perform data transmission is implemented, speeding up data transmission, and improving data transmission efficiency.

In a possible implementation, the link aggregation request includes a stream type indication and a member link indication, where the stream type indication is used to indicate a type of a data stream whose transmission is allowed over the plurality of links, and the member link indication is used to indicate each of the plurality of links.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the plurality of links is accepted, and the failure state represents that the transmission of the same type of data stream over the plurality of links is not accepted.

In a possible implementation, the link aggregation request includes an aggregated link identifier, the aggregated link identifier is used to identify an aggregated link, and the aggregated link is a set of the plurality of links for the transmission of the same type of data stream.

In a possible implementation, the link aggregation request further includes a primary link indication, and the primary link indication is used to indicate a primary link in the plurality of links. The primary link may be a link used for transmission of a BAR or a BA in the plurality of links for the transmission of the same type of data stream.

In a possible implementation, the link aggregation request further includes a transport mode indication, the transport mode indication is used to indicate either of a first transport mode and a second transport mode, the first transport mode is a mode in which transmission of same data is performed over different links in the plurality of links, and the second transport mode is a mode in which transmission of different data is performed over different links in the plurality of links.

In a possible implementation, the link aggregation request further includes a management frame indication, and the management frame indication is used to indicate whether to perform transmission of a management frame on the plurality of links.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the plurality of links.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

According to a third aspect, an embodiment of this application provides a data transmission method, used for a first data transmission apparatus, where the method includes:

generating a link aggregation request and sending the link aggregation request to a second data transmission apparatus, where the link aggregation request is used to request to perform transmission of a same type of data stream over a link between the first data transmission apparatus and the second data transmission apparatus and over a link between the first data transmission apparatus and a third data transmission apparatus;

performing transmission of a data stream over the link between the first data transmission apparatus and the second data transmission apparatus, where a type of the data stream is the same as a type of a data stream whose transmission is performed over the link between the first data transmission apparatus and the third data transmission apparatus; and performing transmission of a data stream over the link between the first data transmission apparatus and the third data transmission apparatus, where a type of the data stream is the same as a type of a data stream whose transmission is performed over the link between the first data transmission apparatus and the second data transmission apparatus.

According to the method provided in this embodiment, a method for implementing link aggregation by using dual connectivity is provided. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, after the generating a link aggregation request and sending the link aggregation request to a second data transmission apparatus, the method further includes:

receiving a link aggregation response of the second data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, before the generating a link aggregation request and sending the link aggregation request to a second data transmission apparatus, the method further includes:

sending an identifier of the third data transmission apparatus to the second data transmission apparatus; or including an identifier of the third data transmission apparatus in the link aggregation request.

According to a fourth aspect, an embodiment of this application provides a data transmission method, used for a second data transmission apparatus, where the method includes:

receiving a link aggregation request of a first data transmission apparatus, where the link aggregation request is used to request to perform transmission of a same type of data stream over a link between the first data transmission apparatus and the second data transmission apparatus and over a link between the first data transmission apparatus and a third data transmission apparatus;

generating indication information and sending the indication information to the third data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and performing transmission of a data stream over the link between the first data transmission apparatus and the second data transmission apparatus, where a type of the data stream is the same as a type of a data stream whose transmission is performed over the link between the first data transmission apparatus and the third data transmission apparatus.

According to the method provided in this embodiment, a method for implementing link aggregation by using dual connectivity is provided. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, after the receiving a link aggregation request of a first data transmission apparatus, the method further includes:

generating a link aggregation response and sending the link aggregation response to the first data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, before the generating indication information and sending the indication information to the third data transmission apparatus, the method further includes:

receiving an identifier of the third data transmission apparatus from the first data transmission apparatus; or obtaining the identifier of the third data transmission apparatus carried in the link aggregation request.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an enhanced distributed channel access forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

According to a fifth aspect, an embodiment of this application provides a data transmission method, used for a third data transmission apparatus, where the method includes:

receiving indication information of a second data transmission apparatus, where the indication information is used to indicate that a type of a data stream whose transmission is performed by the third data transmission apparatus over a link between a first data transmission apparatus and the third data transmission apparatus is the same as a type of a data stream whose transmission is performed by the third data transmission apparatus over a link between the second data transmission apparatus and the first data transmission apparatus; and performing transmission of a data stream over the link between the first data transmission apparatus and the third data transmission apparatus based on the indication information, where a type of the data stream is the same as a type of a data stream whose transmission is performed over the link between the first data transmission apparatus and the second data transmission apparatus.

According to the method provided in this embodiment, a method for implementing link aggregation by using dual connectivity is provided. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

According to a sixth aspect, an embodiment of this application provides a data transmission method, used for a first data transmission apparatus, where the method includes:

performing transmission of a data stream over a link between the first data transmission apparatus and a second data transmission apparatus, where a type of the data stream is the same as a type of a data stream whose transmission is performed over a link between the first data transmission apparatus and a third data transmission apparatus; and performing transmission of a data stream over the link between the first data transmission apparatus and the third data transmission apparatus, where a type of the data stream is the same as a type of a data stream whose transmission is performed over the link between the first data transmission apparatus and the second data transmission apparatus.

According to the method provided in this embodiment, a method for implementing link aggregation by using dual connectivity is provided. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, before the performing transmission of a data stream over a link between the first data transmission apparatus and a second data transmission apparatus, the method further includes:

sending an identifier of the third data transmission apparatus to the second data transmission apparatus.

According to a seventh aspect, an embodiment of this application provides a data transmission method, used for a second data transmission apparatus, where the method includes:

generating a link aggregation request and sending the link aggregation request to a third data transmission apparatus, where the link aggregation request is used to request to perform transmission of a same type of data stream over a link between a first data transmission apparatus and the second data transmission apparatus and over a link between the first data transmission apparatus and the third data transmission apparatus;

receiving a link aggregation response of the third data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not;

based on the link aggregation response, generating indication information and sending the indication information to the third data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and performing transmission of a data stream over the link between the first data transmission apparatus and the second data transmission apparatus, where a type of the data stream is the same as a type of a data stream whose transmission is performed over the link between the first data transmission apparatus and the third data transmission apparatus.

According to the method provided in this embodiment, a method for implementing link aggregation by using dual connectivity is provided. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, before the generating a link aggregation request and sending the link aggregation request to a third data transmission apparatus, the method further includes:
receiving an identifier of the third data transmission apparatus from the first data transmission apparatus.

According to an eighth aspect, an embodiment of this application provides a data transmission method, used for a third data transmission apparatus, where the method includes:
receiving a link aggregation request of a second data transmission apparatus, where the link aggregation request is used to request to perform transmission of a same type of data stream over a link between a first data transmission apparatus and the second data transmission apparatus and over a link between the first data transmission apparatus and the third data transmission apparatus;
generating a link aggregation response and sending the link aggregation response to the second data transmission apparatus, where the link aggregation response represents whether the transmission of the same type of data stream over the plurality of links is accepted or not;
receiving indication information of the second data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and
performing transmission of a data stream over the link between the first data transmission apparatus and the third data transmission apparatus based on the indication information, where a type of the data stream is the same as a type of a data stream whose transmission is performed over the link between the second data transmission apparatus and the first data transmission apparatus.

According to the method provided in this embodiment, a method for implementing link aggregation by using dual connectivity is provided. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, after the receiving a link aggregation request, the method further includes:
  when the plurality of links are all links of a local end, performing transmission of the same type of data stream over the plurality of links;
  when the plurality of links include a link corresponding to the third data transmission apparatus, generating indication information and sending the indication information to the third data transmission apparatus; and
  when an identifier of the third data transmission apparatus is received, generating indication information and sending the indication information to the third data transmission apparatus.

According to a ninth aspect, an embodiment of this application provides a data transmission method, where the method includes:
  sending capability information, where the capability information represents whether a backhaul link for transmission of a data stream can be planned;
  receiving path planning information, where the path planning information is used to indicate a correspondence between a backhaul link and a type of a data stream; and
  if a data stream is received, performing data transmission based on a type of the data stream and the path planning information.

According to the method provided in this embodiment, a data transmission apparatus sends capability information to a control apparatus with reference to a capability of the data transmission apparatus, and plans, based on path planning information delivered by the control apparatus, a specific type of data stream whose transmission is to be performed over a specific backhaul link. In this way, a transmission path of the data stream is optimized, and quality of service (QoS) is improved.

According to a tenth aspect, an embodiment of this application provides a data transmission method, where the method includes:
  receiving capability information of a plurality of data transmission apparatuses, where the capability information represents whether a backhaul link for transmission of a data stream can be planned;
  generating path planning information based on the capability information of the plurality of data transmission apparatuses, where the path planning information is used to indicate a correspondence between a backhaul link and a type of a data stream; and
  sending the path planning information to the plurality of data transmission apparatuses.

According to the method provided in this embodiment, a control apparatus plans, based on capabilities of data transmission apparatuses, a data stream whose transmission is to be performed over a backhaul link, and delivers path planning information to the data transmission apparatuses, so that a specific type of data stream whose transmission is to be performed over a specific backhaul link can be well planned. In this way, a transmission path of the data stream is optimized, and QoS can be improved.

According to an eleventh aspect, an embodiment of this application provides a data transmission apparatus, configured to perform the data transmission method according to any one of the first aspect or the possible implementations of the first aspect. Specifically, the apparatus includes a unit configured to perform the data transmission method according to any one of the first aspect or the possible implementations of the first aspect.

According to a twelfth aspect, an embodiment of this application provides a data transmission apparatus, configured to perform the data transmission method according to any one of the second aspect or the possible implementations of the second aspect. Specifically, the apparatus includes a unit configured to perform the data transmission method according to any one of the second aspect or the possible implementations of the second aspect.

According to a thirteenth aspect, an embodiment of this application provides a data transmission apparatus, where the apparatus includes:
  a generation unit, configured to generate a link aggregation request, where the link aggregation request is used to request to perform transmission of a same type of data stream over a link between the first data transmission apparatus and a second data transmission apparatus and over a link between the first data transmission apparatus and a third data transmission apparatus;
  a sending unit, configured to send the link aggregation request; and
  a transmission unit, configured to perform transmission of a data stream over the link between the first data transmission apparatus and the second data transmission apparatus, where a type of the data stream is the same as a type of a data stream whose transmission is performed over the link between the first data transmission apparatus and the third data transmission apparatus; and
  the transmission unit is further configured to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The apparatus provided in this embodiment can implement link aggregation by using dual connectivity. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, after the generating a link aggregation request and sending the link aggregation request to a second data transmission apparatus, the method further includes:

receiving a link aggregation response of the second data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, before the generating a link aggregation request and sending the link aggregation request to a second data transmission apparatus, the method further includes:

sending an identifier of the third data transmission apparatus to the second data transmission apparatus; or including an identifier of the third data transmission apparatus in the link aggregation request.

According to a fourteenth aspect, an embodiment of this application provides a data transmission apparatus, where the apparatus includes:

a receiving unit, configured to receive a link aggregation request of a first data transmission apparatus, where the link aggregation request is used to request to perform transmission of a same type of data stream over a link between the first data transmission apparatus and the second data transmission apparatus and over a link between the first data transmission apparatus and a third data transmission apparatus;

a generation unit, configured to generate indication information, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus;

a sending unit, configured to send the indication information to the third data transmission apparatus; and a transmission unit, configured to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

According to the apparatus provided in this embodiment, a method for implementing link aggregation by using dual connectivity is provided. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, after the receiving a link aggregation request of a first data transmission apparatus, the method further includes:

generating a link aggregation response and sending the link aggregation response to the first data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, before the generating indication information and sending the indication information to the third data transmission apparatus, the method further includes:

receiving an identifier of the third data transmission apparatus from the first data transmission apparatus; or obtaining the identifier of the third data transmission apparatus carried in the link aggregation request.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an enhanced distributed channel access forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

According to a fifteenth aspect, an embodiment of this application provides a data transmission apparatus, where the apparatus includes:
  a receiving unit, configured to receive indication information of a second data transmission apparatus, where the indication information is used to indicate that a type of a data stream whose transmission is performed by the third data transmission apparatus over a link between a first data transmission apparatus and the third data transmission apparatus is the same as a type of a data stream whose transmission is performed by the third data transmission apparatus over a link between the second data transmission apparatus and the first data transmission apparatus; and
  a transmission unit, configured to perform transmission of a data stream over the link between the first data transmission apparatus and the third data transmission apparatus based on the indication information, where a type of the data stream is the same as a type of a data stream whose transmission is performed over the link between the first data transmission apparatus and the second data transmission apparatus.

The apparatus provided in this embodiment implements a function of link aggregation by using dual connectivity. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

According to a sixteenth aspect, an embodiment of this application provides a data transmission apparatus, where the apparatus includes:
  a first transmission unit, configured to perform transmission of a data stream over a link between the first data transmission apparatus and a second data transmission apparatus, where a type of the data stream is the same as a type of a data stream whose transmission is performed over a link between the first data transmission apparatus and a third data transmission apparatus; and
  a second transmission unit, configured to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The apparatus provided in this embodiment implements a function of link aggregation by using dual connectivity. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, before the performing transmission of a data stream over a link between the first data transmission apparatus and a second data transmission apparatus, the method further includes:
  sending an identifier of the third data transmission apparatus to the second data transmission apparatus.

According to a seventeenth aspect, an embodiment of this application provides a data transmission apparatus, where the apparatus includes:
  a generation unit, configured to generate a link aggregation request, where the link aggregation request is used to request to perform transmission of a same type of data stream over a link between a first data transmission apparatus and a second data transmission apparatus and over a link between the first data transmission apparatus and the third data transmission apparatus;
  a sending unit, configured to send the link aggregation request to the third data transmission apparatus;
  a receiving unit, configured to receive a link aggregation response of the third data transmission apparatus, where the link aggregation response represents whether the transmission of the same type of data stream over the plurality of links is accepted or not, where
  the generation unit is further configured to: based on the link aggregation response, generate indication information and send the indication information to the third data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and the sending unit is further configured to send the indication information to the third data transmission apparatus; and a transmission unit, configured to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

The apparatus provided in this embodiment implements a function of link aggregation by using dual connectivity. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, before the generating a link aggregation request and sending the link aggregation request to a third data transmission apparatus, the method further includes:
receiving an identifier of the third data transmission apparatus from the first data transmission apparatus.

According to an eighteenth aspect, an embodiment of this application provides a data transmission apparatus, where the apparatus includes:
a receiving unit, configured to receive a link aggregation request of a second data transmission apparatus, where the link aggregation request is used to request to perform transmission of a same type of data stream over a link between the first data transmission apparatus and the second data transmission apparatus and over a link between the first data transmission apparatus and a third data transmission apparatus;

a generation unit, configured to generate a link aggregation response, where the link aggregation response represents whether the transmission of the same type of data stream over the link between the first data transmission apparatus and the second data transmission apparatus and over the link between the first data transmission apparatus and the third data transmission apparatus is accepted or not;

a sending unit, configured to send the link aggregation response to the second data transmission apparatus, where the receiving unit is further configured to receive indication information of the second data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and a transmission unit, configured to perform transmission of a data stream over the link between the first data transmission apparatus and the third data transmission apparatus, where a type of the data stream is the same as a type of a data stream whose transmission is performed by the third data transmission apparatus over the link between the second data transmission apparatus and the first data transmission apparatus.

The apparatus provided in this embodiment implements a function of link aggregation by using dual connectivity. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, when the plurality of links are all links of a local end, the transmission of the same type of data stream is performed over the plurality of links;

when the plurality of links include a link corresponding to the third data transmission apparatus, indication information is generated and sent to the third data transmission apparatus; and when an identifier of the third data transmission apparatus is received, indication information is generated and sent to the third data transmission apparatus.

According to a nineteenth aspect, an embodiment of this application provides a data transmission apparatus, where the apparatus includes:

a sending unit, configured to send capability information, where the capability information represents whether a backhaul link for transmission of a data stream can be planned;

a receiving unit, configured to receive path planning information, where the path planning information is used to indicate a correspondence between a backhaul link and a type of a data stream; and a transmission unit, configured to: if a data stream is received, perform data transmission based on a type of the data stream and the path planning information.

According to a twentieth aspect, an embodiment of this application provides a data transmission apparatus, where the apparatus includes:

a receiving unit, configured to receive capability information of a plurality of data transmission apparatuses, where the capability information represents whether a backhaul link for transmission of a data stream can be planned;

a generation unit, configured to generate path planning information based on the capability information of the plurality of data transmission apparatuses, where the path planning information is used to indicate a correspondence between a backhaul link and a type of a data stream; and a sending unit, configured to send the path planning information to the plurality of data transmission apparatuses.

According to a twenty-first aspect, an embodiment of this application provides a data transmission apparatus, where the apparatus includes a processor and a transceiver that is internally connected to and communicates with the processor, where the processor is configured to generate a link aggregation request, where the link aggregation request is used to request to perform transmission of a same type of data stream over a plurality of links;

the transceiver is configured to send the link aggregation request; and the transceiver is further configured to receive a link aggregation response, where the link aggregation response represents whether the transmission of the same type of data stream over the plurality of links is accepted or not.

In a possible implementation, the link aggregation request includes a stream type indication and a member link indication, where the stream type indication is used to indicate a type of a data stream whose transmission is allowed over the plurality of links, and the member link indication is used to indicate each of the plurality of links.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the plurality of links is accepted, and the failure state represents that the transmission of the same type of data stream over the plurality of links is not accepted.

In a possible implementation, the stream type indication is a traffic identifier TID indication, and the TID indication is used to indicate a TID of the same type of data stream whose transmission is performed over the plurality of links.

In a possible implementation, the stream type indication is the TID of the data stream.

In a possible implementation, the stream type indication is a stream matching rule, where the stream matching rule is used to perform matching between the data stream and an aggregated link, and the aggregated link is a set of the plurality of links for the transmission of the same type of data stream.

In a possible implementation, the link aggregation request includes an aggregated link identifier, the aggregated link identifier is used to identify an aggregated link, and the aggregated link is a set of the plurality of links for the transmission of the same type of data stream.

In a possible implementation, the link aggregation request further includes a primary link indication, and the primary link indication is used to indicate a primary link in the plurality of links. The primary link may be a link used for transmission of a BAR or a BA in the plurality of links for the transmission of the same type of data stream.

When the primary link indication is used, for data whose transmission is performed over a secondary link, the transmission of the data is performed over the secondary link, and transmission of a BAR/BA of the data is performed over the primary link, so as to implement a function of performing the transmission of the BAR/BA and the transmission of the data over the different links, that is, separating the BAR/BA from the data.

In a possible implementation, the link aggregation request further includes a transport mode indication, the transport mode indication is used to indicate either of a first transport mode and a second transport mode, the first transport mode is a mode in which transmission of same data is performed over different links in the plurality of links, and the second transport mode is a mode in which transmission of different data is performed over different links in the plurality of links.

When the first transport mode is used, even if data whose transmission is performed over a link is lost, the data in the link can still be received over another link. This improves transmission reliability. When the second transport mode is used, the transmission of the same type of data stream can be performed over the plurality of links simultaneously, to speed up the data transmission and improve the data transmission efficiency.

In a possible implementation, the link aggregation request further includes a management frame indication, and the management frame indication is used to indicate whether to perform transmission of a management frame on the plurality of links.

The management frame indication is carried in a link aggregation request indication, so that the first data transmission apparatus and the second data transmission apparatus can perform transmission of the same type of data stream over the plurality of links specified in the link aggregation request, and perform transmission of the management frame over the link other than the plurality of links. In this way, the transmission of the data stream and the transmission of the management frame can be performed over different links, so that a function of separating a management plane and a data plane from each other is implemented.

In a possible implementation, the link aggregation request further includes a downlink/uplink indication.

The downlink/uplink indication may be used to separate uplink transmission and downlink transmission of the same type of data stream from each other, and the uplink transmission and the downlink transmission are respectively carried on different member links.

In a possible implementation, the link aggregation request further includes a TSN indication, and the time sensitive networking indication is used to indicate whether transmission of time sensitive networking data is allowed over the plurality of links.

The time sensitive networking indication is used to specify whether the transmission of the time sensitive networking data is performed over a plurality of links. In this way, for a time sensitive networking that has a high transmission rate requirement, transmission of time sensitive networking data may be performed over a plurality of links, to speed up the data transmission and reduce a data transmission delay.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication. The switch-only-data-frame indication is used to indicate to switch a link for transmission of a data frame. When the switch-only-data-frame indication is used, transmission of a data frame and transmission of a control frame are performed over different links. In this way, data transmission on a data plane and data transmission on a control plane are separated from each other.

According to a twenty-second aspect, an embodiment of this application provides a data transmission apparatus, where the apparatus includes a processor and a transceiver that is internally connected to and communicates with the processor, where the transceiver is configured to receive a link aggregation request, where the link aggregation request is used to request to perform transmission of a same type of data stream over a plurality of links;
   the processor is configured to generate a link aggregation response, where the link aggregation response represents whether the transmission of the same type of data stream over the plurality of links is accepted or not;
   the transceiver is further configured to send the link aggregation response; and
   the processor is further configured to control the transceiver to perform data transmission based on the link aggregation response.

In a possible implementation, the link aggregation request includes a stream type indication and a member link indication, where the stream type indication is used to indicate a type of a data stream whose transmission is allowed over the plurality of links, and the member link indication is used to indicate each of the plurality of links.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the plurality of links is accepted, and the failure state represents that the transmission of the same type of data stream over the plurality of links is not accepted.

In a possible implementation, the link aggregation request includes an aggregated link identifier, the aggregated link identifier is used to identify an aggregated link, and the aggregated link is a set of the plurality of links for the transmission of the same type of data stream.

In a possible implementation, the link aggregation request further includes a primary link indication, and the primary link indication is used to indicate a primary link in the plurality of links. The primary link may be a link used for transmission of a BAR or a BA in the plurality of links for the transmission of the same type of data stream.

In a possible implementation, the link aggregation request further includes a transport mode indication, the transport mode indication is used to indicate either of a first transport mode and a second transport mode, the first transport mode is a mode in which transmission of same data is performed over different links in the plurality of links, and the second transport mode is a mode in which transmission of different data is performed over different links in the plurality of links.

In a possible implementation, the link aggregation request further includes a management frame indication, and the management frame indication is used to indicate whether to perform transmission of a management frame on the plurality of links.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the plurality of links.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

According to a twenty-third aspect, an embodiment of this application provides a data transmission apparatus, where the apparatus includes a processor and a transceiver that is internally connected to and communicates with the processor, where
   the processor is configured to generate a link aggregation request, where the link aggregation request is used to request to perform transmission of a same type of data stream over a link between the first data transmission apparatus and a second data transmission apparatus and over a link between the first data transmission apparatus and a third data transmission apparatus;
   the transceiver is configured to send the link aggregation request to the second data transmission apparatus;

the processor is further configured to control the transceiver to perform transmission of a data stream over the link between the first data transmission apparatus and the second data transmission apparatus, where a type of the data stream is the same as a type of a data stream whose transmission is performed over the link between the first data transmission apparatus and the third data transmission apparatus; and the processor is further configured to control the transceiver to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

In a possible implementation, after the generating a link aggregation request and sending the link aggregation request to a second data transmission apparatus, the method further includes:

receiving a link aggregation response of the second data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, the transceiver is further configured to send an identifier of the third data transmission apparatus to the second data transmission apparatus; or include an identifier of the third data transmission apparatus in the link aggregation request.

According to a twenty-fourth aspect, an embodiment of this application provides a data transmission apparatus, where the apparatus includes a processor and a transceiver that is internally connected to and communicates with the processor, where the transceiver is configured to receive a link aggregation request of a first data transmission apparatus, where the link aggregation request is used to request to perform transmission of a same type of data stream over a link between the first data transmission apparatus and the second data transmission apparatus and over a link between the first data transmission apparatus and a third data transmission apparatus;

the processor is configured to generate indication information, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus;

the transceiver is configured to send the indication information to the third data transmission apparatus; and the processor is further configured to control the transceiver to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

In a possible implementation, after the receiving a link aggregation request of a first data transmission apparatus, the method further includes:

generating a link aggregation response and sending the link aggregation response to the first data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, before the generating indication information and sending the indication information to the third data transmission apparatus, the method further includes:

receiving an identifier of the third data transmission apparatus from the first data transmission apparatus; or obtaining the identifier of the third data transmission apparatus carried in the link aggregation request.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an enhanced distributed channel access forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

According to a twenty-fifth aspect, an embodiment of this application provides a data transmission apparatus, where the apparatus includes a processor and a transceiver that is internally connected to and communicates with the processor, where the transceiver is configured to receive indication information of a second data transmission apparatus, where the indication information is used to indicate that a type of a data stream whose transmission is performed by the third data transmission apparatus over a link between a first data transmission apparatus and the third data transmission apparatus is the same as a type of a data stream whose transmission is performed by the third data transmission apparatus over a link between the second data transmission apparatus and the first data transmission apparatus; and the processor is configured to perform transmission of a data stream over the link between the first data transmission apparatus and the third data transmission apparatus based on the indication information, where a type of the data stream is the same as a type of a data stream whose transmission is performed over the link between the first data transmission apparatus and the second data transmission apparatus.

According to a twenty-sixth aspect, an embodiment of this application provides a data transmission apparatus, where the apparatus includes a processor and a transceiver that is internally connected to and communicates with the processor, where the processor is configured to control the transceiver to perform transmission of a data stream over the link between the first data transmission apparatus and a second data transmission apparatus, where a type of the data stream is the same as a type of a data stream whose transmission is performed over the link between the first data transmission apparatus and a third data transmission apparatus; and the processor is further configured to control the transceiver to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

In a possible implementation, the transceiver is further configured to send an identifier of the third data transmission apparatus to the second data transmission apparatus.

According to a twenty-seventh aspect, an embodiment of this application provides a data transmission apparatus, where the apparatus includes a processor and a transceiver that is internally connected to and communicates with the processor, where the processor is further configured to generate a link aggregation request, where the link aggregation request is used to request to perform transmission of a same type of data stream over a link between a first data transmission apparatus and the second data transmission apparatus and over a link between the first data transmission apparatus and a third data transmission apparatus;

the transceiver is configured to send the link aggregation request to the third data transmission apparatus;

the transceiver is further configured to receive a link aggregation response of the third data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not;

the processor is configured to generate indication information based on the link aggregation response, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus;

the transceiver is further configured to send the indication information to the third data transmission apparatus; and the processor is further configured to control the transceiver to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, before the generating a link aggregation request and sending the link aggregation request to a third data transmission apparatus, the method further includes:

receiving an identifier of the third data transmission apparatus from the first data transmission apparatus.

According to a twenty-eighth aspect, an embodiment of this application provides a data transmission apparatus, where the apparatus includes a processor and a transceiver that is internally connected to and communicates with the processor, where the transceiver is configured to receive a link aggregation request of a second data transmission apparatus, where the link aggregation request is used to request to perform transmission of a same type of data stream over a link between a first data transmission apparatus and the second data transmission apparatus and over a link between the first data transmission apparatus and the third data transmission apparatus;

the processor is configured to generate a link aggregation response, where the link aggregation response represents whether the transmission of the same type of data stream over the plurality of links is accepted or not;

the transceiver is further configured to send the link aggregation response to the second data transmission apparatus;

the transceiver is configured to receive indication information of the second data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and the processor is configured to generate indication information based on the link aggregation response, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

In a possible implementation, when the plurality of links are all links of a local end, the transmission of the same type of data stream is performed over the plurality of links;

when the plurality of links include a link corresponding to the third data transmission apparatus, indication information is generated and sent to the third data transmission apparatus; and when an identifier of the third data transmission apparatus is received, indication information is generated and sent to the third data transmission apparatus.

According to a twenty-ninth aspect, an embodiment of this application provides a data transmission apparatus, where the apparatus includes a processor and a transceiver that is internally connected to and communicates with the processor, where the transceiver is configured to send capability information, where the capability information represents whether a backhaul link for transmission of a data stream can be planned;
the transceiver is further configured to receive path planning information, where the path planning information is used to indicate a correspondence between a backhaul link and a type of a data stream; and
the processor is configured to: if a data stream is received, control the transceiver to perform data transmission based on a type of the data stream and the path planning information.

The data transmission apparatus provided in the twenty-ninth aspect is configured to perform the ninth aspect. For specific details, refer to the ninth aspect. Details are not described herein again.

According to a thirtieth aspect, an embodiment of this application provides a data transmission apparatus, where the apparatus includes a processor and a transceiver that is internally connected to and communicates with the processor, where the transceiver is configured to receive capability information of a plurality of data transmission apparatuses, where the capability information represents whether a backhaul link for transmission of a data stream can be planned;
the processor is configured to generate path planning information based on the capability information of the plurality of data transmission apparatuses, where the path planning information is used to indicate a correspondence between a backhaul link and a type of a data stream; and
the transceiver is further configured to send the path planning information to the plurality of data transmission apparatuses.

The data transmission apparatus provided in the thirtieth aspect is configured to perform the tenth aspect. For specific details, refer to the tenth aspect. Details are not described herein again.

According to a thirty-first aspect, an embodiment of this application provides a computer-readable storage medium, configured to store a computer program, where the computer program includes instructions used to perform any one of the first aspect or the possible implementations of the first aspect.

According to a thirty-second aspect, an embodiment of this application provides a computer-readable storage medium, configured to store a computer program, where the computer program includes instructions used to perform any one of the second aspect or the possible implementations of the second aspect.

According to a thirty-third aspect, an embodiment of this application provides a computer-readable storage medium, configured to store a computer program, where the computer program includes instructions used to perform any one of the third aspect or the possible implementations of the third aspect.

According to a thirty-fourth aspect, an embodiment of this application provides a computer-readable storage medium, configured to store a computer program, where the computer program includes instructions used to perform any one of the fourth aspect or the possible implementations of the fourth aspect.

According to a thirty-fifth aspect, an embodiment of this application provides a computer-readable storage medium, configured to store a computer program, where the computer program includes instructions used to perform any one of the fifth aspect or the possible implementations of the fifth aspect.

According to a thirty-sixth aspect, an embodiment of this application provides a computer-readable storage medium, configured to store a computer program, where the computer program includes instructions used to perform any one of the sixth aspect or the possible implementations of the sixth aspect.

According to a thirty-seventh aspect, an embodiment of this application provides a computer-readable storage medium, configured to store a computer program, where the computer program includes instructions used to perform any one of the seventh aspect or the possible implementations of the seventh aspect.

According to a thirty-eighth aspect, an embodiment of this application provides a computer-readable storage medium, configured to store a computer program, where the computer program includes instructions used to perform any one of the eighth aspect or the possible implementations of the eighth aspect.

According to a thirty-ninth aspect, an embodiment of this application provides a computer-readable storage medium, configured to store a computer program, where the computer program includes instructions used to perform any one of the ninth aspect or the possible implementations of the ninth aspect.

According to a fortieth aspect, an embodiment of this application provides a computer-readable storage medium, configured to store a computer program, where the computer program includes instructions used to perform any one of the tenth aspect or the possible implementations of the tenth aspect.

According to a forty-first aspect, an embodiment of this application provides a computer program, where the computer program includes instructions used to perform any one of the first aspect or the possible implementations of the first aspect.

According to a forty-second aspect, an embodiment of this application provides a computer program, where the computer program includes instructions used to perform any one of the second aspect or the possible implementations of the second aspect.

According to a forty-third aspect, an embodiment of this application provides a computer program, where the computer program includes instructions used to perform any one of the third aspect or the possible implementations of the third aspect.

According to a forty-fourth aspect, an embodiment of this application provides a computer program, where the computer program includes instructions used to perform any one of the fourth aspect or the possible implementations of the fourth aspect.

According to a forty-fifth aspect, an embodiment of this application provides a computer program, where the computer program includes instructions used to perform any one of the fifth aspect or the possible implementations of the fifth aspect.

According to a forty-sixth aspect, an embodiment of this application provides a computer program, where the computer program includes instructions used to perform any one of the sixth aspect or the possible implementations of the sixth aspect.

According to a forty-seventh aspect, an embodiment of this application provides a computer program, where the computer program includes instructions used to perform any one of the seventh aspect or the possible implementations of the seventh aspect.

According to a forty-eighth aspect, an embodiment of this application provides a computer program, where the computer program includes instructions used to perform any one of the eighth aspect or the possible implementations of the eighth aspect.

According to a forty-ninth aspect, an embodiment of this application provides a computer program, where the computer program includes instructions used to perform any one of the ninth aspect or the possible implementations of the ninth aspect.

According to a fiftieth aspect, an embodiment of this application provides a computer program, where the computer program includes instructions used to perform any one of the tenth aspect or the possible implementations of the tenth aspect.

According to a fifty-first aspect, an embodiment of this application provides a data transmission apparatus, where the apparatus includes a processing circuit and an output interface and an input interface that are internally connected to and communicate with the processing circuit, where the processing circuit is configured to generate a link aggregation request, where the link aggregation request is used to request to perform transmission of a same type of data stream over a plurality of links; the output interface is configured to send the link aggregation request; and the input interface is configured to receive a link aggregation response, where the link aggregation response represents whether the transmission of the same type of data stream over the plurality of links is accepted or not.

The data transmission apparatus provided in the fifty-first aspect is configured to perform any one of the first aspect or the possible implementations of the first aspect. For specific details, refer to any one of the first aspect or the possible implementations of the first aspect. Details are not described herein again.

According to a fifty-second aspect, an embodiment of this application provides a data transmission apparatus, where the apparatus includes a processing circuit and an input interface and an output interface that are internally connected to and communicate with the processing circuit, where the input interface is configured to receive a link aggregation request, where the link aggregation request is used to request to perform transmission of a same type of data stream over a plurality of links; the processing circuit is configured to generate a link aggregation response, where the link aggregation response represents whether the transmission of the same type of the data stream over the plurality of links is accepted or not; the output interface is configured to send the link aggregation response; and the processor is further configured to control the input interface or the output interface to perform data transmission based on the link aggregation response.

The data transmission apparatus provided in the fifty-second aspect is configured to perform any one of the second aspect or the possible implementations of the second aspect. For specific details, refer to any one of the second aspect or the possible implementations of the second aspect. Details are not described herein again.

According to a fifty-third aspect, an embodiment of this application provides a data transmission apparatus, where the apparatus includes a processing circuit and an output interface and an input interface that are internally connected to and communicate with the processing circuit, where the processing circuit is configured to generate a link aggregation request, where the link aggregation request is used to request to perform transmission of a same type of data stream over a link between the first data transmission apparatus and a second data transmission apparatus and over a link between the first data transmission apparatus and a third data transmission apparatus; the output interface is configured to send the link aggregation request to the second data transmission apparatus; the processing circuit is further configured to control the output interface or the input interface to perform transmission of a data stream over the link between the first data transmission apparatus and the second data transmission apparatus, where a type of the data stream is the same as a type of a data stream whose transmission is performed over the link between the first data transmission apparatus and the third data transmission apparatus; and the processing circuit is further configured to control the output interface or the input interface to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The data transmission apparatus provided in the fifty-third aspect is configured to perform any one of the third aspect or the possible implementations of the third aspect. For specific details, refer to any one of the third aspect or the possible implementations of the third aspect. Details are not described herein again.

According to a fifty-fourth aspect, an embodiment of this application provides a data transmission apparatus, where the apparatus includes a processing circuit and an output interface and an input interface that are internally connected to and communicate with the processing circuit, where the input interface is configured to receive a link aggregation request of a first data transmission apparatus, where the link aggregation request is used to request to perform transmission of a same type of data stream over a link between the first data transmission apparatus and the second data transmission apparatus and over a link between the first data transmission apparatus and a third data transmission apparatus;

the processing circuit is configured to generate indication information, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus;

the output interface is configured to send the indication information to the third data transmission apparatus; and the processing circuit is further configured to control the output interface or the input interface to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

The data transmission apparatus provided in the fifty-fourth aspect is configured to perform any one of the fourth aspect or the possible implementations of the fourth aspect. For specific details, refer to any one of the fourth aspect or the possible implementations of the fourth aspect. Details are not described herein again.

According to a fifty-fifth aspect, an embodiment of this application provides a data transmission apparatus, where the apparatus includes a processing circuit and an output interface and an input interface that are internally connected to and communicate with the processing circuit, where the input interface is configured to receive indication information of a second data transmission apparatus, where the indication information is used to indicate that a type of a data stream whose transmission is performed by the third data transmission apparatus over a link between a first data transmission apparatus and the third data transmission apparatus is the same as a type of a data stream whose transmission is performed by the third data transmission apparatus over a link between the second data transmission apparatus and the first data transmission apparatus; and the processing circuit is further configured to control, based on the indication information, the output interface or the input interface to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The data transmission apparatus provided in the fifty-fifth aspect is configured to perform the fifth aspect. For specific details, refer to the fifth aspect. Details are not described herein again.

According to a fifty-sixth aspect, an embodiment of this application provides a data transmission apparatus, where the apparatus includes a processing circuit and an output interface and an input interface that are internally connected to and communicate with the processing circuit, where the processing circuit is configured to control the output interface or the input interface to perform transmission of a data stream over a link between the first data transmission apparatus and a second data transmission apparatus, where a type of the data stream is the same as a type of a data stream whose transmission is performed over a link between the first data transmission apparatus and a third data transmission apparatus; and the processing circuit is further configured to control the output interface or the input interface to perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The data transmission apparatus provided in the fifty-sixth aspect is configured to perform the sixth aspect. For specific details, refer to the sixth aspect. Details are not described herein again.

According to a fifty-seventh aspect, an embodiment of this application provides a data transmission apparatus, where the apparatus includes a processing circuit and an output interface and an input interface that are internally connected to and communicate with the processing circuit, where the processing circuit is further configured to generate a link aggregation request, where the link aggregation request is used to request to perform transmission of a same type of data stream over a link between a first data transmission apparatus and the second data transmission apparatus and over a link between the first data transmission apparatus and a third data transmission apparatus;

the output interface is configured to send the link aggregation request to the third data transmission apparatus;

the input interface is configured to receive a link aggregation response of the third data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not;

the processing circuit is configured to generate indication information based on the link aggregation response, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus;

the output interface is further configured to send the indication information to the third data transmission apparatus; and the processing circuit is further configured to control the output interface or the input interface to perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

The data transmission apparatus provided in the fifty-seventh aspect is configured to perform the seventh aspect. For specific details, refer to the seventh aspect. Details are not described herein again.

According to a fifty-eighth aspect, an embodiment of this application provides a data transmission apparatus, where the apparatus includes a processing circuit and an output interface and an input interface that are internally connected to and communicate with the processing circuit, where the input interface is configured to receive a link aggregation request of a second data transmission apparatus, where the link aggregation request is used to request to perform transmission of a same type of data stream over a link between a first data transmission apparatus and the second data transmission apparatus and over a link between the first data transmission apparatus and the third data transmission apparatus;

the processing circuit is configured to generate a link aggregation response, where the link aggregation response represents whether the transmission of the same type of data stream over the plurality of links is accepted or not;

the output interface is configured to send the link aggregation response to the second data transmission apparatus;

the input interface is further configured to receive indication information of the second data transmission apparatus, where the indication information is used to indicate that a type of a data stream whose transmission is performed by the third data transmission apparatus over the link between the first data transmission apparatus and the third data transmission apparatus is the same as a type of a data stream whose transmission is performed by the third data transmission apparatus over the link between the second data transmission apparatus and the first data transmission apparatus; and the processing circuit is configured to control, based on the indication information, the output interface or the input interface to perform transmission of a data stream over the link between the first data transmission apparatus and the third data transmission apparatus, where a type of the data stream is the same as a type of a data stream whose transmission is performed over the link between the second data transmission apparatus and the first data transmission apparatus.

The data transmission apparatus provided in the fifty-eighth aspect is configured to perform the eighth aspect. For specific details, refer to the eighth aspect. Details are not described herein again.

According to a fifty-ninth aspect, an embodiment of this application provides a data transmission apparatus, where the apparatus includes a processing circuit and an output interface and an input interface that are internally connected to and communicate with the processing circuit, where the output interface is configured to send capability information, where the capability information represents whether a backhaul link for transmission of a data stream can be planned;

the input interface is further configured to receive path planning information, where the path planning information is used to indicate a correspondence between a backhaul link and a type of a data stream; and the processing circuit is configured to: if a data stream is received, control the output interface or the input interface to perform data transmission based on a type of the data stream and the path planning information.

The data transmission apparatus provided in the fifty-ninth aspect is configured to perform the ninth aspect. For specific details, refer to the ninth aspect. Details are not described herein again.

According to a sixtieth aspect, an embodiment of this application provides a data transmission apparatus, where the apparatus includes a processing circuit and an output interface and an input interface that are internally connected to and communicate with the processing circuit, where the input interface is configured to receive capability information of a plurality of data transmission apparatuses, where the capability information represents whether a backhaul link for transmission of a data stream can be planned;

the processing circuit is configured to generate path planning information based on the capability information of the plurality of data transmission apparatuses, where the path planning information is used to indicate a correspondence between a backhaul link and a type of a data stream; and the output interface is configured to send the path planning information to the plurality of data transmission apparatuses.

The data transmission apparatus provided in the sixtieth aspect is configured to perform the tenth aspect. For specific details, refer to the tenth aspect. Details are not described herein again.

According to a sixty-first aspect, an embodiment of this application provides a data transmission system. The data transmission system includes the data transmission apparatus provided in the eleventh aspect, the twenty-first aspect, or the fifty-first aspect, and the data transmission apparatus provided in the second aspect, the twenty-second aspect, or the fifty-second aspect.

According to a sixty-second aspect, an embodiment of this application provides a data transmission system. The data transmission system includes the data transmission apparatus provided in the thirteenth aspect, the twenty-third aspect, or the fifty-third aspect, the data transmission apparatus provided in the fourteenth aspect, the twenty-fourth aspect, or the fifty-fourth aspect, and the data transmission apparatus provided in the fifteenth aspect, the twenty-fifth aspect, or the fifty-fifth aspect.

According to a sixty-third aspect, an embodiment of this application provides a data transmission system. The data transmission system includes the data transmission apparatus provided in the sixteenth aspect, the twenty-sixth aspect, or the fifty-sixth aspect, the data transmission apparatus provided in the seventeenth aspect, the twenty-seventh aspect, or the fifty-seventh aspect, and the data transmission apparatus provided in the eighteenth aspect, the twenty-eighth aspect, or the fifty-eighth aspect.

According to a sixty-fourth aspect, an embodiment of this application provides a data transmission system. The data transmission system includes the data transmission apparatus provided in the nineteenth aspect, the twenty-ninth aspect, or the fifty-ninth aspect, and the data transmission apparatus provided in the twentieth aspect, the thirtieth aspect, or the sixtieth aspect.

DESCRIPTION OF EMBODIMENTS

Figure 1:
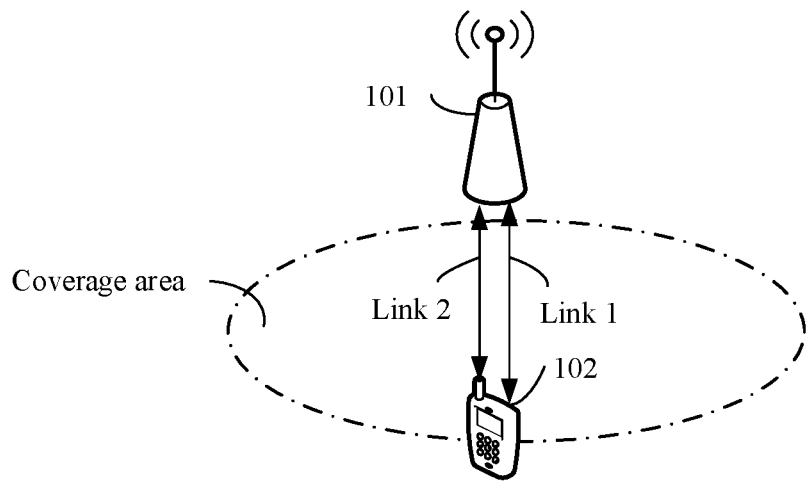
FIG. 1 shows a data transmission system used according to an embodiment of this application.

The following describes the technical solutions in the embodiments of this application with reference to the accompanying drawings in the embodiments of this application.

Terms in this application are explained below.

Link aggregation (LA): Link aggregation refers to a technology in which a plurality of physical links are logically combined into a single aggregated link, and transmission of a same type of data stream is performed over the aggregated link. The aggregated link is a set of the plurality of links for the transmission of the same type of data stream. For example, if transmission of a same type of data stream is performed over a link 1, a link 2, and a link 3, the link 1, the link 2, and the link 3 may form an aggregated link.

Multi-AP (MAP) network: A single AP usually cannot implement full indoor coverage. Therefore, a MAP network is proposed. The MAP network is used for coverage of a home, such as large-area coverage of a villa. In the MAP network, there are two types of logical function entities, which are respectively a multi-AP controller (MAP-C) and a multi-AP agent (MAP-A). The MAP-C and the MAP-A may communicate with each other in a wired or wireless manner.

Multi-AP device: A multi-AP device is a device that has a multi-AP function. For the multi-AP device, a new abstraction layer, referred to as a 1905.1 abstraction layer, is added between an internet protocol (IP) layer and a media access control (MAC) layer. The 1905.1 protocols are protocols for a digital home network defined by the Institute of Electrical and Electronics Engineers (IEEE), so as to provide a unified upper-layer interface for different bottom-layer transmission technologies, for example, wireless fidelity (Wi-Fi), Zigbee, Bluetooth, Ethernet, coaxial cable transmission, and the like, so that devices of different types can be interconnected. The multi-AP device may include the following functions: a multi-AP controller function, a multi-AP agent function, a backhaul station (BH-STA) function, and a fronthaul access point (fronthaul AP, FH-AP) function.

Multi-AP controller: A multi-AP controller is a logical control entity of the MAP network. The multi-AP controller may control a multi-AP agent to collect a network performance parameter and optimize a MAP network configuration, so as to improve network performance.

Multi-AP agent: A multi-AP agent receives instructions from the multi-AP controller, and controls a backhaul station and a fronthaul access point according to the instructions, so as to implement functions such as network configuration and performance parameter collection.

Fronthaul access point: A fronthaul access point has a function that is similar to that of an AP, and is configured to provide a network access service to a station. The fronthaul access point and the station may interact with each other based on the 802.11 protocols.

Backhaul station: A backhaul station is used in a scenario in which a multi-AP device is connected through Wi-Fi. The backhaul station forwards, to a gateway, uplink data of a station that is collected by the fronthaul access point, and sends, to the fronthaul access point, downlink data sent by an Ethernet, and the fronthaul access point sends the data to the station. The backhaul station may be considered as a device that uses wireless Wi-Fi to replace a wired backhaul link.

1905.1 abstraction layer: A 1905.1 abstraction layer is a layer defined in the IEEE 1905.1 protocols. The 1905.1 abstraction layer is a layer defined between a logical link control (LLC) layer and a MAC layer. The 1905.1 abstraction layer may define a unified access interface for different MAC layer transmission technologies and physical layer transmission technologies.

It should be understood that the technical solutions in the embodiments of this application may be used in various data transmission systems, for example, a Wi-Fi wireless communication system, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, another future evolved system, and various other wireless communication systems that use a radio access technology.

FIG. 1 shows a data transmission system used according to an embodiment of this application. The data transmission system includes a first data transmission apparatus 101 and a second data transmission apparatus 102. The first data transmission apparatus 101 and the second data transmission apparatus 102 can establish a plurality of links, and can perform link aggregation over the plurality of links, that is, can perform transmission of a same type of data stream over the plurality of links. For example, in FIG. 1, the first data transmission apparatus 101 can send a same type of data stream to the second data transmission apparatus 102 over the link 1 and the link 2, and the second data transmission apparatus 102 may receive, over the link 1 and the link 2, the same type of data stream sent by the first data transmission apparatus 101.

The links between the first data transmission apparatus 101 and the second data transmission apparatus 102 may be various types of links, for example, may be a wired link and a wireless link. The wired link may be an Ethernet link, a coaxial cable, a power line, or the like. The wireless link may be a link in the IEEE 802.11 standards or a link constructed based on a visible light communication (VLC) technology.

In some possible embodiments, the first data transmission apparatus 101 may be a network device, and the second data transmission apparatus 102 may be a terminal device located in coverage of the network device. The first data transmission apparatus 101 may provide communication coverage to a specific geographical area, and communicate with the second data transmission apparatus 102 located in the coverage area.

For example, when the data transmission system is used in a wireless local area network (WLAN), the first data transmission apparatus 101 may be an access point (AP), and the second data transmission apparatus 102 may be a station (STA). Alternatively, the first data transmission apparatus 101 may be a base transceiver station (BTS) in a GSM system or a code division multiple access (CDMA) system, may be a NodeB (NB) in a WCDMA system, may be an evolved NodeB (eNB or eNodeB) in an LTE system, may be a wireless controller in a cloud radio access network (CRAN), or may be a relay station, a vehicle-mounted device, a wearable device, a network side device in a future network, or the like. The second data transmission apparatus 102 may be mobile or fixed. The second data transmission apparatus may be an access terminal, user equipment (UE), a subscriber unit, a subscriber station, a mobile station, a remote station, a remote terminal, a mobile device, a user terminal, a wireless communication device, a user agent, a user apparatus, or the like.

In some other possible embodiments, when the data transmission system is used in a MAP network, the first data transmission apparatus 101 and the second data transmission apparatus 102 may be multi-AP agents.

Figure 2:
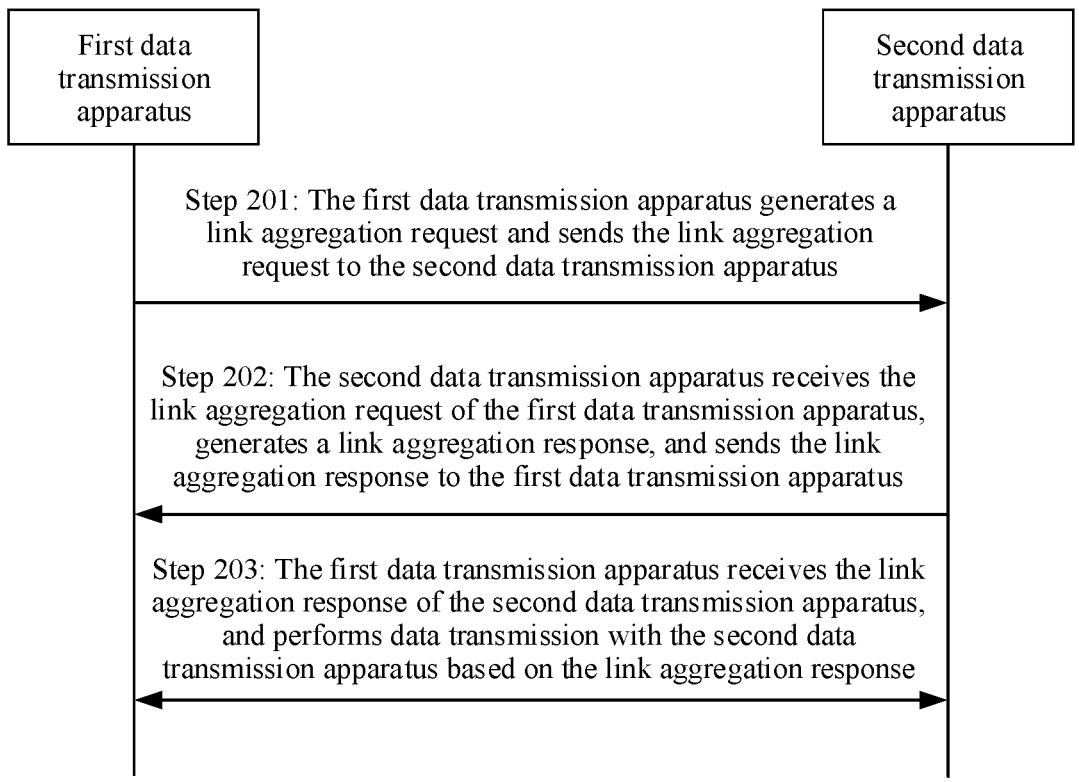
FIG. 2 shows a method according to an embodiment of this application.

FIG. 2 shows a method according to an embodiment of this application. Specifically, a data transmission method includes step 201 to step 203.

Step 201: A first data transmission apparatus generates a link aggregation request and sends the link aggregation request to a second data transmission apparatus.

The link aggregation request is used to request to perform transmission of a same type of data stream on a plurality of links. The link aggregation request may have different names based on requirements, for example, may be referred to as a link aggregation setup request (LA setup request) frame, a variant link aggregation setup request (variant LA setup request) frame, or the like. In an example, the link aggregation request may include a stream type indication and a member link indication.

The stream type indication is used to indicate a type of a data stream whose transmission is allowed over a plurality of links. For example, the type of the data stream may be a service type of the data stream, for example, a voice type or a video type. In some possible embodiments, an implementation of the stream type indication may be but is not limited to a combination of any one or more of the following implementation 1 to implementation 3.

Implementation 1: The stream type indication in the link aggregation request may be a traffic identifier (TID) indication. The TID indication is used to indicate a TID of a same type of data stream whose transmission is performed over a plurality of links. If the stream type indication in the link aggregation request is a TID indication, the link aggregation request is used to request to perform joint transmission of a data stream of a TID or data streams of several TIDs over a plurality of links.

In an example, the TID indication may be represented in a form of a bitmap, and the TID indication may be denoted as TID bitmap control. Specifically, the TID indication may include at least one bit, each of the at least one bit may correspond to one TID, and a value of any bit represents whether to perform transmission, over a plurality of links, a data stream whose TID is a TID corresponding to the bit.

In a possible implementation, a value of each bit in the TID indication may be a first value or a second value, the first value indicates that transmission of a data stream whose TID is a TID corresponding to the bit is performed over a plurality of links, and the second value indicates that transmission of a data stream whose TID is a TID corresponding to the bit is not performed over a plurality of links. The first value and the second value are different from each other. For example, the first value is 1, and the second value is 0. For another example, the first value is 0, and the second value is 1.

In an example, the TID indication may include N bits. For an $i^{th}$ bit in the N bits, if the $i^{th}$ bit is set to 1, it indicates that transmission of a data stream whose TID is a TID corresponding to the $i^{th}$ bit is performed over a plurality of links; or if the $i^{th}$ bit is set to 0, it indicates that transmission of a data stream whose TID is a TID corresponding to the $i^{th}$ bit is not performed over a plurality of links, where N is a positive integer, i is a positive integer, and i is less than or equal to N. That N is 8 is used as an example. If a TID indication is "00100000", the TID indication indicates that transmission of a data stream whose TID is a TID corresponding to the 3rd bit is performed over a plurality of links.

In a possible implementation, the first data transmission apparatus and the second data transmission apparatus may pre-store a correspondence between a bit and a TID. If the first data transmission apparatus needs to perform transmission of a type of data stream over a plurality of links, the first data transmission apparatus may determine, based on a TID of the data stream and the correspondence between a bit and a TID, a bit corresponding to the TID, and set the bit in a TID indication to a first value, and set a bit other than the bit in the TID indication to a second value. If the second data transmission apparatus receives the link aggregation request, the second data transmission apparatus may obtain the TID indication from the link aggregation request, determine a bit that is in the TID indication and that is set to the first value, and determine, based on the correspondence between a bit and a TID, a TID corresponding to the bit, so as to perform transmission of a data stream whose TID is the TID over a plurality of links in a subsequent data transmission process.

Implementation 2: The stream type indication in the link aggregation request may alternatively be a TID itself, that is, the stream type indication is a TID of a data stream whose transmission is allowed over a plurality of links.

Implementation 3: The stream type indication includes a stream matching rule, where the stream matching rule may be any one or more types of information carried in the data stream, and the stream matching rule is used to perform matching between the data stream and an aggregated link. If the stream type indication is the stream matching rule, the link aggregation request is used to request to perform transmission, over a plurality of links, of a data stream that has a same stream matching rule. The stream matching rule may include a combination of one or more of a source IP address, a destination IP address, a source MAC address, a destination MAC address, a source port number, a destination port number, or interface information of a data stream. The interface information is used to identify a corresponding interface, and the interface may be a virtual interface allocated to an upper layer of an application layer.

The member link indication is used to indicate each of the plurality of links. Specifically, the plurality of links for the transmission of the same type of data stream may be considered as one aggregated link, and the single links forming the aggregated link may be considered as member links of the aggregated link, that is, a sublink of the aggregated link. In some possible embodiments, the member link indication may include at least one of an identifier (ID) of each of the plurality of links and a link indication of each of the plurality of links. The identifier of the link is used to identify a link corresponding to the identifier, for example, may be a number or a name of the link, or an index number of the link in the plurality of links. The link indication may be a source MAC address and a destination MAC address of the link, or may be a band identifier (band ID), an operating class, and a channel number of the link.

In a possible implementation, the link aggregation request may include a link aggregation element (LA element) and a traffic policy element. The link aggregation element and the traffic policy element may be two different elements in the link aggregation request. The link aggregation element is used to indicate information about the aggregated link. The link aggregation element may include a member link indication. The traffic policy element is used to indicate a type of a service that allows to be carried on the aggregated link, and the traffic policy element may include a stream type indication.

It should be noted that, that the member link indication is located in the link aggregation element and the stream type indication is located in the traffic policy element is only an example of a frame format of the link aggregation request and is not a mandatory manner. In some other possible embodiments, the member link indication may alternatively be located in another element other than the link aggregation element, and the stream type indication may alternatively be located in another element other than the traffic policy element. A location of the member link indication and a location of the stream type indication in the link aggregation request are not limited in this embodiment.

Optionally, the link aggregation request may include an aggregated link identifier (aggregated link ID), where the aggregated link identifier is used to identify the aggregated link, for example, may be a number, a name, or an index number of the aggregated link. The aggregated link identifier may be located in the link aggregation element in the link aggregation request. In some other possible embodiments, the aggregated link identifier may alternatively be located in another element other than the link aggregation element. A location of the aggregated link identifier in the link aggregation request is not limited in this embodiment.

In a possible implementation, an aggregated link identifier may be allocated to a plurality of links for transmission of a same type of data stream. In an example, if a total of five links can be established between the first data transmission apparatus and the second data transmission apparatus, where a link 1, a link 2, and a link 3 are used for transmission of a same type of data stream, and a link 4 and a link 5 are used for transmission of another type of data stream, an aggregated link identifier 1 may be allocated to the link 1, the link 2, and the link 3, and an aggregated link identifier 2 may be allocated to the link 4 and the link 5. In this case, if the aggregated link identifier is 1 in the link aggregation request, the link aggregation request indicates to perform transmission of a same type of data stream over the link 1, the link 2, and the link 3; if the aggregated link identifier is 2 in the link aggregation request, the link aggregation request indicates to perform transmission of a same type of data stream over the link 4 and the link 5.

Optionally, the member link indication and the aggregated link identifier are interchangeable, to be specific, the link aggregation request may include either of the member link indication and the aggregated link identifier. In an example, based on a correspondence between an aggregated link identifier and a member link indication, the first data transmission apparatus may include, in a link aggregation request, an aggregated link identifier corresponding to a member link indication; and the second data transmission apparatus may query the correspondence between an aggregated link identifier and a member link indication based on the aggregated link identifier included in the link aggregation request, so as to determine the member link indication specified in the link aggregation request, to learn of links for transmission of a same type of data stream.

In some possible embodiments, if the first data transmission apparatus and the second data transmission apparatus perform, for the first time, a data transmission procedure of transmission of a same type of data stream over a plurality of links, the first data transmission apparatus may include an aggregated link identifier and a member link indication in a link aggregation request, and send the link aggregation request to the second data transmission apparatus, to indicate a correspondence between an aggregated link identifier and a member link indication to the second data transmission apparatus by using the link aggregation request. After receiving the link aggregation request, the second data transmission apparatus may obtain the aggregated link identifier and the member link indication from the link aggregation request, and store the correspondence between an aggregated link identifier and a member link indication. If the first data transmission apparatus and the second data transmission apparatus perform, not for the first time, the procedure of transmission of a same type of data stream over a plurality of links, the first data transmission apparatus may include an aggregated link identifier in a link aggregation request, and send the link aggregation request to the second data transmission apparatus. After receiving the link aggregation request, the second data transmission apparatus may obtain the aggregated link identifier from the link aggregation request, and determine the member link indication based on the aggregated link identifier and the correspondence that is obtained in the data transmission procedure performed for the first time.

In this optional implementation, in the link aggregation request, the aggregated link identifier may be used to specify each of the plurality of links, and an identifier of each of the plurality of links does not need to be carried. Because the aggregated link identifier occupies a smaller number of bits, and this reduces a total number of bits in the aggregated link request, a data volume of the aggregated link request can be reduced, and data transmission efficiency can be improved.

Optionally, the link aggregation request further includes a primary linkindication, and the primary link indication is used to indicate a primary link in the plurality of links. For example, the primary link indication may be a source MAC address and a destination MAC address of the primary link, or may be a band identifier, an operating class, and a channel number of the primary link. The primary link indication may be located in the link aggregation element in the link aggregation request. In some other possible embodiments, the primary link indication may alternatively be located in another element other than the link aggregation element. A location of the primary link indication in the link aggregation request is not limited in this embodiment.

The primary link may be a link used for transmission of a block acknowledgement request (BAR) or a block acknowledgement (BA) in the plurality of links for the transmission of the same type of data stream. A link other than the primary link in the plurality of links for the transmission of the same type of data stream may be referred to as a secondary link, and transmission of a BAR or a BA of data whose transmission is performed over the secondary link may be performed over the primary link. Optionally, if the link aggregation request includes the primary link indication, a function of transmission of the BAR/BA over the secondary link may be disabled, and data whose transmission is performed over all the member links in the aggregated link is uniformly acknowledged by using the BAR/BA whose transmission is performed over the primary link.

When the primary link and the secondary link are designed, for data whose transmission is performed over the secondary link, the transmission of the data is performed over the secondary link, and transmission of a BAR/BA of the data is performed over the primary link, so as to implement a function of performing the transmission of the BAR/BA and the transmission of the data over the different links, that is, separating the BAR/BA from the data.

In an example scenario, it is assumed that a plurality of links for transmission of a same type of data stream are a link 1, a link 2, a link 3, and a link 4. If in a link aggregation request, a primary link indication is used to specify that a primary link is the link 1, in a data transmission process, transmission of data but not a BAR/BA may be performed over the link 2, the link 3, and the link 4, and transmission of a BAR/BA of the data whose transmission is performed over the link 2, the link 3, and the link 4 may be performed over the link 1.

In a possible implementation, if the link aggregation request includes the primary link indication, the second data transmission apparatus may determine the primary link in the plurality of links based on the primary link indication in the link aggregation request. In a subsequent data transmission process, the following step 1 to step 8 may be performed to implement the function of separating the BAR/BA from the data.

Step 1: The first data transmission apparatus sends a BAR to the second data transmission apparatus over the primary link.

The BAR is used to query whether a plurality of data packets in a data stream are correctly transmitted. In a process in which the first data transmission apparatus and the second data transmission apparatus perform transmission of the same type of data stream over the plurality of links, if the first data transmission apparatus has sent a plurality of data packets to the second data transmission apparatus over the primary link or the secondary link, the first data transmission apparatus may send a BAR for the plurality of data packets to the second data transmission apparatus over the primary link, so as to determine, by using a BA returned by the second data transmission apparatus, whether the plurality of the data packets are successfully transmitted.

Step 2: The second data transmission apparatus receives the BAR of the first data transmission apparatus over the primary link.

Step 3: The second data transmission apparatus generates a BA.

The BA is used to indicate whether the plurality of data packets in the data stream are correctly transmitted. In some possible embodiments, the BA may be represented in a form of a bitmap. The BA may include a plurality of bits, each of the plurality of bits corresponds to one data packet, and each bit is used to indicate whether a corresponding data packet is correctly transmitted. For example, each bit may have a first value and a second value. If a bit is a first value, it indicates that a data packet corresponding to the bit is correctly transmitted. If the bit is a second value, it indicates that the data packet corresponding to the bit is incorrectly transmitted. The first value and the second value may be any two different values.

For example, if the first value is 1, and the second value is 0, for a data packet 1, a data packet 2, a data packet 3, a data packet 4, and a data packet 5, if a BA corresponding to the five data packets is 11011, the BA indicates that the data packet 3 is incorrectly transmitted, but the data packet 1, the data packet 2, the data packet 4, and the data packet 5 are correctly transmitted.

With respect to a manner of generating the BA, the second data transmission apparatus may generate the BA by using a reception scoreboard mechanism. Specifically, if the second data transmission apparatus receives any data packet on the primary link or the secondary link, the second data transmission apparatus may determine whether the data packet is correctly received. If the data packet is correctly received, a bit corresponding to the data packet in the BA is set to a first value; or if the data packet is incorrectly received, a bit corresponding to the data packet in the BA is set to a second value.

Step 4: The second data transmission apparatus sends the BA to the first data transmission apparatus over the primary link.

Step 5: The first data transmission apparatus receives the BA of the second data transmission apparatus over the primary link.

Step 6: The first data transmission apparatus determines to-be-retransmitted data based on the BA.

Step 6 includes but is not limited to either of the following implementation 1 and implementation 2.

Implementation 1: A target layer of the first data transmission apparatus may determine the to-be-retransmitted data based on the BA, and the target layer may send an identifier of the to-be-retransmitted data to a MAC layer, to notify the MAC layer of the data that needs to be retransmitted. The MAC layer may receive the identifier that is of the to-be-retransmitted data and that is sent by the target layer, and determine the to-be-retransmitted data based on the identifier of the to-be-retransmitted data.

Implementation 2: The target layer of the first data transmission apparatus may replicate the BA to obtain a copy of the BA, the target layer may send the copy of the BA to the MAC layer, and the MAC layer may determine the to-be-retransmitted data based on the copy of the BA.

Step 7: The first data transmission apparatus sends the to-be-retransmitted data to the second data transmission apparatus over the secondary link.

Step 8: The second data transmission apparatus receives the to-be-retransmitted data from the first data transmission apparatus over the secondary link.

Optionally, the link aggregation request further includes a transport mode (Tx mode) indication. The transport mode indication may be located in the link aggregation element in the link aggregation request. In some other possible embodiments, the transport mode indication may alternatively be located in another element other than the link aggregation element. A location of the transport mode indication in the link aggregation request is not limited in this embodiment.

The transport mode indication is used to indicate either of a first transport mode and a second transport mode. For example, a value of the transport mode indication may include a first value and a second value. If the value of the transport mode indication is the first value, the transport mode indication indicates the first transport mode. If the value of the transport mode indication is the second value, the transport mode indication indicates the second transport mode. The first value and the second value may be any two different values. For example, the first value is 1, and the second value is 2. For another example, the first value is 0, and the second value is 1.

The first transport mode is a mode in which transmission of same data is performed over different links in the plurality of links. For example, refer to FIG. 1. If the first transport mode is used, transmission of same data may be performed over the link 1 and the link 2. When the first transport mode is used, even if data whose transmission is performed over a link is lost, the data in the link can still be received over another link. This improves transmission reliability.

The second transport mode is a mode in which transmission of different data is performed over different links in the plurality of links. For example, refer to FIG. 1. If the second transport mode is used, transmission of different data may be performed over the link 1 and the link 2. When the second transport mode is used, the transmission of the same type of data stream can be performed over the plurality of links simultaneously, to speed up the data transmission and improve the data transmission efficiency.

If the link aggregation request further includes the transport mode indication, a subsequent data transmission process may include: The second data transmission apparatus obtains the transport mode indication from the link aggregation request, and if the transport mode indication is used to indicate the first transport mode, the first data transmission apparatus and the second data transmission apparatus perform data transmission in the first transport mode, that is, transmission of same data of a same type of data stream over different links; or if the transport mode indication is used to indicate the second transport mode, the first data transmission apparatus and the second data transmission apparatus perform data transmission in the second transport mode, that is, transmission of different data of a same type of data stream over different links.

Different transport modes are indicated by using the transport mode indication in the link aggregation request, so that the first data transmission apparatus and the second data transmission apparatus can negotiate a transport mode before performing data transmission, to improve flexibility.

Optionally, the second transport mode may include at least one of a single physical layer protocol data unit (PPDU) mode, an independent PPDU and synchronization mode, or an independent PPDU and non-synchronization mode. The single PPDU mode is a mode in which channel binding is performed at a physical layer. Specifically, the single PPDU mode is similar to an 80+80 mode in the 802.11 protocols. In the single PPDU mode, a plurality of physical channels may be bound into one aggregated link, and transmission of a same type of data stream is performed over the aggregated link. PPDU headers of a data stream whose transmission is performed over the different physical channels in the aggregated link are the same.

The "independent PPDU" in the independent PPDU and synchronization mode means that transmission of a PPDU is independently performed over each link in the aggregated link, and headers of PPDUs whose transmission is performed over different links in the aggregated link are different. The "synchronization" in the independent PPDU and synchronization mode means that a data stream is sent over each link in the aggregated link at a same time point, that is, a data stream is sent over different links simultaneously.

A meaning of the "independent PPDU" in the independent PPDU and synchronization mode is the same as a meaning of the "independent PPDU" in the independent PPDU and non-synchronization mode. The "non-synchronization" in the independent PPDU and non-synchronization mode means that a time point for sending a data stream over each link in the aggregated link may be different. In addition, directions of transmission of a data stream over different links in the aggregated link may be different, that is, a data stream may be sent over a link and a data stream may be received over another link.

Optionally, the link aggregation request further includes a management frame indication, the management frame indication is used to indicate whether to perform transmission of a management frame over the plurality of links, and the management frame indication may be located in the traffic policy element in the link aggregation request. In some other possible embodiments, the management frame indication may alternatively be located in another element other than the traffic policy element. A location of the management frame indication in the link aggregation request is not limited in this embodiment.

For example, the management frame indication may have a first value and a second value. If the management frame indication in the link aggregation request is the first value, the link aggregation request indicates to perform transmission of the management frame over the plurality of links. If the management frame indication in the link aggregation request is the second value, the link aggregation request indicates not to perform transmission of the management frame over the plurality of links.

If the link aggregation request further includes the management frame indication, a subsequent data transmission process may include: The second data transmission apparatus obtains the management frame indication from the link aggregation request. If the management frame indication is the first value, the first data transmission apparatus and the second data transmission apparatus perform transmission of a same type of data stream and the management frame over the plurality of links. If the management frame indication is the second value, the first data transmission apparatus and the second data transmission apparatus perform transmission of a same type of data stream over the plurality of links, but do not perform transmission of the management frame over the plurality of links, for example, perform transmission of the management frame over any link other than the plurality of links.

The management frame indication is carried in a link aggregation request indication, so that the first data transmission apparatus and the second data transmission apparatus can perform transmission of the same type of data stream over the plurality of links specified in the link aggregation request, and perform transmission of the management frame over the link other than the plurality of links. In this way, the transmission of the data stream and the transmission of the management frame can be performed over different links, so that a function of separating a management plane and a data plane from each other is implemented.

Optionally, the link aggregation request further includes a downlink/uplink (DL/UL) indication. The downlink/uplink indication may be used to separate uplink transmission and downlink transmission of a same type of data stream from each other, so that the uplink transmission and the downlink transmission are respectively carried over different member links. The downlink/uplink indication may be located in the traffic policy element in the link aggregation request. In some other possible embodiments, the downlink/uplink indication may alternatively be located in another element other than the traffic policy element. A location of the downlink/uplink indication in the link aggregation request is not limited in this embodiment.

For example, the downlink/uplink indication may have any one or more of the first value, the second value, and the third value. If the downlink/uplink indication in the link aggregation request is the first value, the downlink/uplink indication is used to indicate to perform transmission of an uplink data stream over the plurality of links. If the downlink/uplink indication in the link aggregation request is the second value, the downlink/uplink indication is used to indicate to perform transmission of a downlink data stream over the plurality of links. If the downlink/uplink indication in the link aggregation request is the third value, the downlink/uplink indication is used to indicate to perform transmission of an uplink data stream or a downlink data stream over the plurality of links. The first value, the second value, and the third value may be any three different values. For example, the first value is 0, the second value is 1, and the third value is 2.

If the link aggregation request further includes the downlink/uplink indication, a subsequent data transmission process may include: The second data transmission apparatus obtains the downlink/uplink indication from the link aggregation request, and if the downlink/uplink indication is the first value, the first data transmission apparatus and the second data transmission apparatus perform transmission of a same type of uplink data stream over the plurality of links. If the downlink/uplink indication is the second value, the first data transmission apparatus and the second data transmission apparatus perform transmission of a same type of downlink data stream over the plurality of links. If the downlink/uplink indication is the third value, the first data transmission apparatus and the second data transmission apparatus perform transmission of a same type of uplink data stream or downlink data stream over the plurality of links.

The downlink/uplink indication is carried in a link aggregation request indication, so that the directions of transmission of a data stream over the plurality of links may be specified by using the downlink/uplink indication. For example, if the downlink/uplink indication is the first value, transmission of an uplink data stream can be performed over the plurality of links, and transmission of a downlink data stream can be performed over another link other than the plurality of links; or if the downlink/uplink indication is the second value, transmission of a downlink data stream can be performed over the plurality of links, and transmission of an uplink data stream can be performed over another link other than the plurality of links. In this way, the transmission of the uplink data stream and the transmission of the downlink data stream can be performed over different links, so that a function of separating the uplink from the downlink is implemented.

Optionally, the link aggregation request further includes a time sensitive networking (TSN) indication, the time sensitive networking indication is used to indicate whether transmission of time sensitive networking data is allowed over the plurality of links, and the time sensitive networking indication may be located in the traffic policy element in the link aggregation request. In some other possible embodiments, the time sensitive networking indication may alternatively be located in another element other than the traffic policy element. A location of the time sensitive networking indication in the link aggregation request is not limited in this embodiment.

For example, the time sensitive networking indication may have a first value and a second value. If the time sensitive networking indication in the link aggregation request is the first value, the link aggregation request indicates to perform transmission of time sensitive networking data over the plurality of links. If the time sensitive networking indication in the link aggregation request is the second value, the link aggregation request indicates not to perform transmission of time sensitive networking data over the plurality of links.

If the link aggregation request further includes the time sensitive networking indication, a subsequent data transmission process may include: The second data transmission apparatus obtains the time sensitive networking indication from the link aggregation request. If the time sensitive networking indication is the first value, the first data transmission apparatus and the second data transmission apparatus may perform transmission of time sensitive networking data over the plurality of links. If the downlink/uplink indication is the second value, the first data transmission apparatus and the second data transmission apparatus may not perform transmission of time sensitive networking data over the plurality of links.

The time sensitive networking indication is carried in a link aggregation request indication, so that the time sensitive networking indication may be used to specify whether the transmission of the time sensitive networking data is performed over the plurality of links. In this way, for a time sensitive networking that has a high transmission rate requirement, transmission of time sensitive networking data may be performed over a plurality of links, to speed up the data transmission and reduce a data transmission delay.

Optionally, the link aggregation request further includes a number of member links, where the number of member links is a total number of sublinks included in the aggregated link, and the number of member links may be located in the link aggregation element in the link aggregation request. In some other possible embodiments, the number of member links may alternatively be located in another element other than the link aggregation element. A location of the number of member links in the link aggregation request is not limited in this embodiment.

For example, if transmission of a same type of data stream is performed over N links, the number of member links may be N. N is a positive integer greater than or equal to 2.

Optionally, the link aggregation request further includes a frame type indication. A value of a frame type is used to determine a function corresponding to a frame. The first data transmission apparatus includes the frame type indication in the link aggregation request, so that the first data transmission apparatus may specify, by using the value of the frame type, that the frame is a link aggregation request frame instead of a frame with another function. The second data transmission apparatus may determine, based on the frame type, that the received frame is a link aggregation request frame. In an example, the frame type may be located in a fast session transfer action field (FST action field) in the link aggregation request.

Optionally, the link aggregation request further includes an enhanced distributed channel access (EDCA) forbidding identifier. The EDCA forbidding identifier is used to indicate whether the second data transmission apparatus is forbidden to perform EDCA over the plurality of links. For example, the EDCA forbidding identifier may have either of a first value or a second value. If the EDCA forbidding identifier is the first value, it indicates that the second data transmission apparatus is forbidden to perform EDCA over the plurality of links. If the EDCA forbidding identifier is the second value, it indicates that the second data transmission apparatus is not forbidden to perform EDCA over the plurality of links. The EDCA forbidding identifier may be located in the traffic policy element in the link aggregation request. If the second data transmission apparatus is forbidden to perform EDCA over the plurality of links, the first data transmission apparatus may schedule uplink and downlink transmission over the plurality of links.

Optionally, the link aggregation request further includes a session identifier. The session identifier is used to indicate a session to which the link aggregation request belongs, and the session identifier may be used to perform matching between a link aggregation request and a link aggregation response that belong to a same session. A session may include a link aggregation request and a link aggregation response for the link aggregation request. Session identifiers in link aggregation requests in different sessions may be different, and session identifiers in a link aggregation request and a link aggregation response in a same session may have a same value. The session identifier may be denoted as a dialog token, an aggregated link session identifier, or the like.

Optionally, the link aggregation request may include a stream switching indication. The stream switching indication is used to indicate to switch a link for transmission of a data stream. In an example, the stream switching indication may indicate to switch the link for transmission of a data stream from a plurality of links to a single link, or may indicate to switch the link for transmission of a data stream from a single link to a plurality of links. The stream switching indication may include at least one of an identifier of a link before switching and an identifier of a link after switching. The identifier of the link before switching may be denoted as an old link identifier (old Link ID), and the identifier of the link after switching may be denoted as a new link ID (new link ID). The link aggregation request may include an enhanced stream switching element, and the stream switching indication may be located in the enhanced stream switching element. In some other possible embodiments, the stream switching indication may alternatively be located in another element other than the enhanced stream switching element. A location of the stream switching indication in the link aggregation request is not limited in this embodiment.

If the link aggregation request further includes the stream switching indication, a subsequent data transmission process may include: The second data transmission apparatus obtains the stream switching indication from the link aggregation request, determines, based on the stream switching indication, the link before switching and the link after switching, and switches a data stream that is in transmission, from the link before switching to the link after switching.

Optionally, the stream switching indication may include a switch-only-data-frame indication. In a possible implementation, the switch-only-data-frame indication may be used to indicate to switch the link for transmission of a data frame and keep a link for transmission of a control frame unchanged. If the stream switching indication includes the switch-only-data-frame indication, in a subsequent data transmission process, the first data transmission apparatus may switch the link for transmission of a data frame and keep the link for transmission of a data frame unchanged. Therefore, transmission of a data frame and transmission of a control frame are performed over different links. In this way, data transmission on a data plane and data transmission on a control plane are separated from each other. In a possible implementation, the switch-only-data-frame indication may be used to indicate to switch the link for transmission of a data frame and keep a link for transmission of a management frame unchanged. If the stream switching indication includes the switch-only-data-frame indication, in a subsequent data transmission process, the first data transmission apparatus may switch the link for transmission of a data frame and keep the link for transmission of a data frame unchanged. Therefore, transmission of a data frame and transmission of a management frame are performed over different links. In this way, data transmission on a data plane and data transmission on a management plane are separated from each other.

Optionally, the stream switching indication may include a non-quality of service (QoS) frame indication, and the non-QoS frame indication is used to indicate whether to switch a link for transmission of a non-QoS frame, that is, whether to switch the non-QoS frame to a new link.

Optionally, the stream switching indication may include an indication of a number of streams requiring switching (number of stream switching), and the indication of a number of streams requiring switching is used to indicate a total number of data streams requiring link switching.

Optionally, the stream switching indication may include a switching parameter. The switching parameter is used to indicate a parameter of each data stream requiring link switching, and may include at least one of a data stream identifier, a valid identifier, a link loss timeout type (LLT type), a primary link identifier, or a switch-only-data-frame indication. The data stream identifier may include a TID indication and a direction indication. The direction indication is used to indicate whether the first data transmission apparatus that sends the stream switching indication is a source end of the TID or a destination end of the TID. For example, if the first data transmission apparatus is the source end of the TID, the direction indication may be 0; or if the first data transmission apparatus is the destination end of the TID, the direction indication may be 1. The validity identifier may be denoted as a stream identifier in a new link (stream ID in new link valid), and indicates whether a corresponding TID in the new link has been established.

Optionally, the link aggregation request may further include a category, a link loss timeout (LLT), a multi-band element, and the like.

For example, a frame structure of the link aggregation request may be shown in the following table 1. The link aggregation request includes a type, a frame type, a dialog token, a link loss timeout, a link aggregation element, a traffic policy element, an enhanced stream switching element, and a multi-band element.

TABLE 1

| Order | Information |
|---|---|
| 1 | Category |
| 2 | Frame type |
| 3 | Dialog token |
| 4 | Link loss timeout |
| 5 | Link aggregation element |
| 6 | Traffic policy element |
| 7 | Enhanced stream switching element |
| 8 | Multi-band element |

In an example, a format of the link aggregation element may be shown in the following table 2. The link aggregation element may include an element identifier, a length, an aggregated link identifier, a primary link indication, a number of member links, and a member link indication.

TABLE 2

| Element identifier | Length | Aggregated link identifier | Primary link indication |
|---|---|---|---|

In an example, a format of the traffic policy element may be shown in the following table 3. The traffic policy element may include an element identifier, a length, an aggregated link identifier, a primary link indication, a number of member links, and a member link indication.

TABLE 3

| Element identifier | Length | TID indication |
|---|---|---|

In an example, a format of the enhanced stream switching element may be shown in the following table 4. The enhanced stream switching element may include an element identifier, a length, an aggregated link identifier, a primary link indication, a number of member links, and a member link indication.

TABLE 4

| Element identifier | Length | Identifier of the link after switching | Identifier of the link before switching | Non-QoS frame indication | Number of streams requiring switching | Switching parameter |
|---|---|---|---|---|---|---|
| Stream identifier | | Whether the traffic identifier in the new link is valid | Link loss timeout type | Switch-only-data-frame indication | Primary link indication | |
| TID indication | Direction | | | | | |

Optionally, the first data transmission apparatus and the second data transmission apparatus may exchange capability information with each other, so that the first data transmission apparatus notifies, by using the capability information, a link peer end that the first data transmission apparatus supports a link aggregation capability, and the second data transmission apparatus notifies, by using the capability information, a link peer end that the second data transmission apparatus supports the link aggregation capability. For example, the second data transmission apparatus may send the capability information to the first data transmission apparatus, where the capability information may represent whether transmission of a same type of data stream can be performed over a plurality of links. After receiving the capability information, the first data transmission apparatus may determine, based on the capability information, whether the second data transmission apparatus can perform transmission of the same type of data stream over the plurality of links. If the second data transmission apparatus can perform transmission of the same type of data stream over the plurality of links, step 201 is performed.

For example, the capability information may include a link aggregation capability indication. If a value of the link aggregation capability indication is a first value, it represents that the second data transmission apparatus can perform transmission of the same type of data stream over the plurality of links. If a value of the capability indication is a second value, it represents that the data transmission apparatus cannot perform transmission of the same type of data stream over the plurality of links.

In some possible embodiments, the link aggregation capability indication may be carried in the following manners (1) to (3):

(1) A reserved bit in a multi-band control field in the multi-band element may be used to carry the link aggregation capability indication, to indicate whether the transmission of the same type of data stream can be performed over the plurality of links.

(2) An extremely high throughput (EHT) capability field may be newly defined to carry the link aggregation capability indication.

(3) The link aggregation capability indication may be carried in a capability information field.

Step 202: The second data transmission apparatus receives the link aggregation request of the first data transmission apparatus, generates a link aggregation response, and sends the link aggregation response to the first data transmission apparatus The link aggregation response represents whether the transmission of the same type of data stream over the plurality of links is accepted or not. The link aggregation response may have different names based on requirements, for example, may be referred to as a link aggregation setup response (LA setup response) frame.

In an example, the link aggregation response may include a status code, and the status code may include either of a success state and a failure state. The success state represents that the transmission of the same type of data stream over the plurality of links is accepted, and the failure state represents that the transmission of the same type of data stream over the plurality of links is not accepted. After the second data transmission apparatus receives the link aggregation request, if the second data transmission apparatus accepts the transmission of the same type of data stream over the plurality of links, the second data transmission apparatus sets the status code in the link aggregation response to the success state; or if the second data transmission apparatus does not accept the transmission of the same type of data stream over the plurality of links, the second data transmission apparatus sets the status code in the link aggregation response to the failure state. Different values may be used to represent the success state and the failure state. For example, the success state may be represented by using "0x00", and the failure state may be represented by using "0x01". The status code may occupy one byte in the link aggregation response.

Optionally, if the status code is the failure state, the link aggregation response may further include a cause code, and the cause code represents a cause why the transmission of the same type of data stream over the plurality of links is not accepted.

In an example, a format of the link aggregation response may be shown in the following table 5.

TABLE 5

| Field | Length | Value | Description |
| --- | --- | --- | --- |
| Type indication | One byte | xx | Link aggregation result |
| Length | Two bytes | xx | Total number of bytes |
| Value | One byte | Integer | Aggregated link identifier |
| Status code | One byte | 0x00: Success<br>0x01: Failure<br>0x02 to 0xFF: Reserved | Link aggregation operation result |

The link aggregation response further includes a frame type. By including the frame type in the link aggregation response, the second data transmission apparatus may specify, by using a value of the frame type, that a frame sent by the second data transmission apparatus is a link aggregation response frame instead of a frame of another type. The second data transmission apparatus may determine, based on the frame type, that the received frame is the link aggregation response frame. For example, the frame type may be located in the fast session transfer action field in the link aggregation response. If the link aggregation response includes the frame type, a process of transmission of the link aggregation response may include: The second data transmission apparatus writes the value of the frame type into the frame type in the link aggregation response based on the value of the frame type corresponding to the link aggregation response, and sends the link aggregation response to the first data transmission apparatus. When receiving any frame, the first data transmission apparatus may obtain a value of a frame type in a response, and query a correspondence based on the value of the frame type, so as to determine that the received frame is the link aggregation response.

Step 203: The first data transmission apparatus receives the link aggregation response of the second data transmission apparatus, and performs data transmission with the second data transmission apparatus based on the link aggregation response.

For example, the first data transmission apparatus may determine that the link aggregation response represents that the first data transmission apparatus accepts the transmission of the same type of data stream over the plurality of links. If the link aggregation response represents that the first data transmission apparatus accepts the transmission of the same type of data stream over the plurality of links, it may be considered that an aggregated link is successfully established between the first data transmission apparatus and the second data transmission apparatus. In this case, the first data transmission apparatus and the second data transmission apparatus may perform transmission of the same type of data stream over the plurality of links. In addition, if the link aggregation response represents that the transmission of the same type of data stream over the plurality of links is not accepted, the first data transmission apparatus may not perform transmission of the same type of data stream over the plurality of links with the second data transmission apparatus.

For example, the first data transmission apparatus may obtain the status code in the link aggregation response, and determine whether the status code is the success state or the failure state. When the status code is the success state, the first data transmission apparatus determines that the second data transmission apparatus accepts the transmission of this type of data stream over the plurality of links. When the status code is the failure state, the first data transmission apparatus may determine that the second data transmission apparatus does not accept the transmission of this type of data stream over the plurality of links. In addition, the first data transmission apparatus may obtain the cause code in the link aggregation response, and determine, based on the cause code, the cause why the second data transmission apparatus does not accept the transmission of the same type of data stream over the plurality of links.

Figure 11:
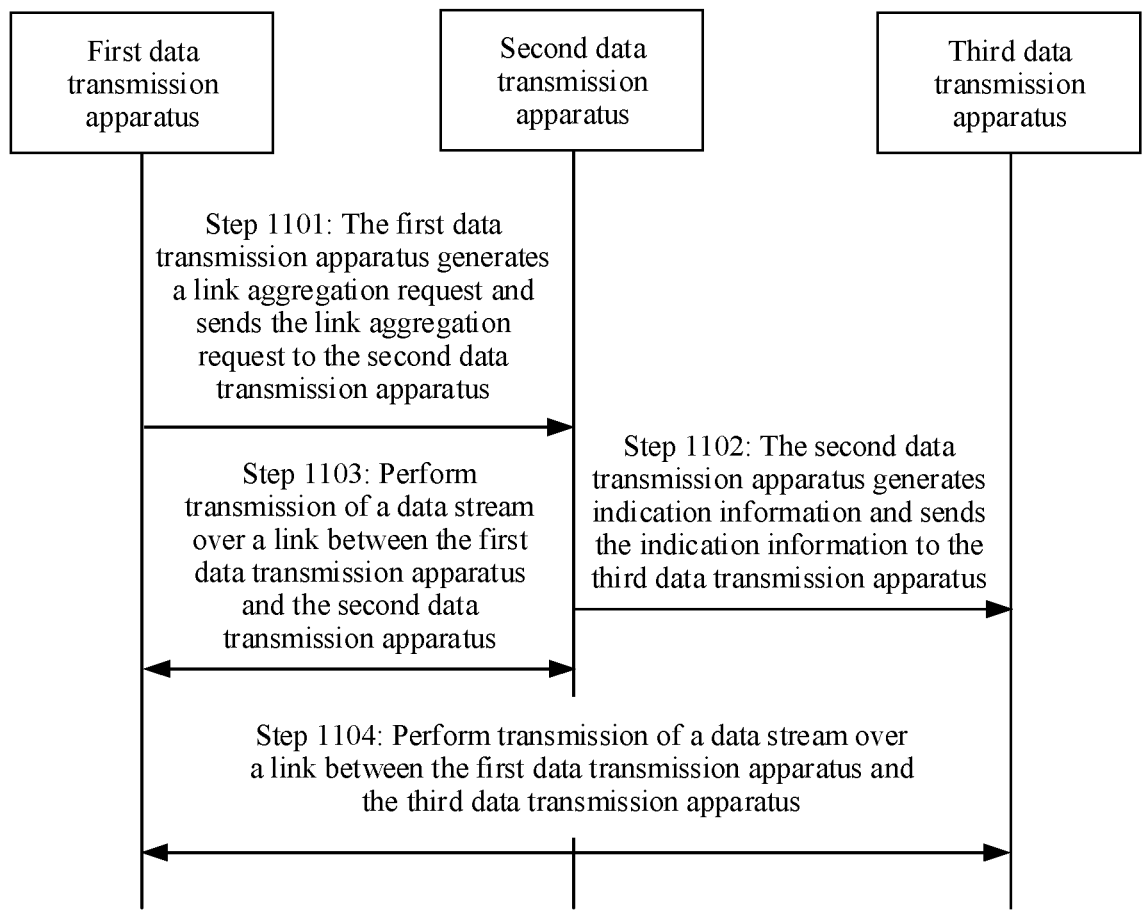
FIG. 11 shows a method according to an embodiment of this application.

In some possible embodiments, after receiving the link aggregation request, the second data transmission apparatus may choose, based on the link aggregation request, to perform the embodiment in FIG. 2 or the following embodiment in FIG. 11.

Specifically, the second data transmission apparatus may determine the plurality of links for the transmission of the same type of data stream that are specified in the link aggregation request, and may determine, based on data transmission apparatuses at two ends of the plurality of links, whether the plurality of links are all links of a local end (where the local end refers to the second data transmission apparatus). If the plurality of links are all the links of the local end, the second data transmission apparatus may choose to perform the method provided in this embodiment, to perform transmission of the same type of data stream over the plurality of links, that is, perform transmission of the same type of data stream over the plurality of links between the first data transmission apparatus and the second data transmission apparatus. However, if the plurality of links include a link corresponding to the third data transmission apparatus, the second data transmission apparatus may choose to perform the method provided in the following embodiment in FIG. 11, to generate indication information and send the indication information to the third data transmission apparatus, so as to jointly transmit the same type of data stream to the first data transmission apparatus through the local end and the third data transmission apparatus.

Figure 10:
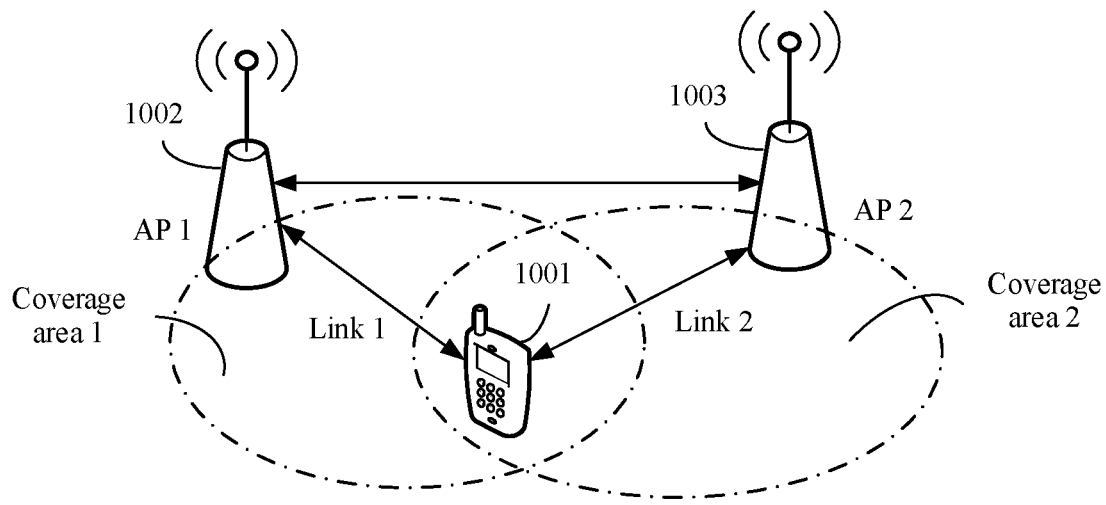
FIG. 10 shows a data transmission system used according to an embodiment of this application.

For example, refer to FIG. 1 and FIG. 10. After receiving a link aggregation request of a STA, an AP 1 determines that a plurality of links indicated in the link aggregation request are a link 1 and a link 2, and the AP 1 may determine whether each of the link 1 and the link 2 is a link between the STA and the AP 1 or a link between the STA and an AP 2. Refer to FIG. 1. If the AP 1 determines that the link 1 and the link 2 are links between the STA and the AP 1, transmission of a same type of data stream is performed over the link 1 and the link 2. Refer to FIG. 10. If the AP 1 determines that the link 1 is a link between the STA and the AP 1, and the link 2 is a link between the STA and the AP 2, the AP 1 sends indication information to the AP 2.

The second data transmission apparatus may store a MAC address of each link of the local end and a MAC address of each link of the third data transmission apparatus. For any link specified in the link aggregation request, if a MAC address of the link is a MAC address of a link of the local end, it is determined that the link is a link of the local end; or if the MAC address of the link is a MAC address of a link corresponding to the third data transmission apparatus, it is determined that the link is a link corresponding to the third data transmission apparatus.

In some possible embodiments, the second data transmission apparatus may determine whether an identifier of the third data transmission apparatus is received from the first data transmission apparatus. When the identifier of the third transmission apparatus is not received, the second data transmission apparatus chooses to perform the method provided in this embodiment, to perform transmission of the same type of data stream over the plurality of links. When the identifier of the third transmission apparatus is received, the second data transmission apparatus chooses to perform the method provided in the following embodiment in FIG. 11, to generate indication information and send the indication information to the third data transmission apparatus.

For example, the transmission of the same type of data stream over the plurality of links may include but is not limited to the following two implementations. In some possible embodiments, if the transmission is used in a scenario in which communication is performed based on the 802.11 series standards, for example, a scenario in which communication is performed through a Wi-Fi (wireless fidelity) air interface, the following implementation 1 may be used to implement link aggregation. If the transmission is used in a scenario in which communication is performed through a MAP network, the following implementation 2 may be used to implement link aggregation.

Implementation 1: Transmission of a data stream of a same TID over the plurality of links. For example, if the plurality of links are a link 1, a link 2, and a link 3, and if the first data transmission apparatus and the second data transmission apparatus perform transmission of a same type of data stream over the link 1, the link 2, and the link 3, a TID of a data stream whose transmission is performed over the link 1, a TID of a data stream whose transmission is performed over the link 2, and a TID of a data stream whose transmission is performed over the link 3 may all be the same.

In some possible embodiments, the first data transmission apparatus and/or the second data transmission apparatus may generate configuration information based on the TID indication and the member link indication in the link aggregation request, and store the configuration information. The configuration information is used to indicate a correspondence between a TID and a plurality of links, and the configuration information may include at least one TID and identifiers of a plurality of corresponding links. The first data transmission apparatus and/or the second data transmission apparatus may store the configuration information. When receiving a data stream, the first data transmission apparatus and/or the second data transmission apparatus may query the configuration information based on a TID of the data stream to obtain a plurality of links corresponding to the TID, and perform transmission of the data stream over the plurality of links.

For example, the configuration information may be shown in the following table 6. That the first data transmission apparatus transmits a data stream to the second data transmission apparatus is used as an example. If a TID of the data stream is a TID 1, the first data transmission apparatus may query the configuration information, and may determine that the plurality of links corresponding to the TID are the link 1, the link 2, and the link 3, and then transmit the data stream of the TID 1 over the link 1, the link 2, and the link 3.

TABLE 6

| TID | Identifiers of the plurality of links |
|---|---|
| TID 1 | ID of the link 1, ID of the link 2, and ID of the link 3 |
| TID 2 | ID of a link 4, ID of a link 5, and ID of a link 6 |
| TID 3 | ID of a link 7 and ID of a link 8 |

Implementation 2: Transmission of a data stream of a same stream matching rule over the plurality of links. For example, if the first data transmission apparatus and the second data transmission apparatus perform transmission of a same type of data stream over the link 1, the link 2, and the link 3, a stream matching rule of a data stream whose transmission is performed over the link 1, a stream matching rule of a data stream whose transmission is performed over the link 2, and a stream matching rule of a data stream whose transmission is performed over the link 3 may be the same. For example, destination IP addresses and source IP addresses of a data stream whose transmission is performed over the link 1, the link 2, and the link 3 may be the same.

In some possible embodiments, the first data transmission apparatus and/or the second data transmission apparatus may generate configuration information based on the stream matching rule and the member link indication in the link aggregation request, and store the configuration information. The configuration information is used to indicate a correspondence between a stream matching rule and a plurality of links, and the configuration information may include at least one stream matching rule and identifiers of a plurality of corresponding links. The first data transmission apparatus and/or the second data transmission apparatus may store the configuration information. When receiving a data stream, the first data transmission apparatus and/or the second data transmission apparatus may parse the data stream to obtain a stream matching rule of the data stream, query the configuration information according to the stream matching rule of the data stream to obtain a plurality of links corresponding to the stream matching rule, and perform transmission of the data stream over the plurality of links.

In an example, the transmission of the same type of data stream over the plurality of links may include: transmission of the same type of data stream over a plurality of links with different bands. For example, transmission of a same type of data stream may be performed over the link 1 whose band is 2.4 gigahertz (GHz), the link 2 whose band is 5 GHz, and the link 3 whose band is 60 GHz. In some possible embodiments, the first data transmission apparatus and the second data transmission apparatus may include a plurality of radio frequency modules, and the first data transmission apparatus and the second data transmission apparatus may perform transmission of a same type of data stream over a plurality of links with different bands/channels by using the plurality of radio frequency modules. For any link, a band/channel on which a radio frequency module establishing the link on a side of the first data transmission apparatus works needs to be the same as a band/channel on which a radio frequency module establishing the link on a side of the second data transmission apparatus works.

For example, the first data transmission apparatus may be a transmit end of the data stream, and the second data transmission apparatus may be a receive end of the data stream. For example, the first data transmission apparatus may send the same type of data stream to the second data transmission apparatus over a plurality of links. The first data transmission apparatus may generate a same type of data stream, and send the generated data stream to the second data transmission apparatus over the plurality of links. Alternatively, after receiving a same type of data stream, the first data transmission apparatus may forward the received data stream to the second data transmission apparatus over the plurality of links.

For example, the first data transmission apparatus may be a receive end of the data stream, and the second data transmission apparatus may be a transmit end of the data stream. For example, the second data transmission apparatus may send the same type of data stream to the first data transmission apparatus over a plurality of links. The second data transmission apparatus may generate a same type of data stream, and send the generated data stream to the first data transmission apparatus over the plurality of links. Alternatively, after receiving a same type of data stream, the second data transmission apparatus may forward the received data stream to the first data transmission apparatus over the plurality of links.

Figure 3:
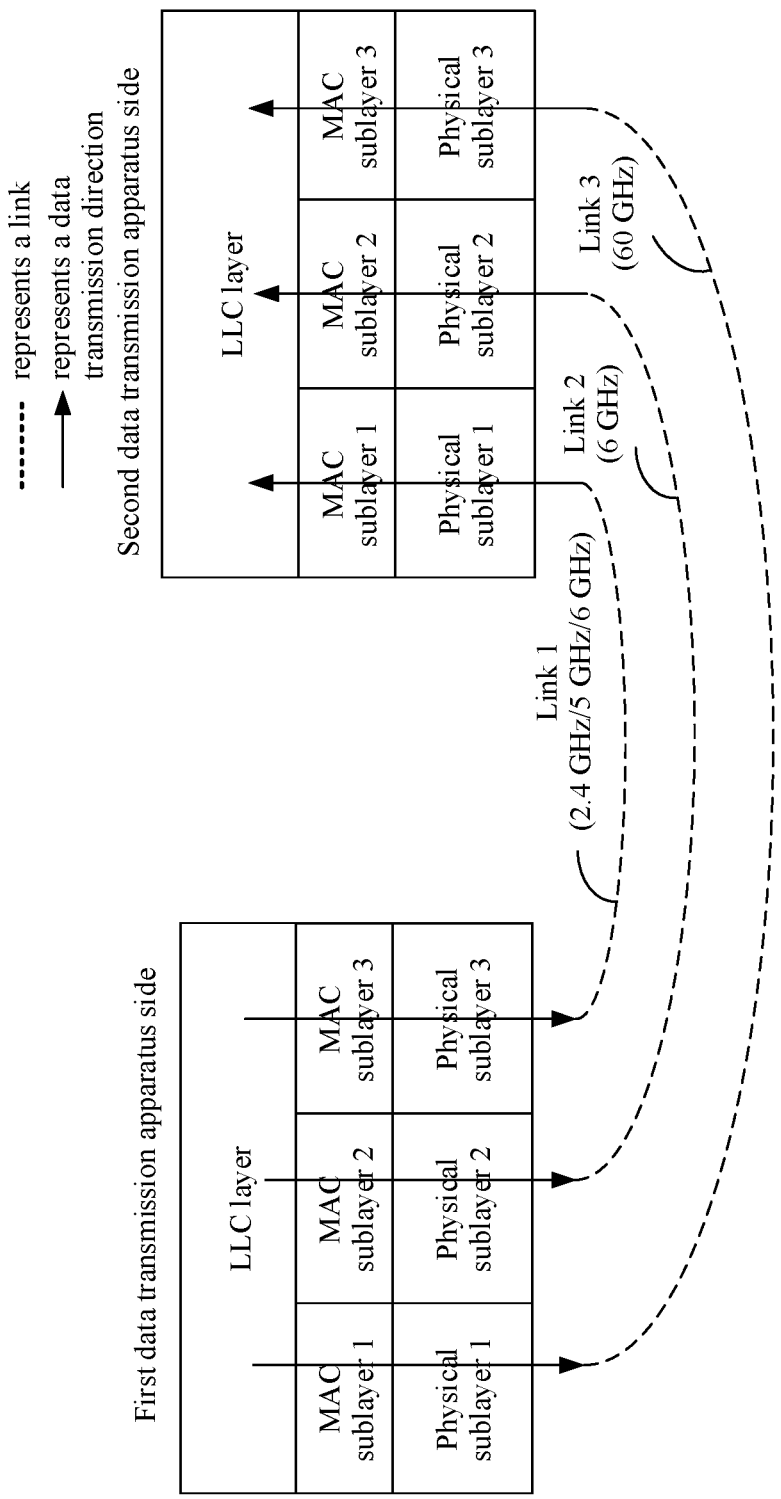
FIG. 3 is a schematic diagram of a virtual function architecture used for data transmission.

In a possible implementation, refer to FIG. 3. A media access control (MAC) layer may be virtually divided into a plurality of MAC sublayers, a physical layer is virtually divided into a plurality of physical sublayers, the plurality of MAC sublayers are in a one-to-one correspondence with the plurality of physical sublayers, and any MAC sublayer and a physical sublayer corresponding to the MAC sublayer are used for transmission of the same type of data stream over one link. For each MAC sublayer of the first data transmission apparatus, the MAC sublayer may be used to send a data stream over one link. For each MAC sublayer of the second data transmission apparatus, the MAC sublayer may be used to receive a data stream over one link.

For example, in FIG. 3, a MAC sublayer 1 and a physical sublayer 1 are used to perform transmission of the same type of data stream over the link 1 whose band is 2.4 GHz, 5 GHz, or 6 GHz; a MAC sublayer 2 and a physical sublayer 2 are used to perform transmission of the same type of data stream over the link 2 whose band is 60 GHz; and a MAC sublayer 3 and a physical sublayer 3 are used to perform transmission of the same type of data stream over the link 3 of visible light communication (VLC).

For any link of the plurality of links specified in the aggregated link request, the link corresponds to one MAC sublayer and one physical sublayer in the first data transmission apparatus, and the link corresponds to one MAC sublayer and one physical sublayer in the second data transmission apparatus. A same link may support a same MAC protocol at a corresponding MAC sublayer in the first data transmission apparatus and a corresponding MAC sublayer in the second data transmission apparatus. For example, if the link corresponds to a MAC sublayer 1.1 supporting the IEEE 802.3 protocols in the first data transmission apparatus, the link may correspond to a MAC sublayer 2.1 supporting the IEEE 802.3 protocols in the second data transmission apparatus; or if the link corresponds to a MAC sublayer 1.1 supporting the IEEE 1901 protocols in the first data transmission apparatus, the link may correspond to a MAC sublayer 2.1 supporting the IEEE 1901 protocols in the second data transmission apparatus. In addition, a same link may support a same physical layer protocol at a corresponding physical sublayer in the first data transmission apparatus and a corresponding physical sublayer in the second data transmission apparatus.

For example, the first data transmission apparatus is a transmit end of the data stream, and the second data transmission apparatus is a receive end of the data stream. Any MAC sublayer of the first data transmission apparatus and a physical sublayer corresponding to the MAC sublayer may be used to send the same type of data stream over one link, and a MAC sublayer corresponding to the second data transmission apparatus and a physical sublayer corresponding to the MAC sublayer are used to receive the same type of data stream over the one link.

In view of that different links in a plurality of links have different transmission rates, and a data packet disorder problem may occur after transmission of a same type of data stream over the plurality of links, in a possible implementation, the first data transmission apparatus may centrally allocate, in a sequence of sending each MAC service data unit (MSDU) by an LLC layer to the MAC layer, corresponding sequence numbers (SNs) to MSDUs to be sent by a plurality of MAC sublayers in the MAC layer. The second transmission apparatus may centrally reorder, based on a sequence number corresponding to each MSDU, all MSDUs received by a plurality of MAC sublayers, to restore a sequence of all MSDUs of the data stream to a normal sequence on the side of the first data transmission apparatus, and then send all the reordered MSDUs to an LLC layer in sequence, so as to ensure that the LLC layer and an upper layer of the LLC layer of the second data transmission apparatus can normally parse a data packet.

It should be noted that, this embodiment is described by using an example in which the sequence numbers are allocated to the MSDUs and the MSDUs are ordered based on the sequence numbers. In some possible embodiments, objects to which sequence numbers are allocated and objects ordered based on sequence numbers may not be MSDUs, but may be aggregation MSDUs (A-MSDUs), media protocol data units (MPDUs), or other data that a MAC layer is responsible for sending or receiving. This is not limited in this embodiment.

A data transmission process may include but is not limited to the following two implementations. In some possible embodiments, if the process is used in a scenario in which communication is performed based on the 802.11 series protocols, for example, a scenario in which communication is performed through a Wi-Fi air interface, the following implementation 1 may be used to perform data transmission. If the process is used in a scenario in which communication is performed through a MAP network, the following implementation 2 may be used to perform data transmission. If the process is used in the scenario in which communication is performed based on the 802.11 series protocols, the process may include but is not limited to two manners. One manner is that a high MAC layer (also referred to as a high-MAC layer) of a data transmission apparatus that sends a data stream centrally allocates a corresponding SN to each MSDU whose transmission is performed over an aggregated link, where the SN is used by a high-MAC layer of a data transmission apparatus that receives the data stream to reorder the MSDUs whose transmission is performed over the aggregated link. The other manner is that a field is newly added at a MAC layer, where the field carries a newly defined sequence number, and the newly defined sequence number is used by the data transmission apparatus that receives the data stream to reorder the MSDUs whose transmission is performed over the aggregated link. The newly defined sequence number may be a new control identifier (Control ID), and the control identifier may be carried in an aggregated control (A-control) field.

Figure 4:
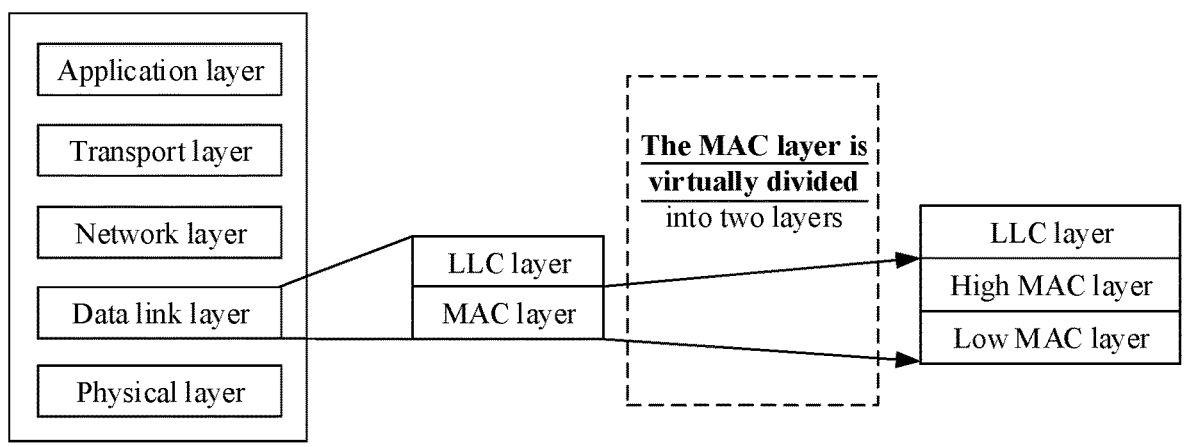
FIG. 4 is a schematic diagram of a virtual function architecture used for data transmission.
Figure 5:
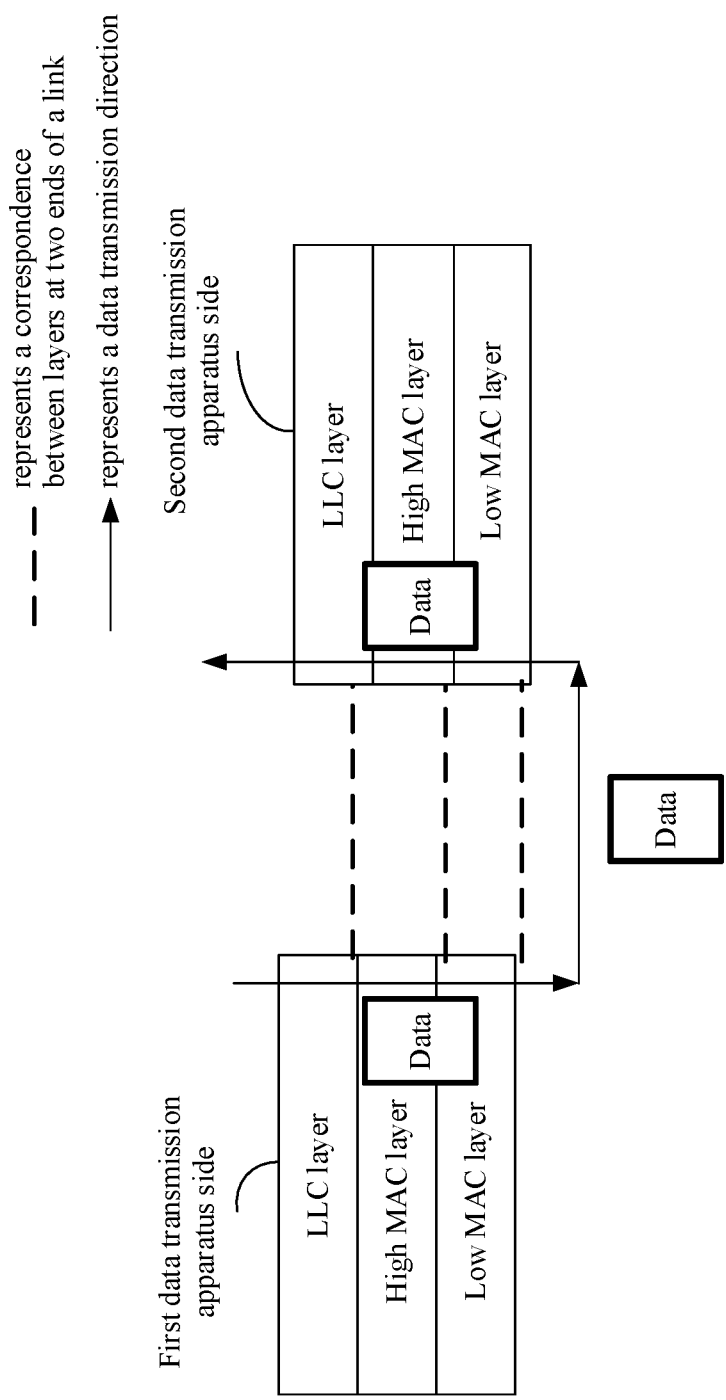
FIG. 5 is a schematic diagram of a virtual function architecture used for data transmission.

Implementation 1: Refer to FIG. 4. An original MAC layer may be virtually divided into two layers: One is a high MAC layer, and the other is a low MAC layer (also referred to as a low-MAC layer). Refer to FIG. 5. In a data sending process, data is transmitted from a high MAC layer to a low MAC layer, and in a data receiving process, data is transmitted from a low MAC layer to a high MAC layer. For example, the high MAC layer in FIG. 4 may share some functions of the MAC layer. For example, when sending data, a high MAC layer of a transmit end may encapsulate some MSDUs into MAC frames, and when receiving the data, a high MAC layer of a receive end may decapsulate some MAC frames into MSDUs.

In some possible embodiments, a high MAC layer of the first data transmission apparatus is configured to centrally allocate corresponding sequence numbers to MSDUs to be sent by a plurality of MAC sublayers, and a high MAC layer of the second data transmission apparatus is configured to centrally order, based on corresponding sequence numbers, MSDUs received by a plurality of MAC sublayers. In the data sending process, a same type of data stream arrives at the high MAC layer of the first data transmission apparatus from the LLC layer of the first data transmission apparatus. At the high MAC layer, a corresponding sequence number is allocated to each MSDU of the data stream in a sequence in which each MSDU arrives at the high MAC layer from the LLC layer. A sequence number of an MSDU that arrives at the high MAC layer from the LLC layer earlier is different from a sequence number of an MSDU that arrives at the high MAC layer from the LLC layer later.

A data transmission process in the implementation 1 may include the following step 1 to step 8.

Step 1: The LLC layer of the first data transmission apparatus sends each MSDU of the data stream to the high MAC layer of the first data transmission apparatus.

Step 2: The high MAC layer of the first data transmission apparatus allocates a corresponding sequence number to each MSDU.

The sequence number is used to indicate a sequence in which the LLC layer sends the MSDUs to the high MAC layer, that is, a sequence in which the high MAC layer receives the MSDUs from the LLC layer. A sequence number of an MSDU sent by the LLC layer earlier is different from a sequence number of an MSDU sent by the LLC layer later. For example, the sequence of sending the MSDUs may be indicated by using a sequence number relationship. For example, if the LLC layer sequentially outputs an MSDU 1, an MSDU 2, and an MSDU 3 to the high MAC layer, the high MAC layer may allocate 1 to the MSDU 1, allocate 2 to the MSDU 2, and allocate 3 to the MSDU 3.

In some possible embodiments, the first data transmission apparatus may transmit a data stream of a same TID or data streams of a plurality of TIDs to the second data transmission apparatus. If the first data transmission apparatus transmits data streams of a plurality of TIDs to the second data transmission apparatus, the first data transmission apparatus may allocate an SN to a data stream of each TID. Processes of allocating SNs to data streams of different TIDs may be independent of each other. For example, if the first data transmission apparatus needs to transmit data streams of three TIDs to the second data transmission apparatus, where the data streams are respectively a data stream 1, a data stream 2, and a data stream 3, and a TID of the data stream 1 is a TID 1, a TID of the data stream 2 is a TID 2, and a TID of the data stream 3 is a TID 3, the first data transmission apparatus may centrally allocate an SN to each MSDU of the data stream of the TID 1, centrally allocate an SN to each MSDU of the data stream of the TID 2, and centrally allocate an SN to each MSDU of the data stream of the TID 3.

In some possible embodiments, a corresponding counter may be started for a data stream of each TID, counting processes of counters of data streams of different TIDs may be independent of each other, and any counter is configured to perform counting for a data stream of a corresponding TID. For example, a counter 1, a counter 2, and a counter 3 may be separately started. The counter 1 is configured to perform counting for the data stream of the TID 1, the counter 2 is configured to perform counting for the data stream of the TID 2, and the counter 3 is configured to perform counting for the data stream of the TID 3.

For a data stream of any TID, a process of allocating a sequence number may include the following steps (2.1) to (2.3):

Step (2.1): The high MAC layer starts a counter.

Step (2.2): When the high MAC layer receives any MSDU of the data stream of the TID sent by the LLC layer, the high MAC layer uses a current count value of the counter as a sequence number corresponding to the MSDU.

Step (2.3): The high MAC layer performs increment processing on the count value of the counter. The increment processing may be adding a preset value to the current count value, and the count value of the counter becomes larger after the increment processing, where the preset value may be 1.

For example, the counter is a 4096-ary counter. When the high MAC layer starts the counter, a count value of the counter is set to 0. When the high MAC layer receives the 1st MSDU of the data stream of the TID sent by the LLC layer, the high MAC layer increases the count value of the counter by 1, and the count value of the counter is set from 0 to 1. Subsequently, each time the high MAC layer receives any MSDU of the data stream of the TID sent by the LLC layer, the high MAC layer increases the count value of the counter by 1. When the LLC layer outputs the 4095th MSDU of the data stream of the TID, the count value of the counter is increased by 1, the count value of the counter is 4095, and the high MAC layer may set the count value of the counter to 0, and perform counting again.

Step 3: The high MAC layer sends each MSDU of the data stream of the TID and a sequence number corresponding to each MSDU to a low MAC layer.

Specifically, the low MAC layer may include a plurality of low MAC sublayers. Each low MAC sublayer corresponds to one link, that is, corresponds to one TID. The high MAC layer may query configuration information based on the TID of the data stream to obtain a plurality of links corresponding to the TID, and send each MSDU of the data stream to the plurality of low MAC sublayers corresponding to the plurality of links corresponding to the TID.

In a possible implementation, the high MAC layer may centrally allocate the sequence numbers to the MSDUs of the data stream of the TID that are to be transmitted by the plurality of low MAC sublayers, and send each MSDU and the corresponding sequence number to a corresponding low MAC sublayer. The high MAC layer may use an allocation algorithm to obtain an allocation scheme based on the plurality of MSDUs of the data stream of the TID that are sent by the LLC layer, and the plurality of low MAC sublayers. The allocation scheme includes a correspondence between an MSDU and a low MAC sublayer. For any MSDU, the high MAC layer may send, based on the allocation scheme, the MSDU of the data stream of the TID and a sequence number corresponding to the MSDU to a low MAC sublayer corresponding to the MSDU.

Step 4a: A MAC layer receives each MSDU of the data stream of the TID and the sequence number corresponding to each MSDU, encapsulates each MSDU and the sequence number corresponding to each MSDU into each MAC frame, and sends each MAC frame to a physical layer of the first data transmission apparatus.

Figure 6:
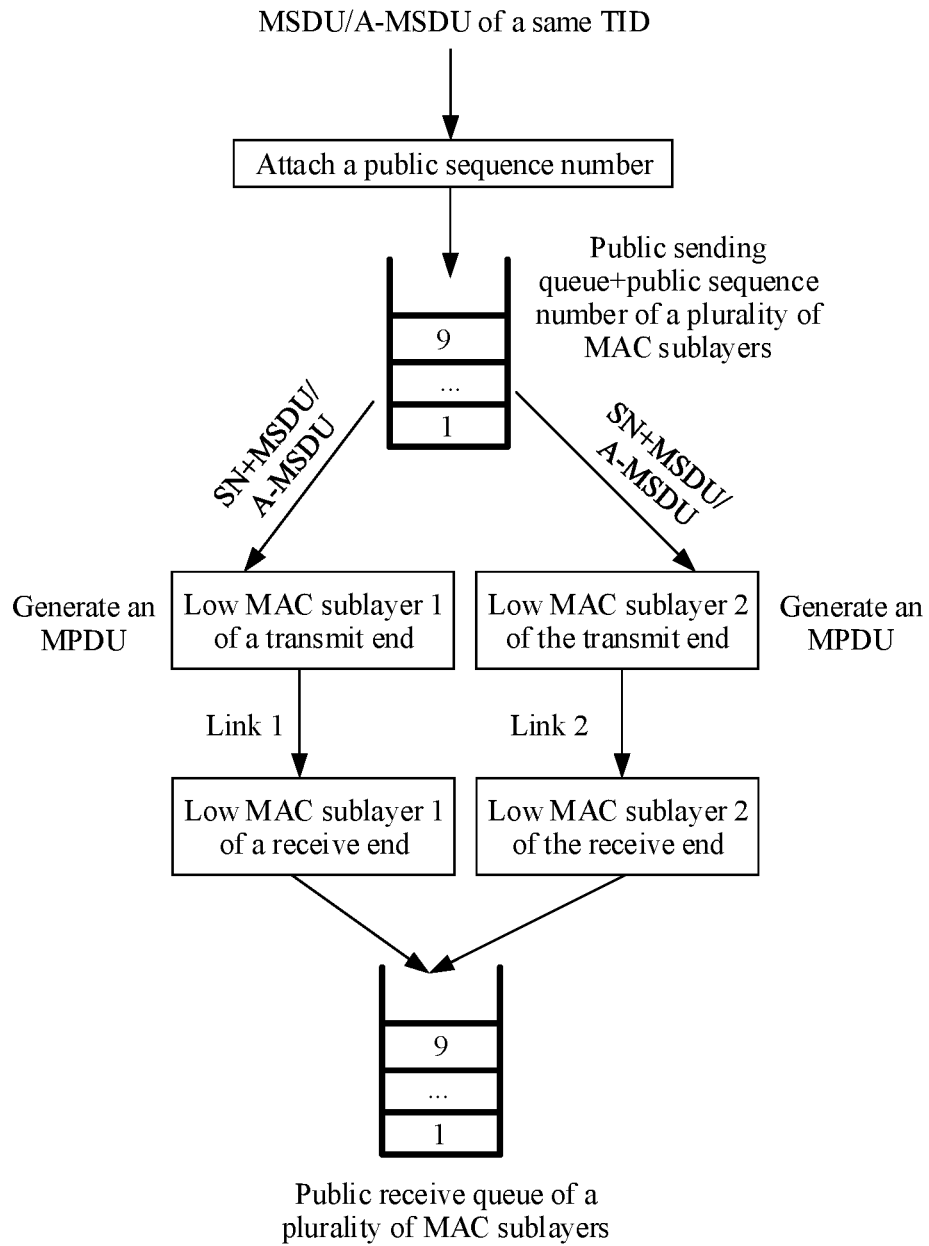
FIG. 6 is a schematic diagram of a queue operation procedure.

In a possible implementation, the plurality of low MAC sublayers of the first data transmission apparatus may share a same sending queue. The sending queue is used to buffer the MSDUs to be sent by the plurality of low MAC sublayers. The queue may be a first in first out (FIFO) queue. For an example of a queue operation procedure, refer to FIG. 6. After the high MAC layer of the first data transmission apparatus allocates a sequence number to an MSDU, the high MAC layer may store the MSDU at the tail of the queue. When an MSDU is at the head of the queue, a low MAC sublayer corresponding to the MSDU may obtain the MSDU from the queue.

Step 4b: The physical layer of the first data transmission apparatus encapsulates the MAC frames into a PPDU, and sends the PPDU to the second data transmission apparatus over a link corresponding to the low MAC layer.

That transmission of a same type of data stream is performed over three links is used as an example. Refer to FIG. 3. Some MSDUs and corresponding sequence numbers arrive at a MAC sublayer 1 from the LLC layer, and are encapsulated into MAC frames at the MAC sublayer 1. These MAC frames arrive at a physical sublayer 1 from the MAC sublayer 1 and are encapsulated into a PPDU at the physical sublayer 1, and the PPDU is sent over the link 1 corresponding to 2.4 GHz, 5 GHz, or 6 GHz. Some other MSDUs and corresponding sequence numbers arrive at a MAC sublayer 2 from the LLC layer, and are encapsulated into MAC frames at the MAC sublayer 2. These MAC frames arrive at a physical sublayer 2 from the MAC sublayer 2 and are encapsulated into a PPDU at the physical sublayer 2, and the PPDU is sent over the link 2 corresponding to 60 GHz. The other some MSDUs and corresponding sequence numbers arrive at a MAC sublayer 3 from the LLC layer, and are encapsulated into MAC frames at the MAC sublayer 3. These MAC frames arrive at a physical sublayer 3 from the MAC sublayer 3 and are encapsulated into a PPDU at the physical sublayer 3, and the PPDU is sent over the link 3 corresponding to the VLC.

Step 5: A physical layer of the second data transmission apparatus receives the PPDU of the data stream of the TID over the link, and the physical layer of the second data transmission apparatus decapsulates the PPDU into the MAC frames, and sends the MAC frames to a low MAC layer corresponding to the link.

Step 6: The low MAC layer of the second data transmission apparatus decapsulates the MAC frames to obtain the MSDUs of the data stream of the TID and the corresponding sequence numbers.

In a possible implementation, the plurality of low MAC sublayers of the first data transmission apparatus may share a same receive queue, and the receive queue is used to buffer the MSDUs received by the plurality of low MAC sublayers. The queue may be a FIFO queue. For an example of a queue operation procedure, refer to FIG. 6. After receiving a MAC frame and decapsulating the MAC frame into an MSDU, the low MAC sublayer 1 or the low MAC sublayer 2 may store the MSDU at the head of the queue.

Step 7: The high MAC layer of the second data transmission apparatus orders the MSDUs of the data stream of the TID based on the sequence numbers corresponding to the MSDUs of the data stream of the TID.

Step 7 is corresponding to step 2. By performing step 7, the high MAC layer centrally reorders all the received MSDUs of the data stream of the TID, and a sequence of all the MSDUs after the ordering may be restored to the sequence of all the MSDUs of the data stream of the TID that are sent by the LLC layer. Therefore, a sequence of different MSDUs arriving at the LLC layer of the second data transmission apparatus is consistent with a sequence of different MSDUs output by the LLC layer of the first data transmission apparatus.

In an example, all MSDUs may be ordered in ascending order of sequence numbers. For example, if the plurality of low MAC sublayers of the second data transmission apparatus output an MSDU 2, an MSDU 1, an MSDU 4, and an MSDU 3 respectively, and sequence numbers corresponding to the four MSDUs are 2, 1, 4, and 3 in sequence, the second data transmission apparatus may reorder the MSDU 2, the MSDU 1, the MSDU 4, and the MSDU 3 in a sequence of 1, 2, 3, and 4 to obtain the MSDU 1, the MSDU 2, the MSDU 3, and the MSDU 4.

Step 8: The high MAC layer of the second data transmission apparatus sends all the MSDUs of the data stream of the TID after the ordering to the LLC layer of the second data transmission apparatus in sequence.

After receiving the MSDUs of the data stream of the TID, the LLC layer of the second data transmission apparatus may further process the MSDUs based on a function of the LLC layer, and may further send processed data to a network layer; after processing the data, the network layer may send the processed data to a transport layer; after processing the data, the transport layer may send the data to an application layer; and so on.

Through the foregoing step 1 to step 8, the technical problem of packet disorder that may occur after transmission of a same type of data stream over different links is resolved. Specifically, considering that transmission rates of different links are usually different, for MSDUs whose transmission is performed over a link with a low transmission rate, even if these MSDUs are MSDUs in a data stream that are output from the LLC layer earlier, these MSDUs usually arrive at the second data transmission apparatus later due to impact of the transmission rate; and for MSDUs whose transmission is performed over a link with a high transmission rate, even if these MSDUs are MSDUs that are output from the LLC layer later, these MSDUs usually arrive at the second data transmission apparatus earlier due to impact of the transmission rate. However, MSDUs whose transmission is performed over different links are centrally reordered based on sequence numbers, so that the MSDUs that arrive at the second data transmission apparatus in disorder can be restored to a normal sequence at the high MAC layer, so as to ensure that the LLC layer and the upper layer of the LLC layer can normally parse data.

Figure 7:
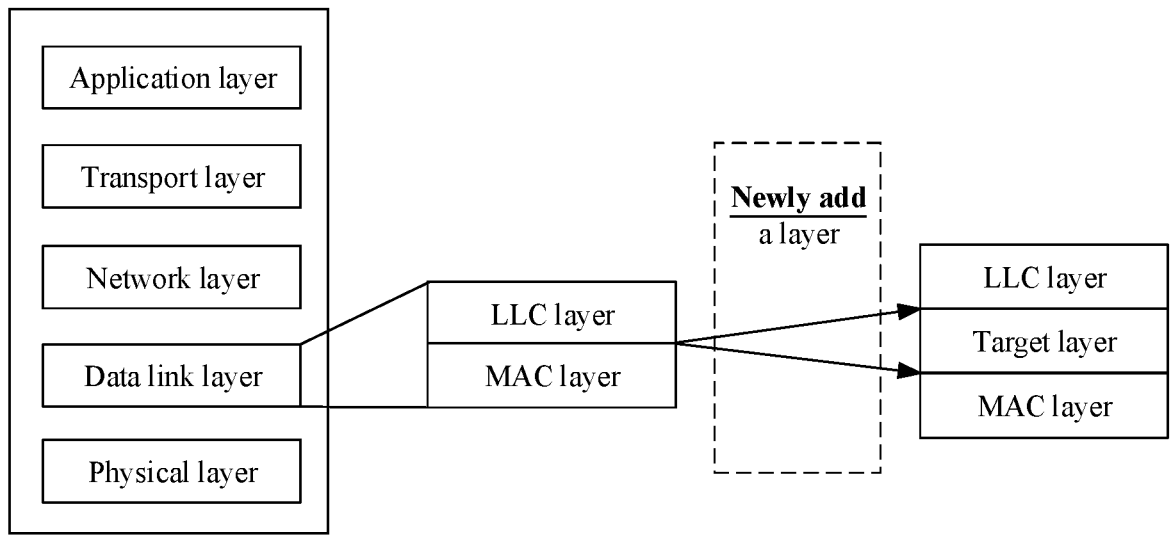
FIG. 7 is a schematic diagram of a virtual function architecture used for data transmission.

Implementation 2: Refer to FIG. 7. A layer may be newly added between an LLC layer and a MAC layer. Herein, the newly added layer is referred to as a target layer. In this virtual function architecture, a data link layer may include the LLC layer, the target layer, and the MAC layer. For the three layers, the LLC layer is an upper layer, the target layer is a middle layer, and the MAC layer is a lower layer. Refer to FIG. 7. In a data sending process, data is transmitted from the target layer to the MAC layer; and in a data receiving process, data is transmitted from the MAC layer to the target layer. In addition, the target layer may alternatively be a layer in an existing communication protocol. For example, anew function may be added to a layer between an existing LLC layer and an existing MAC layer to implement the target layer. For example, the target layer may be a 1905.1 abstraction layer defined based on the IEEE 1905.1 protocols.

In some possible embodiments, a target layer of the first data transmission apparatus is configured to centrally allocate corresponding sequence numbers to MSDUs to be sent by a plurality of MAC sublayers, and a target layer of the second data transmission apparatus is configured to centrally order, based on corresponding sequence numbers, MSDUs received by a plurality of MAC sublayers. In the data sending process, a same type of data stream arrives at the target layer of the first data transmission apparatus from the LLC layer of the first data transmission apparatus. At the target layer, a corresponding sequence number is allocated to each MSDU of the data stream in a sequence in which each MSDU arrives at the target layer from the LLC layer. A sequence number of an MSDU that arrives at the target layer from the LLC layer earlier is different from a sequence number of an MSDU that arrives at the target layer from the LLC layer later.

A data transmission process in the implementation 2 may include the following step 1 to step 9.

Step 1: The LLC layer of the first data transmission apparatus sends each MSDU of the same type of data stream to the target layer of the first data transmission apparatus.

Step 2: The target layer of the first data transmission apparatus allocates a corresponding sequence number to each MSDU.

The sequence number is used to indicate a sequence in which the LLC layer sends the MSDUs to the target layer, that is, a sequence in which the target layer receives the MSDUs from the LLC layer. A sequence number of an MSDU sent by the LLC layer earlier is different from a sequence number of an MSDU sent by the LLC layer later. For example, the sequence of sending the MSDUs may be indicated by using a sequence number relationship. For example, if the LLC layer sequentially outputs an MSDU 1, an MSDU 2, and an MSDU 3 to the target layer, the first data transmission apparatus may allocate 1 to the MSDU 1, allocate 2 to the MSDU 2, and allocate 3 to the MSDU 3.

In some possible embodiments, the first data transmission apparatus may transmit a data stream of a same stream matching rule or data streams of a plurality of stream matching rules to the second data transmission apparatus. If the first data transmission apparatus transmits data streams of a plurality of stream matching rules to the second data transmission apparatus, the first data transmission apparatus may allocate a corresponding sequence number to a data stream of each stream matching rule. Processes of allocating sequence numbers to data streams of different stream matching rules may be independent of each other. In some possible embodiments, a corresponding counter may be started for a data stream of each stream matching rule, counting processes of counters of data streams of different stream matching rules may be independent of each other, and any counter is configured to perform counting for a data stream of a corresponding stream matching rule.

For example, for a data stream of any stream matching rule, a process of allocating a sequence number may include the following steps (2.1) to (2.3):

Step (2.1): The target layer starts a counter.

Step (2.2): When the target layer receives any MSDU of the data stream of the stream matching rule sent by the LLC layer, the target layer uses a current count value of the counter as a sequence number corresponding to the MSDU.

Step (2.3): The target layer performs increment processing on the count value of the counter.

Step 3: The target layer sends each MSDU and a sequence number corresponding to each MSDU to the MAC sublayers.

Each MAC sublayer may correspond to one link. The target layer may query configuration information according to a stream matching rule of a data stream, to obtain a plurality of links corresponding to the stream matching rule, and send each MSDU of the data stream to a plurality of MAC sublayers corresponding to the plurality of links corresponding to the stream matching rule.

In a possible implementation, the target layer may centrally allocate the sequence numbers to the MSDUs of the data stream of the stream matching rule that are to be transmitted by the plurality of MAC sublayers, and send each MSDU and the corresponding sequence number to a corresponding MAC sublayer. The target layer may use an allocation algorithm to obtain an allocation scheme based on the plurality of MSDUs of the data stream of the stream matching rule that are sent by the LLC layer, and the plurality of MAC sublayers. The allocation scheme includes a correspondence between an MSDU and a MAC sublayer. For any MSDU, the target layer may send, based on the allocation scheme, the MSDU and a sequence number corresponding to the MSDU to a MAC sublayer corresponding to the MSDU.

With respect to a location, in a data packet, of a sequence number allocated by the target layer to an MSDU, in a possible implementation, the sequence number may be located in a valid payload of the data packet; in a possible implementation, the sequence number may be located in a control field of a header of the data packet. This is not limited in this embodiment.

Figure 8:
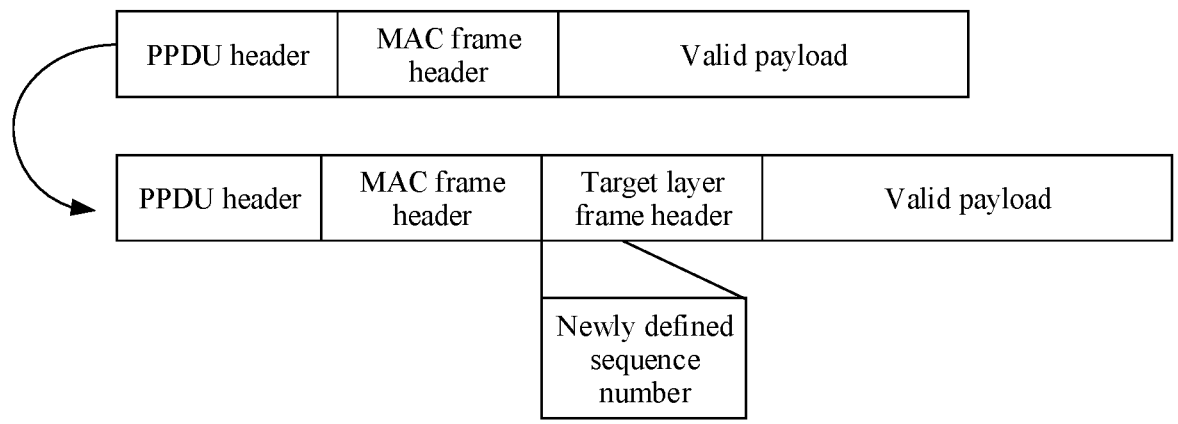
FIG. 8 is a schematic diagram of a frame format of a data packet.

It should be noted that, if the implementation 2 is used to perform data transmission, a MAC frame may include two sequence numbers. One is an original sequence number in a MAC frame header of the MAC frame, and the other is a sequence number allocated by the target layer, namely, a sequence number newly defined in this application. To distinguish between the two sequence numbers, the sequence number allocated by the target layer and the original sequence number may be carried in different locations in the MAC frame. For example, refer to FIG. 8. A newly defined sequence number field may be set in a valid payload of the MAC frame, and the newly defined sequence number field carries a newly defined sequence number. For example, a MAC frame header of an original MAC frame may be followed by a target layer frame header, and a newly defined sequence number field is set in the target layer frame header.

Step 4: A MAC layer receives each MSDU of the data stream of the stream matching rule and the sequence number corresponding to each MSDU, encapsulates each MSDU and the sequence number corresponding to each MSDU into each MAC frame, and sends each MAC frame to a physical layer of the first data transmission apparatus.

In a possible implementation, the plurality of MAC sublayers of the MAC layer of the first data transmission apparatus may share a same sending queue. For an example of a queue operation procedure, refer to FIG. 6. After the target layer of the first data transmission apparatus allocates a sequence number to an MSDU, the target layer may store the MSDU at the tail of the queue. When an MSDU is at the head of the queue, a MAC sublayer corresponding to the MSDU may obtain the MSDU from the queue.

Step 5: The physical layer of the first data transmission apparatus encapsulates the MAC frames into a PPDU, and sends the PPDU to the second data transmission apparatus over a link corresponding to the MAC sublayer.

That transmission of a same type of data stream is performed over three links is used as an example. Refer to FIG. 3. Some MSDUs and corresponding sequence numbers arrive at a MAC layer 1 from the target layer, and are encapsulated into MAC frames at the MAC layer 1. These MAC frames arrive at a physical layer 1 from the MAC layer 1 and are encapsulated into a PPDU at the physical layer 1, and the PPDU is sent over the link 1 corresponding to 2.4 GHz, 5 GHz, or 6 GHz. Some other MSDUs and corresponding sequence numbers arrive at a MAC layer 2 from the target layer, and are encapsulated into MAC frames at the MAC layer 2. These MAC frames arrive at a physical layer 2 from the MAC layer 2 and are encapsulated into a PPDU at the physical layer 2, and the PPDU is sent over the link 2 corresponding to 60 GHz. The other some MSDUs and corresponding sequence numbers arrive at a MAC layer 3 from the target layer, and are encapsulated into MAC frames at the MAC layer 3. These MAC frames arrive at a physical layer 3 from the MAC layer 3 and are encapsulated into a PPDU at the physical layer 3, and the PPDU is sent over the link 3 corresponding to the VLC.

Step 6: A physical layer of the second data transmission apparatus receives the PPDU over the link, and the physical layer of the second data transmission apparatus decapsulates the PPDU into the MAC frames, and sends the MAC frames to a MAC sublayer corresponding to the link.

Step 7: The MAC sublayers of the second data transmission apparatus decapsulate the MAC frames to obtain the MSDUs of the data stream of the stream matching rule and the corresponding sequence numbers.

In a possible implementation, the plurality of MAC sublayers of the MAC layer of the first data transmission apparatus may share a same receive queue, and the receive queue is used to buffer the MSDUs received by the plurality of MAC sublayers. The queue may be a FIFO queue. For an example of a queue operation procedure, refer to FIG. 6. When receiving a MAC frame, a MAC sublayer 1 of a receive end or a MAC sublayer 2 of a receive end decapsulates the MAC frame into an MSDU, and then stores the MSDU into the head of a queue.

Step 8: The target layer of the second data transmission apparatus orders all the MSDUs of the data stream of the stream matching rule based on the sequence numbers corresponding to all the MSDUs of the data stream of the stream matching rule.

Step 8 is corresponding to step 2. By performing step 8, the target layer centrally reorders all the received MSDUs, and a sequence of all the MSDUs after the ordering may be restored to the sequence of all the MSDUs sent by the LLC layer. Therefore, a sequence of different MSDUs arriving at the LLC layer of the second data transmission apparatus is consistent with a sequence of different MSDUs output by the LLC layer of the first data transmission apparatus.

In an example, all MSDUs may be ordered in ascending order of sequence numbers. For example, if the plurality of MAC layers of the second data transmission apparatus output an MSDU 2, an MSDU 1, an MSDU 4, and an MSDU 3, and sequence numbers corresponding to the four MSDUs are 2, 1, 4, and 3 in sequence, the second data transmission apparatus may reorder the MSDU 2, the MSDU 1, the MSDU 4, and the MSDU 3 in a sequence of 1, 2, 3, and 4 to obtain the MSDU 1, the MSDU 2, the MSDU 3, and the MSDU 4.

Step 9: The target layer of the second data transmission apparatus sequentially sends all the ordered MSDUs of the data stream of the stream matching rule to the LLC layer of the second data transmission apparatus.

After receiving the MSDUs of the data stream of the stream matching rule, the LLC layer of the second data transmission apparatus may further process the MSDUs based on a function of the LLC layer, and may further send processed data to a network layer; after processing the data, the network layer may send the processed data to a transport layer; after processing the data, the transport layer may send the data to an application layer; and so on.

Through the foregoing step 1 to step 9, the technical problem of packet disorder that may occur after transmission of a same type of data stream over different links is resolved. Specifically, considering that transmission rates of different links are usually different, for MSDUs whose transmission is performed over a link with a low transmission rate, even if these MSDUs are MSDUs in a data stream that are output from the LLC layer earlier, these MSDUs usually arrive at the second data transmission apparatus later due to impact of the transmission rate; and for MSDUs whose transmission is performed over a link with a high transmission rate, even if these MSDUs are MSDUs that are output from the LLC layer later, these MSDUs usually arrive at the second data transmission apparatus earlier due to impact of the transmission rate. However, MSDUs whose transmission is performed over different links are centrally reordered based on sequence numbers, so that the MSDUs that arrive at the second data transmission apparatus in disorder can be restored to a normal sequence at the target layer, so as to ensure that the LLC layer and the upper layer of the LLC layer can normally parse data.

It should be noted that, that the plurality of MAC sublayers share a same queue is only an optional implementation. In another possible implementation, each of the plurality of MAC sublayers of the MAC layer may have a corresponding queue. For example, if the MAC layer is divided into N MAC sublayers, N queues may be created. For any one of the plurality of MAC sublayers of the first data transmission apparatus, a queue corresponding to the MAC sublayer is used to buffer a data packet to be sent by the MAC sublayer. For any one of the plurality of MAC sublayers of the second data transmission apparatus, a queue corresponding to the MAC sublayer is used to buffer a data packet received by the MAC sublayer.

As shown in FIG. 3, a process of receiving a same type of data stream over three links may include: In a data receiving process, some PPDUs in the same type of data stream arrive at a physical layer 1 of the second data transmission apparatus over the link 1 corresponding to 2.4 GHz, 5 GHz, or 6 GHz. The PPDUs are decapsulated at the physical layer 1 into MAC frames, and then arrive at a MAC layer 1 from the physical layer 1. At the MAC layer 1, these MAC frames are decapsulated into MSDUs and corresponding sequence numbers, and these MSDUs and corresponding sequence numbers arrive at the target layer from the MAC layer 1. Some other PPDUs in the same type of data stream arrive at a physical layer 2 of the second data transmission apparatus over the link 2 corresponding to 60 GHz. The PPDUs are decapsulated at the physical layer 2 into MAC frames, and then arrive at a MAC layer 2 from the physical layer 2. At the MAC layer 2, these MAC frames are decapsulated into MSDUs and corresponding sequence numbers, and these MSDUs and corresponding sequence numbers arrive at the target layer from the MAC layer 2. The other some PPDUs arrive at a physical layer 3 of the second data transmission apparatus over the link 3 corresponding to the VLC. The PPDUs are decapsulated at the physical layer 3 into MAC frames, and then the MAC frames arrive at a MAC layer 3 from the physical layer 3. At the MAC layer 3, these MAC frames are decapsulated into MSDUs and corresponding sequence numbers, and these MSDUs and the corresponding sequence numbers arrive at the target layer from the MAC layer 3. The target layer of the second data transmission apparatus may obtain the MSDUs sent from the MAC layer 1 and the corresponding sequence numbers, the MSDUs sent from the MAC layer 2 and the corresponding sequence numbers, and the MSDUs sent from the MAC layer 3 and the corresponding sequence numbers, and may centrally order, based on the corresponding sequence numbers, the MSDUs sent from the MAC layer 1, the MSDUs sent from the MAC layer 2, and the MSDUs sent from the MAC layer 3.

In a possible implementation, for each of the plurality of links, based on a transmission proportion corresponding to the link, the first data transmission apparatus may perform transmission of this proportion of data packets in the data stream over the link. The transmission proportion may be a proportion of a total number of data packets sent over a link to a total number of data packets in a data stream. The proportions corresponding to different links may be the same or different. For example, 40% of data packets in a data stream may be sent over the link 1, and 60% of the data packets in the data stream may be sent over the link 2. A transmission proportion obtaining manner may include at least one of the following (1) and (2).

(1) The first data transmission apparatus obtains, based on a transmission rate of each link, a transmission proportion corresponding to each link. The transmission proportion corresponding to the link may be positively correlated with the transmission rate of the link, that is, a higher transmission rate of the link indicates a larger transmission proportion of the link, and transmission of more data packets over the link.

(2) The transmission proportion corresponding to each link is obtained based on a remaining space of a queue corresponding to each MAC sublayer. The transmission proportion may be positively correlated with the remaining space of the queue corresponding to the MAC sublayer, that is, a larger remaining space of the queue corresponding to the MAC sublayer indicates a larger transmission proportion of the link corresponding to the MAC sublayer, and transmission of more data packets over the link.

Optionally, before the first data transmission apparatus performs data transmission with the second data transmission apparatus, the first data transmission apparatus may perform handshake with the second data transmission apparatus. For example, the first data transmission apparatus may send a link aggregation acknowledgement request (LA ACK request) to the second data transmission apparatus. After receiving the link aggregation acknowledgement request, the second data transmission apparatus may generate a link aggregation acknowledgement response (LA ACK response) and send the link aggregation acknowledgement response to the first data transmission apparatus. Frame formats of the link aggregation acknowledgement request and the link aggregation acknowledgement response may be shown in the following table 7.

TABLE 7

| Sequence | Information |
| --- | --- |
| 1 | Category |
| 2 | Fast session transfer action field value |
| 3 | Dialog token |
| 4 | Aggregated link identifier |

Optionally, after the first data transmission apparatus performs data transmission with the second data transmission apparatus, the first data transmission apparatus may send a link aggregation teardown request (LA teardown request) to the second data transmission apparatus, where the link aggregation teardown request is used to request to tear down an aggregated link. The link aggregation teardown request may include an aggregated link identifier. If receiving the link aggregation teardown request, the second data transmission apparatus may obtain the aggregated link identifier from the link aggregation teardown request, and determine an aggregated link based on the aggregated link identifier. A frame format of the link aggregation teardown request may be shown in the following table 8.

TABLE 8

| Sequence | Information |
| --- | --- |
| 1 | Category |
| 2 | Fast session transfer action field value |
| 3 | Aggregated link identifier |

Optionally, if the solution is used in a MAP network, and the first data transmission apparatus and the second data transmission apparatus are MAP-As, an association identifier (AID) message may be defined, where the AID message is used to indicate a range of AIDs used by APs managed by the MAP-As. A MAP-C may send the AID message to the MAP-As at two ends of the backhaul link, or the MAP-As at two ends of the backhaul link may exchange the AID message. A problem that when AP coordination is implemented based on the MAP network, AID spaces of coordinating APs overlap can be resolved by using the AID message. A frame format of the AID message may be shown in the following table 9.

TABLE 9

| Field | Length | Value | Description |
| --- | --- | --- | --- |
| Type | One byte | xx | AID space allocation |
| Length | Two bytes | xx | Total number of bytes |
| Value | One byte | Integer | AP number |
| | Two bytes | xx | Start AID |
| | Two bytes | xx | End AID |
| | | | The foregoing two fields are repeated for N-1 times. |

Figure 9A:
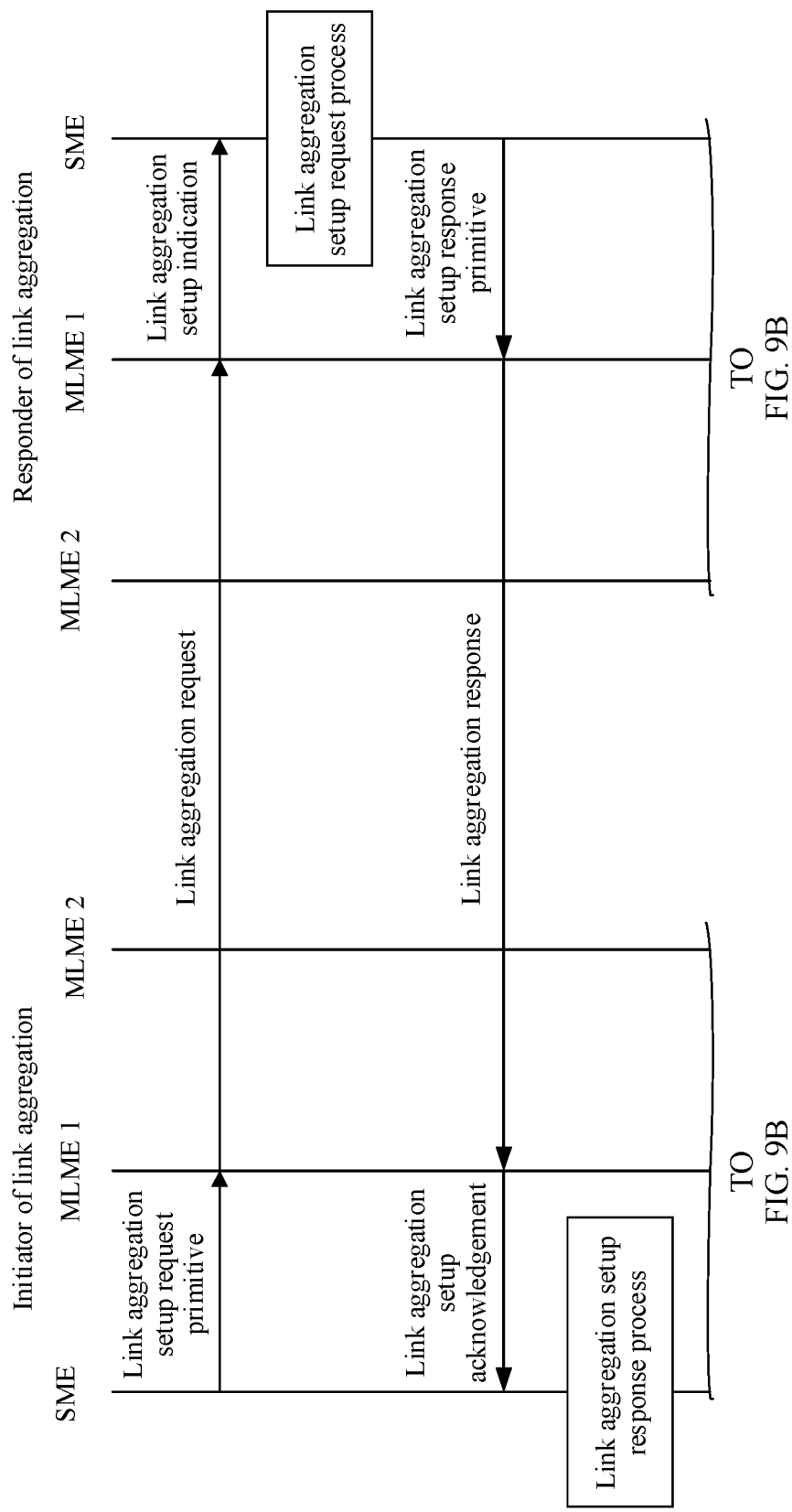
FIG. 9A and FIG. 9B are a schematic diagram of a link aggregation procedure.
Figure 9B:
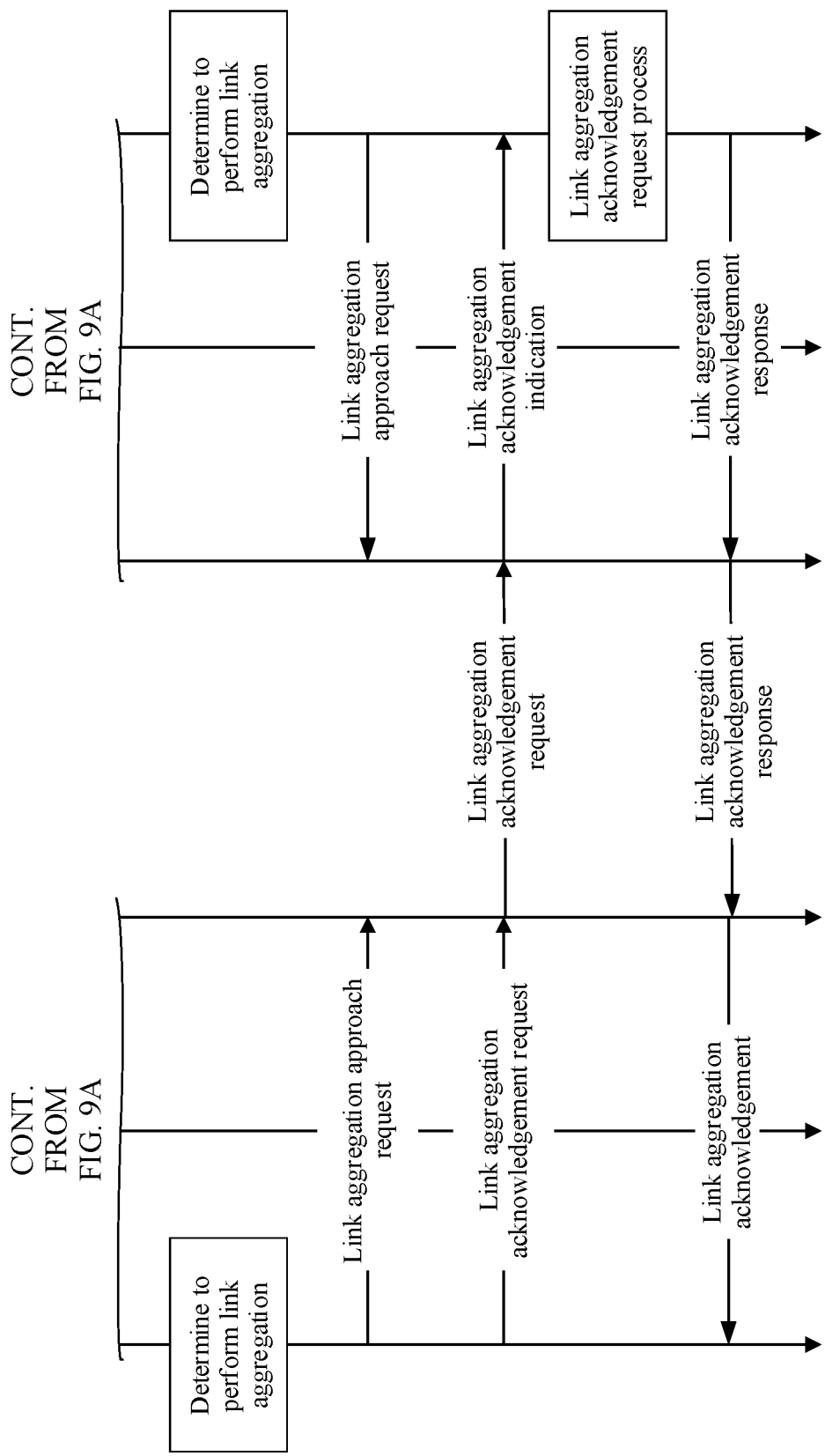

In some possible embodiments, refer to FIG. 9A and FIG. 9B. A link aggregation procedure may include the following step 1 to step 13.

Step 1: A station management entity (SME) of an initiator (namely, the foregoing first data transmission apparatus) of link aggregation sends a link aggregation setup request primitive to a MAC layer management entity (MLME) 1.

Step 2: After receiving the link aggregation setup request primitive, the MLME 1 sends a link aggregation request to an MLME 1 of a responder (namely, the foregoing second data transmission apparatus) of link aggregation through an air interface.

Step 3: After receiving the link aggregation request, the MLME 1 of the responder of link aggregation sends a link aggregation setup indication primitive to an SME of the responder of link aggregation.

Step 4: The SME of the responder of link aggregation sends a link aggregation setup response primitive to the MLME 1.

Step 5: The MLME 1 of the responder of the link aggregation sends a link aggregation response to the MLME 1 of the initiator of link aggregation through the air interface.

Step 6: After receiving the link aggregation response through the air interface, the MLME 1 of the initiator of link aggregation sends a link aggregation setup acknowledgement primitive to the SME of the initiator of link aggregation.

Step 7: The SME of the initiator of link aggregation and the SME of the responder of link aggregation respectively send link aggregation approach request primitives to an MLME 2 of the initiator of link aggregation and an MLME 2 of the responder of link aggregation.

Step 8: The SME of the initiator of link aggregation sends a link aggregation acknowledgement request primitive to the MLME 2 of the initiator of link aggregation.

Step 9: The MLME 2 of the initiator of link aggregation sends a link aggregation acknowledgement request to the MLME 2 of the responder of link aggregation through an air interface.

Step 10: The MLME 2 of the responder of link aggregation sends a link aggregation acknowledgement indication to the SME.

Step 11: The SME of the responder of link aggregation sends a link aggregation acknowledgement response to the MLME 2.

Step 12: The MLME 2 of the responder of link aggregation sends a link aggregation acknowledgement response to the MLME 2 of the initiator of link aggregation through the air interface.

Step 13: After receiving the link aggregation acknowledgement response, the MLME 2 of the initiator of link aggregation sends a link aggregation acknowledgement to the SME of the initiator of link aggregation.

It should be noted that, in some possible embodiments, the first data transmission apparatus may obtain link quality of the plurality of links between the first data transmission apparatus and the second data transmission apparatus, and determine whether the link quality of the plurality of links is higher than a preset threshold. When the link quality of the plurality of links is higher than the preset threshold, the first data transmission apparatus may perform the method provided in this embodiment, to implement link aggregation.

According to the method provided in this embodiment, an interaction procedure for implementing link aggregation is provided. By exchanging the link aggregation request and the link aggregation response, two data transmission apparatuses can perform transmission of the same type of data stream over the plurality of links, so that the transmission of the same type of data stream can be performed over the plurality of links simultaneously. Therefore, total transmission bandwidth of this type of data stream is increased, and a function of aggregating the plurality of links to perform data transmission is implemented, speeding up data transmission, and improving data transmission efficiency.

FIG. 10 shows a data transmission system used according to an embodiment of this application. The data transmission system includes a first data transmission apparatus 1001, a second data transmission apparatus 1002, and a third data transmission apparatus 1003.

The first data transmission apparatus 1001 can separately establish links to the second data transmission apparatus 1002 and the third data transmission apparatus 1003, and the first data transmission apparatus 1001 can separately perform transmission of a same type of data stream over links between the first data transmission apparatus 1001 and different data transmission apparatuses. For example, in FIG. 10, the first data transmission apparatus 1001 and the second data transmission apparatus 1002 can perform transmission of a same type of data stream over a link 1, and the first data transmission apparatus 1001 and the third data transmission apparatus 1003 can perform transmission of a same type of data stream over a link 2.

In some possible embodiments, the second data transmission apparatus 1002 and the third data transmission apparatus 1003 may be network devices, and the first data transmission apparatus 1001 may be a terminal device located in coverage of the network devices. The second data transmission apparatus 1002 and the third data transmission apparatus 1003 may separately provide communication coverage to a specific geographical area, and communicate with the first data transmission apparatus 1001 located in the coverage area. For example, in FIG. 10, the second data transmission apparatus 1002 may provide communication coverage to a coverage area 1, the third data transmission apparatus 1003 may provide communication coverage to a coverage area 2, and the first data transmission apparatus 1001 may be located in an intersection of the coverage area 1 and the coverage area 2, so as to communicate with the second data transmission apparatus 1002 and the third data transmission apparatus 1003.

For example, when the data transmission system is used in a WLAN, the second data transmission apparatus 1002 and the third data transmission apparatus 1003 may be APs, and the first data transmission apparatus 1001 may be a STA. Alternatively, the second data transmission apparatus 1002 and the third data transmission apparatus 1003 may be BTSs in a GSM system or a CDMA system, may be NBs in a WCDMA system, may be eNBs in an LTE system, may be wireless controllers in a CRAN, or may be relay stations, vehicle-mounted devices, wearable devices, network side devices in a future network, or the like. The first data transmission apparatus 1001 may be mobile or fixed. The first data transmission apparatus 1001 may be an access terminal, UE, a subscriber unit, a subscriber station, a mobile station, a mobile station, a remote station, a remote terminal, a mobile device, a user terminal, a wireless communication device, a user agent, a user apparatus, or the like.

An embodiment of this application provides a method for implementing link aggregation in a data transmission process. Refer to the following embodiment in FIG. 11. It should be noted that, to avoid repetition, the following embodiment in FIG. 11 focuses on describing a difference from the embodiment in FIG. 2. For content that is the same as that in the embodiment in FIG. 2, refer to the embodiment in FIG. 2.

A core difference between the embodiment in FIG. 11 and the embodiment in FIG. 2 is that the plurality of links in the embodiment in FIG. 2 are links between two data transmission apparatuses, and the embodiment in FIG. 2 describes a procedure in which the two data transmission apparatuses perform data transmission over the plurality of links; and a plurality of links in the following embodiment in FIG. 11 are links respectively established by one data transmission apparatus with two different data transmission apparatuses, and the following embodiment in FIG. 11 describes a procedure in which three data transmission apparatuses perform data transmission over the plurality of links.

Optionally, the following embodiment in FIG. 11 may be used in a scenario in which the first data transmission apparatus moves. Specifically, if the first data transmission apparatus moves from a signal coverage area of the second data transmission apparatus to a signal coverage area of the third data transmission apparatus, link quality of a link between the first data transmission apparatus and the second data transmission apparatus decreases, and link quality of a link between the first data transmission apparatus and the third data transmission apparatus increases. In this scenario, the first data transmission apparatus may respectively establish links with the second data transmission apparatus and the third data transmission apparatus, and perform transmission of a same type of data stream with both the second data transmission apparatus and the third data transmission apparatus. In this way, the transmission of the same type of data stream can be simultaneously performed over the link between the first data transmission apparatus and the second data transmission apparatus and the link between the first data transmission apparatus and the third data transmission apparatus. In this way, data transmission reliability or a transmission rate is improved through transmission over the links between the three data transmission apparatuses.

In an example scenario, refer to FIG. 10. The first data transmission apparatus 1001 may be a station, the second data transmission apparatus 1002 may be denoted as an access point 1, and the third data transmission apparatus 1003 may be denoted as an access point 2. The station supports an operation of data transmission on a plurality of bands. At first, the station is connected to an access point 1 by using a radio frequency module 1. When the station moves toward an access point 2, transmission quality of a link 1 between the access point 1 and the station decreases. In this case, the access point 1 may trigger the station to connect to the access point 2 by using a radio frequency module 2, or the station actively triggers a radio frequency module 2 of the station to connect to the access point 2. In this case, the station is connected to both the access point 1 and the access point 2. The station may also receive a type of data stream over the link 1 between the station and the access point 1, and simultaneously receive the data stream over the link 2 between the station and the access point 2. In this way, transmission of same data of the same type of data stream may be simultaneously performed over the two links, so as to improve transmission reliability. Alternatively, the station may receive some data of a type of data stream over the link 1 between the station and the access point 1, and simultaneously receive the remaining data of this type of data stream over the link 2 between the station and the access point 2. In this way, transmission of different data of the same type of data stream may be performed over the two links, so as to improve a transmission rate.

FIG. 11 is a flowchart of a data transmission method according to an embodiment of this application. As shown in FIG. 11, the method includes step 1101 to step 1104 that are performed by a first data transmission apparatus, a second data transmission apparatus, and a third data transmission apparatus.

Step 1101: The first data transmission apparatus generates a link aggregation request and sends the link aggregation request to the second data transmission apparatus, where the link aggregation request is used to request to perform transmission of a same type of data stream over a link between the first data transmission apparatus and the second data transmission apparatus and over a link between the first data transmission apparatus and the third data transmission apparatus.

Optionally, the first data transmission apparatus may measure link quality of the link between the first data transmission apparatus and the second data transmission apparatus and link quality of the link between the first data transmission apparatus and the third data transmission apparatus, determine a transport mode based on the link quality of the link between the first data transmission apparatus and the second data transmission apparatus and the link quality of the link between the first data transmission apparatus and the third data transmission apparatus, and generate a link aggregation request based on the transport mode. For example, in FIG. 10, the link between the first data transmission apparatus and the second data transmission apparatus may be the link 1, and the link between the first data transmission apparatus and the third data transmission apparatus may be the link 2.

For example, the first data transmission apparatus may determine whether the link quality of the link between the first data transmission apparatus and the second data transmission apparatus and the link quality of the link between the first data transmission apparatus and the third data transmission apparatus are lower than a preset threshold. If both the link quality of the link between the first data transmission apparatus and the second data transmission apparatus and the link quality of the link between the first data transmission apparatus and the third data transmission apparatus are lower than the preset threshold, it indicates that the link quality of the link between the first data transmission apparatus and the second data transmission apparatus and the link quality of the link between the first data transmission apparatus and the third data transmission apparatus are poor. In this case, the first data transmission apparatus may select a first transport mode from the first transport mode and a second transport mode, and generate a link aggregation request based on the first transport mode. A transport mode indication in the link aggregation request is used to indicate the first transport mode.

For example, the first data transmission apparatus may determine whether the link quality of the link between the first data transmission apparatus and the second data transmission apparatus and the link quality of the link between the first data transmission apparatus and the third data transmission apparatus are greater than a preset threshold. If both the link quality of the link between the first data transmission apparatus and the second data transmission apparatus and the link quality of the link between the first data transmission apparatus and the third data transmission apparatus are greater than the preset threshold, it indicates that the link quality of the link between the first data transmission apparatus and the second data transmission apparatus and the link quality of the link between the first data transmission apparatus and the third data transmission apparatus are good. In this case, the first data transmission apparatus may select the second transport mode from the first transport mode and the second transport mode, and generate a link aggregation request based on the second transport mode. A transport mode indication in the link aggregation request is used to indicate the second transport mode.

Optionally, before step 1101, the following step 1 to step 6 may be further included.

Step 1: The first data transmission apparatus establishes a connection to the second data transmission apparatus.

For example, the first data transmission apparatus may establish the connection to the second data transmission apparatus by using a first radio frequency module.

Step 2: The first data transmission apparatus determines that link quality of the second data transmission apparatus decreases.

In a possible implementation, the first data transmission apparatus may measure a received signal strength indication (RSSI) of the second data transmission apparatus, and determine, based on the RSSI of the second data transmission apparatus, that the link quality of the second data transmission apparatus decreases.

Step 3: The first data transmission apparatus generates a neighbor report request and sends the neighbor report request to the second data transmission apparatus, where the neighbor report request is used to query a neighboring device of the second data transmission apparatus.

Step 4: The second data transmission apparatus receives the neighbor report request, and generates a neighbor report response and sends the neighbor report response to the first data transmission apparatus, where the neighbor report response is used to indicate at least one neighboring device of the second data transmission apparatus, and the neighbor report response may include an identifier of the at least one neighboring device of the second data transmission apparatus.

Step 5: The first data transmission apparatus receives the neighbor report response, and determines the third data transmission apparatus.

The first data transmission apparatus may obtain the identifier of the at least one neighboring device of the second data transmission apparatus based on the neighbor report response. The first data transmission apparatus may measure link quality of the at least one neighboring device, and may select the third data transmission apparatus from the at least one neighboring device based on the link quality of the at least one neighboring device.

Step 6: The first data transmission apparatus establishes a connection to the third data transmission apparatus.

For example, the first data transmission apparatus may establish the connection to the third data transmission apparatus by using a second radio frequency module, where the second radio frequency module is different from the first radio frequency module.

It should be noted that the first data transmission apparatus may actively trigger the second radio frequency module to connect to the third data transmission apparatus, or the second data transmission apparatus may trigger the first data transmission apparatus to connect to the third data transmission apparatus by using the second radio frequency module. This is not limited in this embodiment.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, a link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

Optionally, after step 1101, the following step (1) to step (3) may be included.

(1) The second data transmission apparatus receives the link aggregation request of the first data transmission apparatus.

(2) The second data transmission apparatus generates a link aggregation response and sends the link aggregation response to the first data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

(3) The first data transmission apparatus receives the link aggregation response of the second data transmission apparatus.

In a possible implementation, the link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

Optionally, the second data transmission apparatus may determine a type of a data stream whose transmission is to be performed between the first data transmission apparatus and the third data transmission apparatus. A type of a data stream whose transmission is performed between the first data transmission apparatus and the second data transmission apparatus is the same as a type of the data stream whose transmission is performed between the first data transmission apparatus and the third data transmission apparatus. For example, a TID of the data stream whose transmission is performed between the first data transmission apparatus and the second data transmission apparatus may be the same as a TID of the data stream whose transmission is performed between the first data transmission apparatus and the third data transmission apparatus. For another example, a stream matching rule of the data stream whose transmission is performed between the first data transmission apparatus and the second data transmission apparatus may be the same as a stream matching rule of the data stream whose transmission is performed between the first data transmission apparatus and the third data transmission apparatus. Both the type of the data stream whose transmission is performed between the first data transmission apparatus and the second data transmission apparatus and the type of the data stream whose transmission is performed between the first data transmission apparatus and the third data transmission apparatus may be a type indicated by using the stream type in the link aggregation request. For example, the TID of the data stream whose transmission is performed between the first data transmission apparatus and the second data transmission apparatus may be a TID indicated by using the stream type indication, or the TID of the data stream whose transmission is performed between the first data transmission apparatus and the third data transmission apparatus may be a TID indicated by using the stream type indication.

The data stream whose transmission is performed between the first data transmission apparatus and the second data transmission apparatus may be the same as or different from the data stream whose transmission is performed between the first data transmission apparatus and the third data transmission apparatus. In a possible implementation, the second data transmission apparatus may obtain the transport mode indication in the link aggregation request, determine a transport mode indicated by the transport mode indication, and perform either of the following implementation 1 and implementation 2 based on the transport mode indicated by the transport mode indication.

Implementation 1: If the transport mode indication is used to indicate the first transport mode, the second data transmission apparatus may replicate a data stream to obtain two data streams, one is the data stream itself, and the other is a copy of the data stream. The second data transmission apparatus may send, to the third data transmission apparatus, a copy of the data stream whose transmission is performed between the first data transmission apparatus and the second data transmission apparatus. In this implementation, the copy of the data stream is the data stream whose transmission is performed between the first data transmission apparatus and the third data transmission apparatus and that is determined by the second data transmission apparatus, the data stream itself is the data stream whose transmission is performed between the first data transmission apparatus and the second data transmission apparatus and that is determined by the second data transmission apparatus, a type of the copy of the data stream is the same as a type of the data stream itself, and the copy of the data stream is the same as the data stream itself.

For example, the second data transmission apparatus may replicate each MSDU in the data stream, to obtain a copy of each MSDU; and the second data transmission apparatus may replicate a sequence number corresponding to each MSDU, to obtain a copy of each sequence number. The second data transmission apparatus may send the copy of each MSDU and the copy of each sequence number to the third data transmission apparatus.

In a possible implementation, the second data transmission apparatus may be connected to the third data transmission apparatus in a wired manner, and the second data transmission apparatus may send a copy of data to the third data transmission apparatus by using the wired connection. In another possible implementation, the second data transmission apparatus and the third data transmission apparatus may be connected to a same forwarding device. The second data transmission apparatus may send a copy of the data to the forwarding device. After receiving the copy of the data, the forwarding device sends the copy of the data to the third data transmission apparatus. The forwarding device may be a wireless access point controller (WAPC), a relay device, or the like.

Implementation 2: If the transport mode indication is used to indicate the second transport mode, the second data transmission apparatus may determine, for the third data transmission apparatus, a data stream whose transmission is to be performed. Specifically, the second data transmission apparatus may allocate a same type of data stream, where one part of the data stream is sent by the second data transmission apparatus, and the other part of the data stream is sent by the third data transmission apparatus. In this implementation, the part of the data stream sent by the third data transmission apparatus to the first data transmission apparatus is the data stream whose transmission is performed between the first data transmission apparatus and the third data transmission apparatus and that is determined by the second data transmission apparatus; and the part of the data stream sent by the second data transmission apparatus to the first data transmission apparatus is the data stream whose transmission is performed between the first data transmission apparatus and the second data transmission apparatus and that is determined by the second data transmission apparatus.

For example, the second data transmission apparatus may select 70% data packets from the same type of data stream as the data stream whose transmission is performed between the first data transmission apparatus and the third data transmission apparatus, and use the remaining 30% data packets as the data stream whose transmission is performed between the first data transmission apparatus and the second data transmission apparatus. In this case, the third data transmission apparatus transmits the 70% data packets to the first data transmission apparatus over the link between the first data transmission apparatus and the third data transmission apparatus, and the second data transmission apparatus transmits the 30% data packets to the first data transmission apparatus over the link between the first data transmission apparatus and the second data transmission apparatus.

For example, the second data transmission apparatus may select some MSDUs from all MSDUs of the same type of data stream, and send the some MSDUs and sequence numbers corresponding to the some MSDUs to the third data transmission apparatus. A manner of sending this part of data is similar to a manner of sending a copy of data in the foregoing step (1), and details are not described herein again.

Step 1102: The second data transmission apparatus generates indication information and sends the indication information to the third data transmission apparatus.

The indication information is used to indicate that a type of the data stream whose transmission is performed by the third data transmission apparatus over the link between the first data transmission apparatus and the third data transmission apparatus is the same as a type of the data stream whose transmission is performed by the third data transmission apparatus over the link between the second data transmission apparatus and the first data transmission apparatus. For example, refer to FIG. 10. The indication information may indicate a type of a data stream whose transmission is performed by the AP 2 over the link 2 is the same as a type of a data stream whose transmission is performed by the AP 2 over the link 1. The indication information may include a link identifier and a stream type indication of the link between the first data transmission apparatus and the third data transmission apparatus. The stream type indication is used to indicate the type of the data stream whose transmission is performed over the link between the first data transmission apparatus and the third data transmission apparatus. For a form of the stream type indication, refer to the foregoing embodiment in FIG. 2. Details are not described herein again.

For a manner in which the second data transmission apparatus determines the third data transmission apparatus, in some possible embodiments, before performing step 1101, the first data transmission apparatus may send an identifier of the third data transmission apparatus to the second data transmission apparatus, and the second data transmission apparatus may receive the identifier of the third data transmission apparatus from the first data transmission apparatus, to determine the third data transmission apparatus. In some other possible embodiments, in a process of performing step 1101, the first data transmission apparatus may include the identifier of the third data transmission apparatus in the link aggregation request, and the second data transmission apparatus may obtain the identifier of the third data transmission apparatus that is carried in the link aggregation request, to determine the third data transmission apparatus. The identifier of the third data transmission apparatus is used to indicate the third data transmission apparatus, and may be, for example, a name, an identification (ID), a number, or a network address of the third data transmission apparatus.

Step 1103: The second data transmission apparatus and the first data transmission apparatus perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

It should be noted that an execution sequence of step 1102 and step 1103 is not limited in this embodiment. Step 1102 and step 1103 may be performed in sequence. For example, step 1102 may be performed before step 1103; or step 1103 may be performed before step 1102. Step 1102 and step 1103 may alternatively be performed concurrently, that is, step 1102 and step 1103 may be performed simultaneously.

For example, the second data transmission apparatus may send, to the first data transmission apparatus over the link between the first data transmission apparatus and the second data transmission apparatus, a data stream whose transmission is performed between the first data transmission apparatus and the second data transmission apparatus and whose type is the same as the type of the data stream whose transmission is performed between the first data transmission apparatus and the third data transmission apparatus. The first data transmission apparatus may receive, over the link between the first data transmission apparatus and the second data transmission apparatus, the data stream that is sent by the second data transmission apparatus, whose transmission is performed between the first data transmission apparatus and the second data transmission apparatus, and whose type is the same as the type of the data stream whose transmission is performed between the first data transmission apparatus and the third data transmission apparatus. For example, refer to FIG. 10. The AP 1 may send, to the STA over the link 1, a data stream whose transmission is performed between the first data transmission apparatus and the second data transmission apparatus, and the STA may receive, over the link 1, the data stream that is sent by the AP 1 and whose transmission is performed between the first data transmission apparatus and the second data transmission apparatus. A type of a data stream whose transmission is performed between the first data transmission apparatus and the third data transmission apparatus over the link 2 is the same as a type of the data stream whose transmission is performed between the first data transmission apparatus and the second data transmission apparatus over the link 1.

For example, if the transport mode indication in the link aggregation request is used to indicate the first transport mode, the second data transmission apparatus may send, to the first data transmission apparatus over the link between the first data transmission apparatus and the second data transmission apparatus, a data stream whose transmission is performed between the first data transmission apparatus and the second data transmission apparatus and that has a same type and same data as the data stream whose transmission is performed between the first data transmission apparatus and the third data transmission apparatus. If the transport mode indication in the link aggregation request is used to indicate the second transport mode, over the link between the first data transmission apparatus and the second data transmission apparatus, the second data transmission apparatus may respectively use two parts of data in a same type of data stream as a data stream whose transmission is performed between the first data transmission apparatus and the second data transmission apparatus and a data stream whose transmission is performed between the first data transmission apparatus and the third data transmission apparatus, and send, to the first data transmission apparatus, the data stream whose transmission is performed between the first data transmission apparatus and the second data transmission apparatus and that has a same type as but different data from the data stream whose transmission is performed between the first data transmission apparatus and the third data transmission apparatus.

Step 1104: The first data transmission apparatus and the third data transmission apparatus perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The link between the first data transmission apparatus and the second data transmission apparatus and the link between the first data transmission apparatus and the third data transmission apparatus may be a single link, or may be a plurality of links.

The third data transmission apparatus may receive the indication information of the second data transmission apparatus, and based on the indication information, the third data transmission apparatus may perform transmission of the data stream whose transmission is performed between the first data transmission apparatus and the third data transmission apparatus, with the first data transmission apparatus over the link between the first data transmission apparatus and the third data transmission apparatus in the plurality of links.

For example, the third data transmission apparatus may send, to the first data transmission apparatus over the link between the first data transmission apparatus and the third data transmission apparatus, a data stream whose transmission is performed between the first data transmission apparatus and the third data transmission apparatus, and the first data transmission apparatus may receive, over the link between the first data transmission apparatus and the third data transmission apparatus, the data stream whose transmission is performed between the first data transmission apparatus and the third data transmission apparatus and that is sent by the third data transmission apparatus. For example, refer to FIG. 10. The AP 2 may send, to the STA over the link 2, a data stream whose transmission is performed between the first data transmission apparatus and the third data transmission apparatus, and the STA may receive, over the link 2, the data stream that is sent by the AP 2 and whose transmission is performed between the first data transmission apparatus and the third data transmission apparatus.

For example, the third data transmission apparatus may obtain a link identifier and a stream type indication of the link between the first data transmission apparatus and the third data transmission apparatus from the indication information, determine the link between the first data transmission apparatus and the third data transmission apparatus based on the link identifier of the link between the first data transmission apparatus and the third data transmission apparatus, determine a type of the data stream based on the stream type indication, and perform transmission of this type of data stream over the link between the first data transmission apparatus and the third data transmission apparatus. That the stream type indication is a TID indication is used as an example. The third data transmission apparatus may determine a TID of the data stream based on the TID indication, and perform transmission of the data stream whose TID is the TID over the link between the first data transmission apparatus and the third data transmission apparatus. For example, if the TID indication is "0011000", and the $3^{rd}$ bit indicated by the TID corresponds to a TID 3, the second data transmission apparatus may perform transmission of a data stream whose TID is the TID 3 over the link between the first data transmission apparatus and the third data transmission apparatus.

In a possible implementation, if the transport mode indication in the link aggregation request is used to indicate the first transport mode, the third data transmission apparatus may receive data copies of a same type of data stream sent by the second data transmission apparatus, for example, may receive a copy of each MSDU in the data stream and a copy of each sequence number corresponding to each MSDU. Correspondingly, the third data transmission apparatus may send, over the link between the first data transmission apparatus and the third data transmission apparatus, the data copies of the same type of data stream to the first data transmission apparatus, for example, send the copy of each MSDU in the data stream and the copy of each sequence number corresponding to each MSDU to the first data transmission apparatus.

If the transport mode indication in the link aggregation request is used to indicate the second transport mode, the third data transmission apparatus may receive some data of a same type of data stream sent by the second data transmission apparatus, for example, some MSDUs in the data stream and all sequence numbers corresponding to the some MSDUs. Correspondingly, the third data transmission apparatus may send, over the link between the first data transmission apparatus and the third data transmission apparatus, some data in a same type of data stream to the first data transmission apparatus, for example, send some MSDUs in the data stream and all sequence numbers corresponding to the some MSDUs to the first data transmission apparatus.

In a possible implementation, if the transport mode indication in the link aggregation request is used to indicate the first transport mode, the first data transmission apparatus may receive, over the link between the first data transmission apparatus and the second data transmission apparatus, a same type of data stream sent by the second data transmission apparatus, and the first data transmission apparatus may receive, over the link between the first data transmission apparatus and the third data transmission apparatus, data copies of the data stream sent by the third data transmission apparatus, for example, a copy of each MSDU in the data stream and a copy of each sequence number corresponding to each MSDU.

For example, refer to FIG. 10. If the transport mode indication in the link aggregation request is used to indicate the first transport mode, the STA may receive, over the link 1, a data stream sent by the AP 1, and may simultaneously receive, over the link 2, a copy of the data stream sent by the AP 2, that is, data whose transmission is performed over the link 1 is the same as data whose transmission is performed over the link 2.

In this way, through transmission of same data over the two links: the link between the first data transmission apparatus and the second data transmission apparatus and the link between the first data transmission apparatus and the third data transmission apparatus, the first data transmission apparatus not only can receive this type of data stream over the link between the first data transmission apparatus and the second data transmission apparatus, but also can receive this type of data stream over the link between the first data transmission apparatus and the third data transmission apparatus, and even if data on either of the link between the first data transmission apparatus and the second data transmission apparatus and the link between the first data transmission apparatus and the third data transmission apparatus is lost, the first data transmission apparatus can still receive the lost data over the other link. Therefore, transmission reliability is improved.

In a possible implementation, if the transport mode indication in the link aggregation request is used to indicate the second transport mode, the first data transmission apparatus may receive, over the link between the first data transmission apparatus and the second data transmission apparatus, some data that is in a same type of data stream and that is sent by the second data transmission apparatus, and the first data transmission apparatus may receive, over the link between the first data transmission apparatus and the third data transmission apparatus, the other some data that is in the same type of data stream and that is sent by the third data transmission apparatus. In this way, through transmission of different data over the two links: the link between the first data transmission apparatus and the second data transmission apparatus and the link between the first data transmission apparatus and the third data transmission apparatus, the first data transmission apparatus can receive some data in this type of data stream over the link between the first data transmission apparatus and the second data transmission apparatus, and simultaneously receive the other some data in this type of data stream over the link between the first data transmission apparatus and the third data transmission apparatus. Therefore, transmission of the same type of data stream may be performed over the two links simultaneously, so as to improve a transmission rate.

It should be noted that, in some possible embodiments, the first data transmission apparatus may obtain link quality of the link between the first data transmission apparatus and the third data transmission apparatus and link quality of the link between the first data transmission apparatus and the second data transmission apparatus, and determine a change trend of the link quality of the link between the first data transmission apparatus and the third data transmission apparatus and a change trend of the link quality of the link between the first data transmission apparatus and the second data transmission apparatus. When the link quality of the link between the first data transmission apparatus and the second data transmission apparatus increases, and the link quality of the link between the first data transmission apparatus and the third data transmission apparatus decreases, the first data transmission apparatus may perform the method provided in this embodiment, to implement link aggregation.

According to the method provided in this embodiment, a method for implementing link aggregation by using dual connectivity is provided. A data transmission apparatus is connected to two data transmission apparatuses simultaneously, requests one data transmission apparatus to perform transmission of a same type of data stream over a plurality of links, and uses the one data transmission apparatus to indicate the other data transmission apparatus to perform data stream transmission. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

An embodiment of this application further provides a method for implementing link aggregation in a data transmission process. A difference from the foregoing embodiment in FIG. 11 is that, in the procedure in the embodiment in FIG. 11, the first data transmission apparatus and the second data transmission apparatus exchange a link aggregation request and a link aggregation response, and then perform data transmission, and in a procedure in the following embodiment in FIG. 12, the second data transmission apparatus and the third data transmission apparatus exchange a link aggregation request and a link aggregation response, and then perform data transmission.

Figure 12:
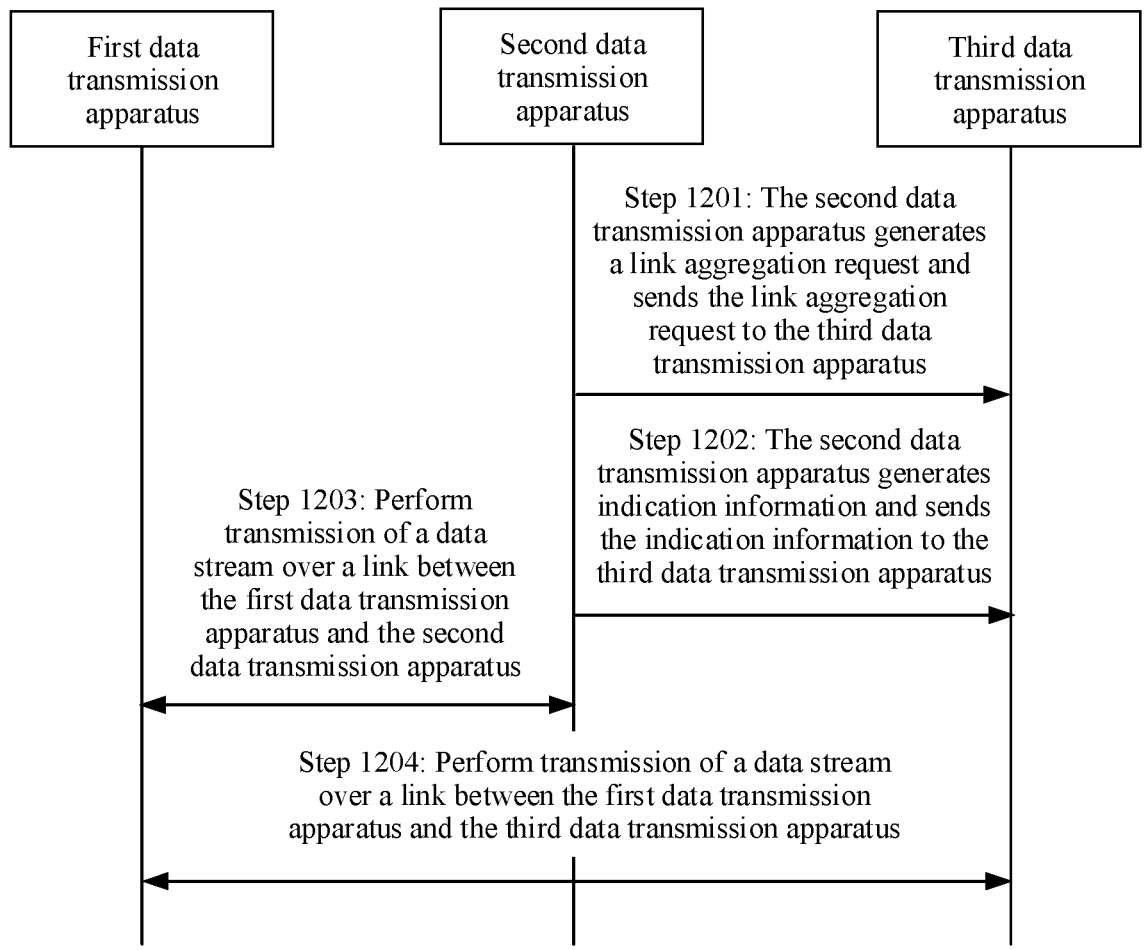
FIG. 12 shows a method according to an embodiment of this application.

FIG. 12 is a flowchart of a data transmission method according to an embodiment of this application. As shown in FIG. 12, the method includes step 1201 to step 1204 that are performed by a first data transmission apparatus, a second data transmission apparatus, and a third data transmission apparatus.

Step 1201: The second data transmission apparatus generates a link aggregation request and sends the link aggregation request to the third data transmission apparatus, where the link aggregation request is used to request to perform transmission of a same type of data stream over a link between the first data transmission apparatus and the second data transmission apparatus and over a link between the first data transmission apparatus and the third data transmission apparatus.

In a possible implementation, the link aggregation request includes a stream type indication and a member link indication, the stream type indication is used to indicate a type of a data stream whose transmission is allowed over the link between the first data transmission apparatus and the second data transmission apparatus and over the link between the first data transmission apparatus and the third data transmission apparatus, and the member link indication is used to indicate the link between the first data transmission apparatus and the second data transmission apparatus and the link between the first data transmission apparatus and the third data transmission apparatus.

In a possible implementation, the link aggregation request includes a link aggregation element and a traffic policy element, the link aggregation element includes the member link indication, and the traffic policy element includes the stream type indication.

In a possible implementation, a link aggregation response includes a status code, the status code includes either of a success state and a failure state, the success state represents that the transmission of the same type of data stream over the link between the first data transmission apparatus and the second data transmission apparatus and over the link between the first data transmission apparatus and the third data transmission apparatus is accepted, and the failure state represents that the transmission of the same type of data stream over the link between the first data transmission apparatus and the second data transmission apparatus and over the link between the first data transmission apparatus and the third data transmission apparatus is not accepted.

In a possible implementation, the link aggregation request includes an aggregated link identifier, the aggregated link identifier is used to identify an aggregated link, and the aggregated link is a set of the link between the first data transmission apparatus and the second data transmission apparatus and the link between the first data transmission apparatus and the third data transmission apparatus.

In a possible implementation, the link aggregation request further includes a primary link indication, and the primary link indication is used to indicate a primary link in the link between the first data transmission apparatus and the second data transmission apparatus and the link between the first data transmission apparatus and the third data transmission apparatus. The primary link may be a link for transmission of a BAR or a BA of the same type of data stream.

In a possible implementation, the link aggregation request further includes a transport mode indication, the transport mode indication is used to indicate either of a first transport mode and a second transport mode, the first transport mode is a mode in which transmission of same data of the same type of data stream is performed over the link between the first data transmission apparatus and the second data transmission apparatus and over the link between the first data transmission apparatus and the third data transmission apparatus, and the second transport mode is a mode in which transmission of different data of the same type of data stream is performed over the link between the first data transmission apparatus and the second data transmission apparatus and over the link between the first data transmission apparatus and the third data transmission apparatus.

In a possible implementation, the link aggregation request further includes a management frame indication, and the management frame indication is used to indicate whether to perform transmission of a management frame over the link between the first data transmission apparatus and the second data transmission apparatus and over the link between the first data transmission apparatus and the third data transmission apparatus.

In a possible implementation, the link aggregation request further includes a downlink/uplink indication.

In a possible implementation, the link aggregation request further includes a time sensitive networking indication, and the time sensitive networking indication is used to indicate whether transmission of time sensitive networking data is allowed over the link between the first data transmission apparatus and the second data transmission apparatus and over the link between the first data transmission apparatus and the third data transmission apparatus.

In a possible implementation, the link aggregation request further includes an EDCA forbidding identifier.

In a possible implementation, the link aggregation request further includes a stream switching indication. The stream switching indication is used to indicate to switch a link for transmission of a data stream.

In a possible implementation, the link aggregation request further includes a switch-only-data-frame indication.

Optionally, after step 1201, the method may further include the following step (1) to step (3).

Step (1): The third data transmission apparatus receives the link aggregation request of the second data transmission apparatus.

Step (2): The third data transmission apparatus generates a link aggregation response and sends the link aggregation response to the second data transmission apparatus, where the link aggregation response represents whether the transmission of the same type of data stream over the link between the first data transmission apparatus and the second data transmission apparatus and over the link between the first data transmission apparatus and the third data transmission apparatus is accepted or not.

Step (3): The second data transmission apparatus receives the link aggregation response of the third data transmission apparatus.

Optionally, the second data transmission apparatus determines, based on the link aggregation response, a data stream whose transmission is to be performed between the first data transmission apparatus and the third data transmission apparatus by the third data transmission apparatus.

The second data transmission apparatus may determine whether the link aggregation response indicates that the transmission of the same type of data stream over the link between the first data transmission apparatus and the second data transmission apparatus and over the link between the first data transmission apparatus and the third data transmission apparatus is accepted. If the link aggregation response indicates that the transmission of the same type of data stream over the link between the first data transmission apparatus and the second data transmission apparatus and over the link between the first data transmission apparatus and the third data transmission apparatus is accepted, the second data transmission apparatus may determine, in the same type of data stream, the data stream whose transmission is to be performed by the third data transmission apparatus. If the link aggregation response indicates that the transmission of the same type of data stream over the link between the first data transmission apparatus and the second data transmission apparatus and over the link between the first data transmission apparatus and the third data transmission apparatus is not accepted, the second data transmission apparatus may refuse to determine, for the third data transmission apparatus, the data stream whose transmission is to be performed.

Step 1202: The second data transmission apparatus generates indication information and sends the indication information to the third data transmission apparatus.

The indication information is used to indicate to perform transmission, with the first data transmission apparatus over the link between the first data transmission apparatus and the third data transmission apparatus in the plurality of links, of a data stream whose transmission is performed between the first data transmission apparatus and the third data transmission apparatus. A type of the data stream whose transmission is performed between the first data transmission apparatus and the third data transmission apparatus may be the type of the data stream that is indicated by using the stream type indication in the link aggregation request.

The indication information is used to indicate to perform data transmission with the third data transmission apparatus over the link between the first data transmission apparatus and the third data transmission apparatus in the plurality of links. For example, refer to FIG. 10. The indication information may indicate the access point 2 to perform data transmission with the station over the link 2.

Step 1203: The first data transmission apparatus and the second data transmission apparatus perform transmission of a data stream over the link between the first data transmission apparatus and the second data transmission apparatus, where a type of the data stream is the same as a type of a data stream whose transmission is performed over the link between the first data transmission apparatus and the third data transmission apparatus.

It should be noted that a sequence of step 1202 and step 1203 is not limited in this embodiment. Step 1202 and step 1203 may be performed in sequence. For example, step 1202 may be performed before step 1203; or step 1203 may be performed before step 1202. Step 1202 and step 1203 may be performed concurrently, that is, step 1202 and step 1203 may be performed simultaneously.

Step 1204: The first data transmission apparatus and the third data transmission apparatus perform transmission of a data stream over the link between the first data transmission apparatus and the third data transmission apparatus, where a type of the data stream is the same as a type of a data stream whose transmission is performed over the link between the first data transmission apparatus and the second data transmission apparatus.

The third data transmission apparatus receives the indication information of the second data transmission apparatus. Based on the indication information, the third data transmission apparatus may perform transmission, with the first data transmission apparatus over the link between the first data transmission apparatus and the third data transmission apparatus in the plurality of links, of the data stream whose transmission is performed between the first data transmission apparatus and the third data transmission apparatus.

It should be noted that, in some possible embodiments, the first data transmission apparatus may obtain link quality of the link between the first data transmission apparatus and the second data transmission apparatus and link quality of the link between the first data transmission apparatus and the third data transmission apparatus. When the link quality of the link between the first data transmission apparatus and the second data transmission apparatus increases and the link quality of the link between the first data transmission apparatus and the third data transmission apparatus decreases, the first data transmission apparatus may perform the method provided in this embodiment, to implement link aggregation.

According to the method provided in this embodiment, a method for implementing link aggregation by using dual connectivity is provided. A data transmission apparatus is connected to two data transmission apparatuses simultaneously, and the two data transmission apparatuses exchange a link aggregation request and a link aggregation response with each other, and then transmit a same type of data stream to the data transmission apparatus. In this way, the transmission of the same type of data stream may be performed over links between the data transmission apparatus and the two data transmission apparatuses, so that the transmission of the same type of data stream may be performed over the plurality of links simultaneously. Therefore, total transmission bandwidth of this type of data stream is increased, and a function of aggregating the plurality of links to perform data transmission is implemented, speeding up the data transmission, and improving data transmission efficiency.

Figure 13:
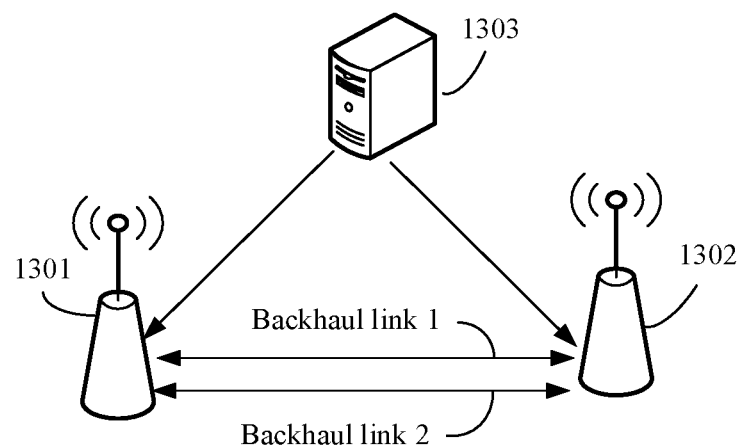
FIG. 13 shows a data transmission system used according to an embodiment of this application.

FIG. 13 shows a data transmission system used according to an embodiment of this application. The data transmission system includes a first data transmission apparatus 1301, a second data transmission apparatus 1302, and a control apparatus 1303. One or more backhaul links may be established between the first data transmission apparatus 1301 and the second data transmission apparatus 1302. The control apparatus 1303 may perform path planning on the one or more backhaul links, that is, plan a backhaul link over which transmission of a type of data stream is to be performed. The first data transmission apparatus 1301 and the second data transmission apparatus 1302 may perform data transmission based on the path planning of the control apparatus 1303.

In some possible embodiments, the first data transmission apparatus 1301 and the second data transmission apparatus 1302 may be network devices. The first data transmission apparatus 1301 and the second data transmission apparatus 1302 may respectively provide communication coverage to specific geographic areas. For example, when the data transmission system is used in a MAP network, the first data transmission apparatus 1301 and the second data transmission apparatus 1302 may be MAP-As. When the data transmission system is used in a WLAN, the first data transmission apparatus 1301 and the second data transmission apparatus 1302 may be APs. Alternatively, the first data transmission apparatus 1301 and the second data transmission apparatus 1302 may be BTSs in a GSM system or a CDMA system, may be NodeBs (NBs) in a WCDMA system, may be eNodeBs in an LTE system, may be wireless controllers in a CRAN, or may be relay stations, vehicle-mounted devices, wearable devices, network side devices in a future network, or the like.

In some possible embodiments, the control apparatus 1303 may be any apparatus that can control a network device. For example, when the data transmission system is used in the MAP network, the first data transmission apparatus 1301 or the second data transmission apparatus 1302 may be MAP-Cs. For another example, the control apparatus 1303 may be an AC, a server, or the like.

Figure 14:
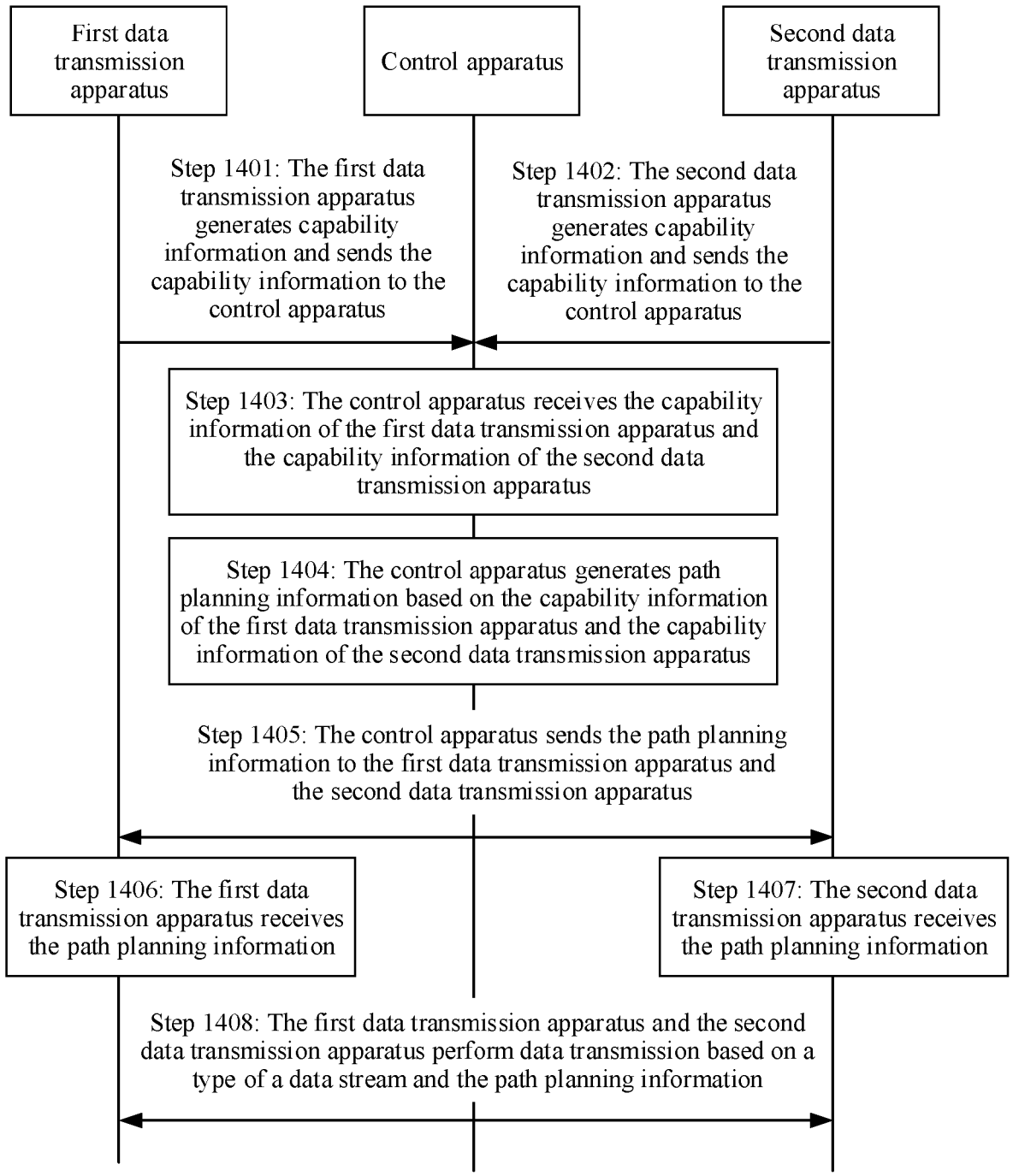
FIG. 14 shows a method according to an embodiment of this application.

FIG. 14 shows a method according to an embodiment of this application. Specifically, a data transmission method includes step 1401 to step 1408.

Step 1401: A first data transmission apparatus generates capability information and sends the capability information to a control apparatus.

Step 1402: A second data transmission apparatus generates capability information and sends the capability information to the control apparatus.

The capability information represents whether a backhaul link for transmission of a data stream can be planned. For example, the capability information may include a path planning capability indication. If a value of the path planning capability indication is a first value, it indicates that the data transmission apparatus can plan the backhaul link for transmission of a data stream. If a value of the path planning capability indication is a second value, it indicates that the data transmission apparatus cannot plan the backhaul link for transmission of a data stream. For example, the data transmission apparatus may generate the capability information depending on whether the data transmission apparatus can plan the backhaul link for transmission of a data stream. For example, if the data transmission apparatus can plan the backhaul link for transmission of a data stream, the data transmission apparatus sets the path planning capability indication in the capability information to the first value; or if the data transmission apparatus cannot plan the backhaul link for transmission of a data stream, the data transmission apparatus sets the path planning capability indication in the capability information to the second value.

For example, the path planning capability indication may occupy one bit in the capability information, for example, occupy the $7^{th}$ bit. If a value of the bit is 1, it indicates that the data transmission apparatus can plan the backhaul link for transmission of a data stream. If a value of the bit is 0, it indicates that the data transmission apparatus cannot plan the backhaul link for transmission of a data stream.

For example, in FIG. 13, the control apparatus 903 may plan to perform transmission of a data stream of a type 1 over a link 1, and plan to perform transmission of a data stream of a type 2 over a link 2. In this case, the first data transmission apparatus 901 and the second data transmission apparatus 902 perform transmission of the data stream of the type 1 over the link 1, and perform transmission of the data stream of the type 2 over the link 2.

Optionally, the capability information may further indicate whether transmission of a same type of data stream can be performed over a plurality of links. For example, the capability information may include a link aggregation capability indication. If a value of the link aggregation capability indication is a first value, it represents that the data transmission apparatus can perform transmission of the same type of data stream over the plurality of links. If a value of the capability indication is a second value, it represents that the data transmission apparatus cannot perform transmission of the same type of data stream over the plurality of links.

For example, refer to a table 10, the link aggregation capability indication may occupy one bit in the capability information, for example, occupy the 6th bit. If a value of the bit is 1, it indicates that the data transmission apparatus can perform transmission of the same type of data stream over the plurality of links. If a value of the bit is 0, it indicates that the data transmission apparatus cannot perform transmission of the same type of data stream over the plurality of links.

TABLE 10

| Field | Length | Value | Description |
|---|---|---|---|
| Type | One byte | xx | MAP-A capability indication |
| Length | Two bytes | xx | Total number of bytes |
| Value | Bit 7 | 0/1 | Whether stream control is supported |
| | Bit 6 | 0/1 | Whether link aggregation is supported |
| | Bits 5 to 0 | | Reserved |

It should be noted that step 1401 and step 1402 may be performed in sequence. For example, step 1401 may be performed before step 1402; or step 1402 may be performed before step 1401. A sequence of step 1401 and step 1402 is not limited in this embodiment. Step 1401 and step 1402 may alternatively be performed concurrently, that is, step 1401 and step 1402 may be performed simultaneously. An execution sequence of step 1401 and step 1402 is not limited in this embodiment.

Step 1403: The control apparatus receives the capability information of the first data transmission apparatus and the capability information of the second data transmission apparatus.

Step 1404: The control apparatus generates path planning information based on the capability information of the first data transmission apparatus and the capability information of the second data transmission apparatus.

The control apparatus may determine, based on capability information of each data transmission apparatus in a plurality of data transmission apparatuses, whether each data transmission apparatus can plan a backhaul link for transmission of a data stream. For example, for any data transmission apparatus, if a path planning capability indication in capability information of the data transmission apparatus is a first value, the control apparatus may determine that the data transmission apparatus can plan a backhaul link for transmission of a data stream. The control apparatus may select, from the plurality of data transmission apparatuses, a data transmission apparatus that can plan a backhaul link for transmission of a data stream, and generate path planning information based on the selected data transmission apparatus.

The path planning information is used to indicate a correspondence between a backhaul link and a type of a data stream, and can indicate a backhaul link over which transmission of a type of data stream is performed. The path planning information may include a backhaul link identifier and a stream type indication of a data stream. The path planning information may indicate a correspondence between a backhaul link and a type of one or more data streams. If the path planning information indicates a correspondence between a backhaul link and a type of N data streams, the path planning information may include a backhaul link identifier and N stream type indications, where N is a positive integer. The path planning information may be denoted as a stream control message.

For example, the path planning information may be shown in the following table 11, and includes a 1-byte backhaul link identifier and a 19-field stream type indication. If the backhaul link corresponds to a type of n data streams, the 19 fields are repeated (n−1) times based on the table 11. EUI-48 is a MAC address, and n is a positive integer.

TABLE 11

| Field | Length | Value | Description |
|---|---|---|---|
| Type | One byte | xx | Stream control TLV |
| Length | Two bytes | xx | Total number of bytes |
| Value | One byte | n | Link number |
| | One byte | Integer | Backhaul link identifier |
| | Bit 7 | 0/1 | Value 1 indicates that a destination MAC address appears |
| | Bit 6 | 0/1 | Value 1 indicates that a source MAC address appears |
| | Bit 5 | 0/1 | Value 1 indicates that a destination IP address appears |
| | Bit 4 | 0/1 | Value 1 indicates that a source IP address appears |
| | Bit 3 | 0/1 | Value 1 indicates that a destination port number appears |
| | Bit 2 | 0/1 | Value 1 indicates that a source port number appears |
| | Bit 1 | 0/1 | Value 1 indicates that an IEEE 902.1Q VLAN identifier appears |
| | Bit 0 | 0/1 | Value 1 indicates that an IEEE 902.1Q PCP appears |
| | Bit 7 | | Value 1 indicates that an outgoing/ingoing field appears |
| | Bits 6 to 0 | | Reserved |
| | Six bytes | Any EUI-48 value | Destination MAC address |
| | Six bytes | Any EUI-48 value | Source MAC address |
| | 16 bytes | | IPv4/IPv6 destination address |
| | 16 bytes | | IPv4/IPv6 source address |
| | Two bytes | | Destination port number |
| | Two bytes | | Source port number |
| | Two bytes | | IEEE 902.1Q VLAN identifier |
| | One byte | | IEEE 902.1Q PCP, 902.11 TID, or IPv4/IPv6 DSCP |
| | One byte | | 0x00: Transmission of only outgoing traffic is allowed over the link<br>0x01: Transmission of only ingoing traffic is allowed over the link<br>Other values are reserved<br>The foregoing 19 fields are repeated (n-1) times |

Step 1405: The control apparatus sends the path planning information to the first data transmission apparatus and the second data transmission apparatus.

The control apparatus may send the path planning information to a data transmission apparatus that can plan a backhaul link for transmission of a data stream. In addition, the control apparatus may send the path planning information to data transmission apparatuses at both ends of the backhaul link, or may send the path planning information to a data transmission apparatus at one end of the backhaul link. This is not limited in this embodiment.

Step 1406: The first data transmission apparatus receives the path planning information.

Step 1407: The second data transmission apparatus receives the path planning information.

It should be noted that step 1406 and step 1407 may be performed in sequence. For example, step 1406 may be performed before step 1407; or step 1407 may be performed before step 1406. A sequence of step 1406 and step 1407 is not limited in this embodiment. Step 1406 and step 1407 may alternatively be performed concurrently, that is, step 1406 and step 1407 may be performed simultaneously. An execution sequence of step 1406 and step 1407 is not limited in this embodiment.

Optionally, after receiving the path planning information, the first data transmission apparatus and the second data transmission apparatus may perform path planning configuration. A process of the path planning configuration may include the following step 1 to step 3.

Step 1: The first data transmission apparatus generates a configuration request, and sends the configuration request to the second data transmission apparatus.

Step 2: The second data transmission apparatus receives the configuration request, and sends a configuration response to the first data transmission apparatus, where the configuration response represents whether transmission of a data stream based on stream control information is accepted or not.

Step 3: The first data transmission apparatus receives the configuration response of the second data transmission apparatus.

After receiving the configuration response, the first data transmission apparatus may send a path planning response to the control apparatus, or send an acknowledgement message to the control apparatus. In addition, the first data transmission apparatus may determine whether the configuration response indicates that the transmission of the data stream based on the stream control information is accepted. If the configuration response indicates that the transmission of the data stream based on the stream control information is accepted, the following step 1005 is performed.

Step 1408: The first data transmission apparatus and the second data transmission apparatus perform data transmission based on a type of the data stream and the path planning information.

The data transmission apparatus may obtain the type of the data stream, query the path planning information based on the type of the data stream, obtain a backhaul link corresponding to the type in the stream control information, and perform data transmission over the backhaul link. For example, if the first data transmission apparatus receives the data stream, the first data transmission apparatus may send the data stream to the second data transmission apparatus over the backhaul link.

It should be noted that the embodiment in FIG. 14 is described by using only an example in which the single control apparatus performs step 1403, step 1404, and step 1405. In some possible embodiments, a step performed by the control apparatus in the embodiment in FIG. 14 may alternatively be performed by a cluster, to share an operation amount of path planning, and improve computation efficiency of the step.

For example, step 1404 in the embodiment in FIG. 14 may be performed by different control apparatuses in a decentralized manner, and the different control apparatuses may exchange information to obtain computation results of each other, and generate the path planning information based on the computation results of the plurality of control apparatuses.

According to the method provided in this embodiment, the control apparatus plans, based on capabilities of the data transmission apparatuses, a data stream whose transmission is to be performed over a backhaul link, and delivers path planning information to the data transmission apparatuses, so that a specific type of data stream whose transmission is to be performed over a specific backhaul link can be well planned. In this way, a transmission path of the data stream is optimized, and quality of service (QoS) can be improved.

Figure 15:
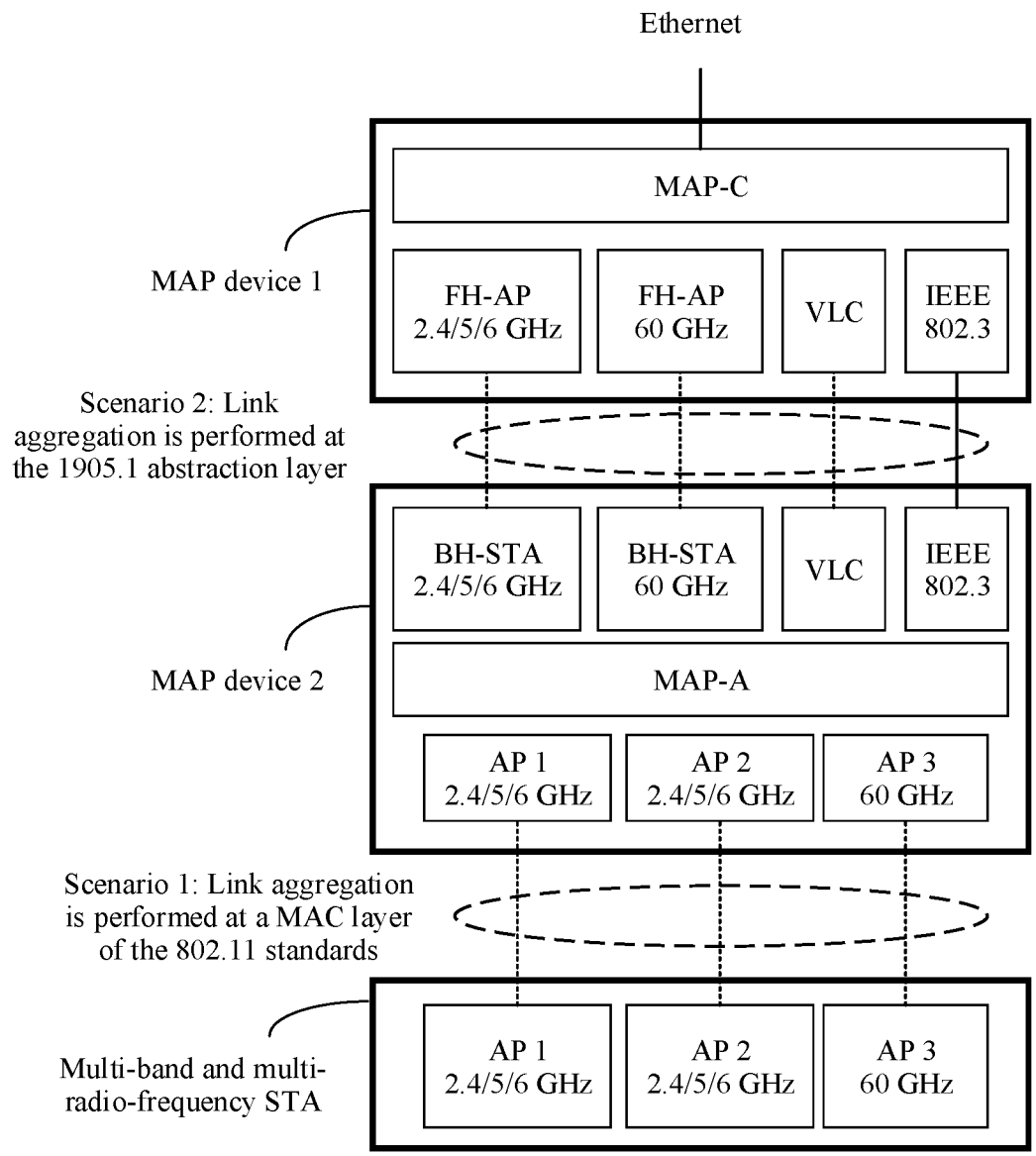
FIG. 15 shows two link aggregation scenarios used according to an embodiment of this application.
Figure 16:
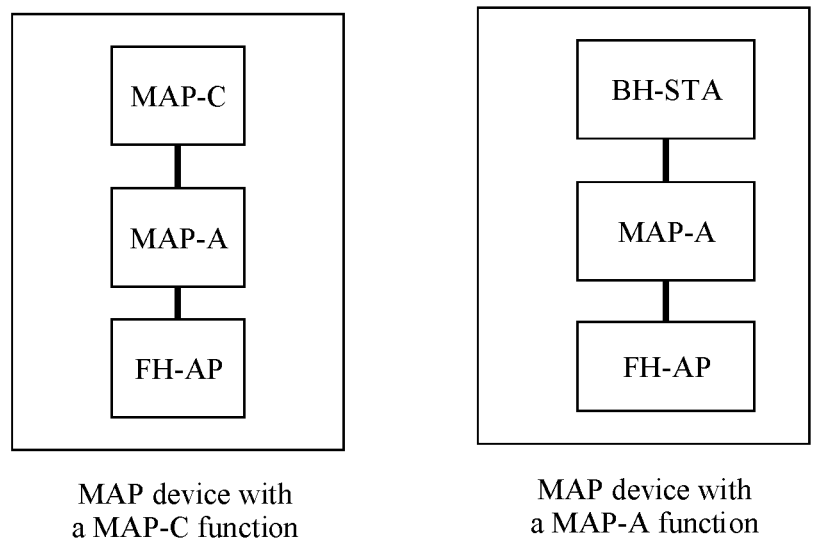
FIG. 16 is a schematic diagram of an architecture of a multi-AP device according to an embodiment of this application.

With reference to the data transmission methods provided in the foregoing embodiments, FIG. 15 shows at least two scenarios in which this application may be used. Scenario 1: Link aggregation may be performed at a MAC layer of the 802.11 standards. For example, link aggregation may be performed between an access point and a station. For example, this application may be used in a scenario in which the access point transmits data to the station. The access point sends a data stream to the station over a plurality of links, so as to speed up data transmission. Scenario 2: Link aggregation may be performed at the 1905.1 abstraction layer. For example, link aggregation may be performed between a MAP device 1 and a MAP device 2. A function architecture of a MAP device may be shown in FIG. 16. A MAP device with a MAP-C function includes a MAP-C module, a MAP-A module, and an FH-AP module, and a MAP device with a MAP-A function includes a MAP-A module, a MAP-A module, and an FH-AP module.

The foregoing describes the data transmission methods in the embodiments of this application. The following describes data transmission apparatuses in the embodiments of this application. The data transmission apparatus in the embodiments of this application may be the first data transmission apparatus, the second data transmission apparatus, or the third data transmission apparatus in the foregoing methods.

Figure 17:
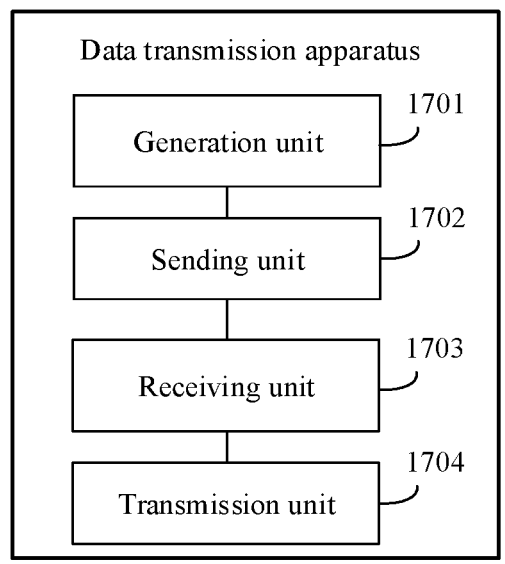
FIG. 17 shows a structure of a data transmission apparatus according to an embodiment of this application.

As shown in FIG. 17, a data transmission apparatus is provided. The data transmission apparatus may be the first data transmission apparatus, the second data transmission apparatus, or the third data transmission apparatus in the foregoing methods. The data transmission apparatus includes:

a generation unit 1701, configured to perform one or more of a generation process in step 201, a generation process in step 202, a generation process in step 1101, a generation process in step 1201, a generation process in step 1202, a generation process in step 1401, a generation process in step 1402, or step 1404;

a sending unit 1702, configured to perform one or more of a sending process in step 201, a sending process in step 202, a sending process in step 1102, a sending process in step 1201, a sending process in step 1202, a sending process in step 1401, a sending process in step 1402, or step 1405;

a receiving unit 1703, configured to perform one or more of a receiving process in step 202, a receiving process in step 203, step 1403, step 1406, or step 1407; and a transmission unit 1704, configured to perform one or more of step 203, step 1103, step 1104, step 1203, step 1204, or step 1408.

The data transmission apparatus provided in this embodiment of this application has any function of the first data transmission apparatus, the second data transmission apparatus, or the third data transmission apparatus in the foregoing methods. For specific details, refer to the foregoing methods. Details are not described herein again.

The foregoing describes the data transmission apparatus in the embodiments of this application, and the following describes a possible product form of the foregoing data transmission apparatus. It should be understood that any form of product that has a feature of the data transmission apparatus described in FIG. 17 falls within the protection scope of this application. It should be further understood that the following descriptions are merely an example, and does not limit a product form of the data transmission apparatus in the embodiments of this application.

Figure 18:
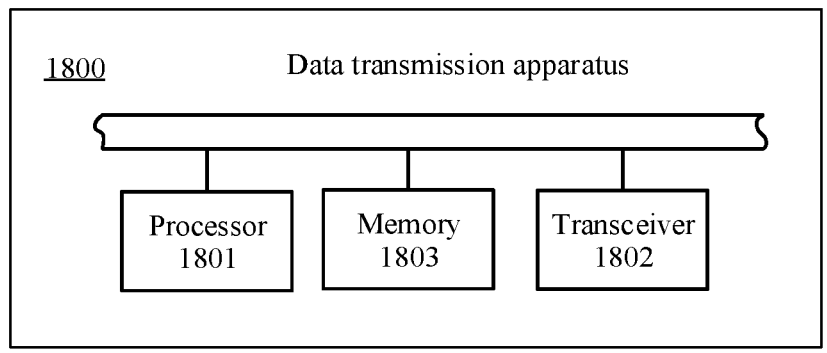
FIG. 18 shows a structure of a data transmission apparatus according to an embodiment of this application.

In a possible product form, the data transmission apparatus described in the embodiments of this application may be implemented by using a general bus architecture. Refer to FIG. 18. A data transmission apparatus 1800 includes a processor 1801 and a transceiver 1802 that is internally connected to and communicates with the processor.

The processor 1801 is configured to perform one or more of a generation process in step 201, a generation process in step 202, a generation process in step 1101, a generation process in step 1201, a generation process in step 1202, a generation process in step 1401, a generation process in step 1402, or step 1404.

The transceiver 1802 is configured to perform one or more of a sending process in step 201, a sending process in step 202, a sending process in step 1102, a sending process in step 1201, a sending process in step 1202, a sending process in step 1401, a sending process in step 1402, step 1405, a receiving process in step 202, a receiving process in step 203, step 1403, step 1406, or step 1407.

The processor 1801 is further configured to control the transceiver 1802 to perform one or more of step 203, step 1103, step 1104, step 1203, step 1204, or step 1408.

Optionally, the data transmission apparatus 1800 may further include a memory 1803, and the memory 1803 is configured to store instructions executed by the processor 1801.

In a possible product form, the data transmission apparatus in this embodiment of this application may be implemented by using a general-purpose processor. A general-purpose processor for implementing the data transmission apparatus includes a processing circuit, and an output interface and an input interface that are internally connected to and communicate with the processing circuit.

The processing circuit is configured to perform one or more of a generation process in step 201, a generation process in step 202, a generation process in step 1101, a generation process in step 1201, a generation process in step 1202, a generation process in step 1401, a generation process in step 1402, or step 1404.

The output interface is configured to perform one or more of a sending process in step 201, a sending process in step 202, a sending process in step 1102, a sending process in step 1201, a sending process in step 1202, a sending process in step 1401, a sending process in step 1402, or step 1405.

The input interface is configured to perform one or more of a receiving process in step 202, a receiving process in step 203, step 1403, step 1406, or step 1407.

The processor is further configured to control the input interface or the output interface to perform one or more of step 203, step 1103, step 1104, step 1203, step 1204, or step 1408.

Optionally, the general-purpose processor may further include a storage medium, and the storage medium is configured to store instructions executed by the processing circuit.

In a possible product form, the data transmission apparatus in the embodiments of this application may alternatively be implemented by using the following: one or more field-programmable gate arrays (FPGAs), a programmable logic device (PLD), a controller, a state machine, gate logic, a discrete hardware component, any other suitable circuit, or any combination of circuits that can perform various functions described in this entire application.

It should be understood that the foregoing data transmission apparatuses in various product forms each have any function of the first data transmission apparatus, the second data transmission apparatus, or the third data transmission apparatus in the foregoing method embodiments. Details are not described herein again.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects.

A person of ordinary skill in the art may be aware that, in combination with the examples described in the embodiments disclosed in this specification, method steps and units can be implemented by electronic hardware, computer software, or a combination thereof. To clearly describe interchangeability between hardware and software, the foregoing has generally described steps and composition of each embodiment based on functions. Whether the functions are performed by hardware or software depends on a particular application and a design constraint condition of a technical solution. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of a solution in the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in the embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the method comprises:
generating and sending a link aggregation request, wherein the link aggregation request is used to request to perform transmission of a same type of data stream over a plurality of links;
receiving a link aggregation response, wherein the link aggregation response represents whether the transmission of the same type of data stream over the plurality of links is accepted or not; and
in response to the link aggregation response representing that the transmission of the same type of data stream over the plurality of links is accepted, transmitting the same type of data stream over the plurality of links.

2. The method according to claim 1, wherein the link aggregation request comprises a stream type indication and a member link indication, the stream type indication is used to indicate a type of a data stream whose transmission is allowed over the plurality of links, and the member link indication is used to indicate each of the plurality of links.

3. The method according to claim 2, wherein the link aggregation request comprises a link aggregation element and a traffic policy element, the link aggregation element comprises the member link indication, and the traffic policy element comprises the stream type indication.

4. The method according to claim 1, wherein the link aggregation response comprises a status code, the status code comprises either of a success state and a failure state, the success state represents that the transmission of the same type of data stream over the plurality of links is accepted, and the failure state represents that the transmission of the same type of data stream over the plurality of links is not accepted.

5. A data transmission method, wherein the method comprises:
   receiving a link aggregation request, wherein the link aggregation request is used to request to perform transmission of a same type of data stream over a plurality of links;
   generating and sending a link aggregation response, wherein the link aggregation response represents whether the transmission of the same type of data stream over the plurality of links is accepted or not; and
   in response to the link aggregation response representing that the transmission of the same type of data stream over the plurality of links is accepted, transmitting the same type of data stream over the plurality of links.

6. The method according to claim 5, wherein the link aggregation request comprises a stream type indication and a member link indication, the stream type indication is used to indicate a type of a data stream whose transmission is allowed over the plurality of links, and the member link indication is used to indicate each of the plurality of links.

7. The method according to claim 6, wherein the link aggregation request comprises a link aggregation element and a traffic policy element, the link aggregation element comprises the member link indication, and the traffic policy element comprises the stream type indication.

8. The method according to claim 5, wherein the link aggregation response comprises a status code, the status code comprises either of a success state and a failure state, the success state represents that the transmission of the same type of data stream over the plurality of links is accepted, and the failure state represents that the transmission of the same type of data stream over the plurality of links is not accepted.

9. A data transmission apparatus, comprising:
   at least one processor;
   one or more memories coupled to the at least one processor and storing programming instructions for execution by the at least one processor to generate a link aggregation request, wherein the link aggregation request is used to request to perform transmission of a same type of data stream over a plurality of links; and
   a transceiver, the transceiver configured to:
      send the link aggregation request;
      receive a link aggregation response, wherein the link aggregation response represents whether the transmission of the same type of data stream over the plurality of links is accepted or not; and
      in response to the link aggregation response representing that the transmission of the same type of data stream over the plurality of links is accepted, transmit the same type of data stream over the plurality of links.

10. The apparatus according to claim 9, wherein the link aggregation request comprises a stream type indication and a member link indication, the stream type indication is used to indicate a type of a data stream whose transmission is allowed over the plurality of links, and the member link indication is used to indicate each of the plurality of links.

11. The apparatus according to claim 10, wherein the link aggregation request comprises a link aggregation element and a traffic policy element, the link aggregation element comprises the member link indication, and the traffic policy element comprises the stream type indication.

12. The apparatus according to claim 9, wherein the link aggregation response comprises a status code, the status code comprises either of a success state and a failure state, the success state represents that the transmission of the same type of data stream over the plurality of links is accepted, and the failure state represents that the transmission of the same type of data stream over the plurality of links is not accepted.

13. A data transmission apparatus, comprising:
   a transceiver, the transceiver configured to receive a link aggregation request, wherein the link aggregation request is used to request to perform transmission of a same type of data stream over a plurality of links;
   at least one processor;
   one or more memories coupled to the at least one processor and storing programming instructions for execution by the at least one processor to generate a link aggregation response, wherein the link aggregation response represents whether the transmission of the same type of data stream over the plurality of links is accepted or not; and
   wherein the transceiver is further configured to:
      send the link aggregation response; and
      in response to the link aggregation response representing that the transmission of the same type of data stream over the plurality of links is accepted, transmit the same type of data stream over the plurality of links.

14. The apparatus according to claim 13, wherein the link aggregation request comprises a stream type indication and a member link indication, the stream type indication is used to indicate a type of a data stream whose transmission is allowed over the plurality of links, and the member link indication is used to indicate each of the plurality of links.

15. The apparatus according to claim 14, wherein the link aggregation request comprises a link aggregation element and a traffic policy element, the link aggregation element comprises the member link indication, and the traffic policy element comprises the stream type indication.

16. The apparatus according to claim 13, wherein the link aggregation response comprises a status code, the status code comprises either of a success state and a failure state, the success state represents that the transmission of the same type of data stream over the plurality of links is accepted, and the failure state represents that the transmission of the same type of data stream over the plurality of links is not accepted.

* * * * *